(12) United States Patent
Breen, Jr. et al.

(10) Patent No.: US 6,598,027 B1
(45) Date of Patent: Jul. 22, 2003

(54) SYSTEMS, METHODS AND COMPUTER PROGRAM PRODUCTS FOR CONDUCTING REGULATION-COMPLIANT COMMERCIAL TRANSACTIONS OF REGULATED GOODS VIA A COMPUTER NETWORK

(75) Inventors: Napier Fulton Breen, Jr., Cary, NC (US); Randall Hompesch, Cary, NC (US)

(73) Assignee: XS, Inc., Raleigh, NC (US)

( * ) Notice: Subject to any disclaimer, the term of this patent is extended or adjusted under 35 U.S.C. 154(b) by 0 days.

(21) Appl. No.: 09/440,778

(22) Filed: Nov. 16, 1999

(51) Int. Cl.$^7$ ............................................. G06F 17/60
(52) U.S. Cl. ..................................................... 705/26
(58) Field of Search ................................. 705/26, 27, 37

(56) References Cited

U.S. PATENT DOCUMENTS

| | | | |
|---|---|---|---|
| 4,903,201 A | | 2/1990 | Wagner ........................ 364/408 |
| 5,794,207 A | | 8/1998 | Walker et al. .................. 705/23 |
| 5,794,210 A | | 8/1998 | Goldhaber et al. ............ 705/14 |
| 5,794,219 A | | 8/1998 | Brown ........................... 705/37 |
| 5,890,138 A | | 3/1999 | Godin et al. ................... 705/26 |
| 5,897,620 A | * | 4/1999 | Walker et al. ................... 705/5 |
| 5,915,209 A | * | 6/1999 | Lawrence ..................... 340/3.7 |
| 5,966,699 A | | 10/1999 | Zandi ............................ 705/38 |
| 5,970,472 A | * | 10/1999 | Allsop et al. .................. 705/26 |
| 6,052,600 A | * | 4/2000 | Fette et al. ................... 455/509 |
| 6,058,379 A | * | 5/2000 | Odom et al. ................... 705/37 |
| 6,064,981 A | * | 5/2000 | Barni et al. ................... 705/26 |
| 6,078,898 A | * | 6/2000 | Davis et al. ................... 705/26 |
| 6,219,423 B1 | * | 4/2001 | Davis ............................. 705/37 |
| 6,219,652 B1 | * | 4/2001 | Carter et al. .................. 705/59 |
| 6,226,618 B1 | * | 5/2001 | Downs et al. ................. 705/26 |
| 6,178,510 B1 | * | 6/2001 | O'Connor et al. .......... 713/201 |
| 6,285,987 B1 | * | 9/2001 | Roth et al. .................... 705/27 |

FOREIGN PATENT DOCUMENTS

| EP | 1 174 786 A2 | * | 1/2002 | ............. G06F/1/00 |
|---|---|---|---|---|
| JP | 2002041832 A | * | 2/2002 | ........... G06F/17/60 |

OTHER PUBLICATIONS

"Bowstreet's Web Automation Factory Breaks Major Bottleneck to e–commerce Adoption", Nov. 8, 1999, Business Wire.*
"PlanetRx.com CEO Calls for National Summit to Produce 'Watchdog' System for Safe On–line Pharmacy Practices", Jul. 30, 1999, PR Newswire.*
Perkins, Broderick, "Real Estate Column", Jun. 19, 1999, San Jose Mercury News.*
Morton, Peter, "Armed and Dangerous on the Web", Apr. 3, 1999, Financial Post, p. 9.*
"Child–oriented Internet Marketers Adapt Privacy, Safety As Promotional Tools", Dec. 1997, Youth Markets Alert, vol. 9, No. 11, p. 1.*
Larson, Erik, "Squeezing Out the Bad Guys", Aug. 9, 1999, Australian Business Intelligence, p. 28.*
Noonan, Gerard, "Click—and Your Child Could Have a Drink on You", May 24, 1999, Australian Business Intelligence, p. 3.*

* cited by examiner

Primary Examiner—Richard Chilcot
Assistant Examiner—Bryan Jaketic
(74) Attorney, Agent, or Firm—Myers Bigel Sibley & Sajovac

(57) ABSTRACT

Systems, methods and computer program products are provided for anonymously buying and selling regulated goods, such as agricultural chemicals, via auctions conducted over a computer network. A seller of regulated goods submits a request to the Web site of an intermediary to list the regulated goods for sale. The intermediary verifies that the seller is authorized to sell the regulated goods using information about the seller maintained by the intermediary. The intermediary also verifies that a bidder is authorized to purchase the regulated goods using information about the bidder maintained by the intermediary. The intermediary initiates delivery of the regulated goods from the seller to winning bidder(s) and initiates a transfer of funds from winning bidder(s) to a seller.

98 Claims, 46 Drawing Sheets

| | |
|---:|:---|
| Brand Name: | Bructril<br>Label & MSDS |
| ACH Account: | ACH Electronic Checking<br>ABA Number: 111222333<br>Bank: Jen's Bank<br>Account: 999888777<br>Jen Morrison |
| Manufacturer: | Rhône-Poulenc |
| EPA Reg. Number: | 264-437 |
| Packsize: | 30 Gallon Drum |
| Shipping Location: | XS Test, North Carolina<br>111 Corning Road<br>Cary, NC 27511 |
| Cases per Pallet: | 5 |
| Pallets for Sale: | 20 |
| Total Gallons: | 3,000 Gallons |
| Product Age: | 6 months |
| Free Delivery Zone: | None |
| Remain Anonymous? | Yes |
| Fixed Price | |
| Grower Price: | $50.00 |
| Grower Inclusion Zone: | None |
| Dealer Price: | $48.00 |
| Dealer Inclusion Zone: | None |
| Minimum Purchase: | 2 |

*FIG. 12C*

⚠ Important!

1. Seller certifies that product being sold is packaged in unopened, original manufacturer's cartons and containers; that product exactly matches the specifications used on the auction site (the product listing) and that the product is not more than 6 months old.

2. Seller certifies that product is correctly labelled.

3. Seller understands that if product is mis-represented in any material way, he will be liable for all freight, and possibly barred from using the system.

4. Seller authorizes XS, Inc. to utilize the following bank account information in making deposits related to the sale of this product. If this information is not correct please go to the Member ACH Banking page to correct and then try again.

| | Jen Morrison | | CURRENCY | |
|---|---|---|---|---|
| DEPOSIT TICKET | | | COIN | |
| | 10/18/99 | | CHECK | 150,000.00 |
| | | | TOTAL FROM REVERSE | |
| | 🏛 Jen's Bank | | $ | 150,000.00 |

111222333 999888777

5. Seller asserts that the following license information is valid and can be reported to regulatory agencies if XS, Inc. is required to do so. If this is not correct please go to the Regulatory License List page to correct and then try again.

| License: | Pesticide Dealer |
|---|---|
| License Number: | 555 |
| Name On License: | Jenny Morrison |
| State: | NC |
| Expiration: | 10/15/02 |

I certify that the product I am listing for sale meets all of the above requirements and I agree to the above conditions. I have read and understand the terms and conditions of the XSChem User Agreement and have read, understand and agree to abide by the Regulatory Policy of the XSChem.com site.

Type the first three characters of your last name to confirm: [    ]  [Submit]  [Cancel]

| | |
|---:|:---|
| Brand Name: | Bronate Label & MSDS |
| ACH Account: | ACH Electronic Checking<br>ABA Number: 111222333<br>Bank: Jen's Bank<br>Account: 999888777<br>Jen Morrison |
| Manufacturer: | Rhône-Poulenc |
| EPA Reg. Number: | 264-438 |
| Packsize: | 110 Gallon Drum |
| Shipping Location: | XS Test, North Carolina<br>111 Corning Road<br>Cary, NC 27511 |
| Cases per Pallet: | 1 |
| Pallets for Sale: | 10 |
| Total Gallons: | 1,100 Gallons |
| Product Age: | 12 months |
| Free Delivery Zone: | None |
| Remain Anonymous? | Yes |

Auction Format

| | |
|---:|:---|
| Asking Price: | $ 50 |
| Zone: | - Continental U.S. - |
| Zone Exclude/Allow: | ⊙ Allow sales to this zone<br>○ Exclude sales to this zone |
| Growers Participation: | ⊙ Growers may view<br>○ Growers may NOT view |
| Minimum Purchase: | 1<br>Enter the minimum quanity you will sell. |
| Auction Start: | 10 / 21 / 1999 (mm/dd/yyyy) |
| Auction End: | 10 / 27 / 1999 (mm/dd/yyyy) No more than 1 week after auction start. |

[Submit] [Cancel]

*FIG. 13B*

| | |
|---|---|
| Brand Name: | Bronate |
| | Label & MSDS |
| ACH Account: | ACH Electronic Checking |
| | ABA Number: 111222333 |
| | Bank: Jen's Bank |
| | Account: 999888777 |
| | Jen Morrison |
| Manufacturer: | Rhône-Poulenc |
| EPA Reg. Number: | 264-437 |
| Packsize: | 110 Gallon Drum |
| Shipping Location: | XS Test, North Carolina |
| | 111 Corning Road |
| | Cary, NC 27511 |
| Cases per Pallet: | 1 |
| Pallets for Sale: | 10 |
| Total Gallons: | 1,100 Gallons |
| Product Age: | 12 months |
| Free Delivery Zone: | None |
| Remain Anonymous? | Yes |
| Auction Format | |
| Asking Price: | $50.00 |
| Inclusion Zone: | None |
| Grower Participation: | Growers May View |
| Minimum Purchase: | 1 |
| Auction Start: | Thursday, October 21, 1999 |
| Auction End: | Wednesday, October 27, 1999 |

*FIG. 13C*

Please review the following information regarding your bid. If it is correct, use the submit button to finalize.

| | |
|---:|:---|
| Brand Name: | Bronate Label & MSDS |
| Manufacturer: | Rhône-Poulenc |
| EPA Reg. Number: | 264-438 |
| Packsize: | 55 Gallon Drum |
| Bid Quantity: | 5 pallets at 220 GLs/pallet for a total of 1,100 GLs |
| Minimum Pallets: | 2 pallets at 220 GLs/pallet for a total of 440 GLs |
| Bid Value: | $ 50.00 a GL for a total of $ 55,000.00 |
| Delivery Address: | XS Test, IA<br>111 BETA ROAD<br>DES MOINES, IA 50301 |
| Payment Option: | ACH Electronic Checking<br>ABA Number: 015555666<br>Bank Name: BETA1 BANK<br>Account: 654 321 456<br>BETA1 TESTER |
| Product Cost: | $ 55,000.00 |
| Freight Cost: | $ 839.37 (excluding accessorial charges if any) |
| Transaction Finance Fee: | $ 0.00 |
| Total Cost: | $ 55,839.37 |
| Total Cost per Unit: | $ 50.76 per GL |

[Submit] [Cancel]

FIG. 15B

*Confirm Bid Information - Microsoft Internet Explorer*

XSAg.com
SECURITY · MARKET ACCESS · PROFIT

SECURED FOR TRADE

SHOPPING CART
LOGOFF

MARKETPLACE | BUYERS | SELLERS | MEMBER PROFILE | SEARCH | SITE MAP

Chemicals | Seeds | Fertilizer | Vet Supplies | Animal Nutrition

Listings △ Confirm Bid Information

1000

Please review the following legal norifications confirming your bid. Confirm your acceptance by supplying the first three letters of your last name.

1. Buyer authorizes XS, Inc. to utilize the following bank account information in making withdrawals related to the purchase of this product. If this information is not correct please go to the Member ACH Banking page to correct and then try again.

1230

```
BETA1 TESTER                                          1024

DATE  10/12/1999
PAY TO THE
ORDER OF  Seller@XSChem.com         $ 55,839.37
          $55,839.37                           DOLLARS
          BETA1 BANK 015555666 654 321 456
```

1232

The following license information was found on file for you for Iowa. XS Inc. assumes that this license information is sufficient for you to purchase this product. It is your responsibility to comply with all regulations pertinent to the purchase of this product. See the Regulatory Policy of the XSChem site if you need more information.

| DESCRIPTION | NUMBER | EXPIRATION |
|---|---|---|
| Pesticide Dealer License | 1234567897 | 12/15/02 |

1234

△ Confirm Order Information

I certify that I have read and understand the terms and conditions of the XSChem User Agreement and have read, understand and agree to abide by the Regulatory Policy of the XSChem.com site.

Type the first three characters of your last name to confirm: [tes]  [Submit] [Cancel]

![Browser window showing https://www.xsag.net/XSChem/ForwardAuctionDetail.Asp?ForwardCode=1753 - Microsoft Internet Explorer]

Tabs: Chemicals | Seeds | Fertilizer | Vet Supplies | Animal Nutrition

Chemicals △ Search △ Auction Detail

1202 — Auction detail table:

| Field | Value | Field | Value |
|---|---|---|---|
| Listing Code: | 1753 | | |
| Brand Name: | Bronate / Lable & MSDS | | |
| Seller: | Anonymous | | |
| Common Name: | Bromoxynil Octanoate + MCPA Isooctyl Ester | Manufacturer: | Rhône-Poulenc |
| EPA Reg. Number: | 264-438 | Packsize: | 55 Gallon Drum |
| Product Age: | 24 months or less | Cases Per Pallet: | 4 (220 gallons) |
| Pallets: | 10 | Total Quantity: | 2,200 gallons |
| Minimum Purchase: | 1 pallets | Asking Price/gallon: | $ 50.00 |
| Auction Period: | 10/12/99 to 10/18/99 | Current High Bid/gallon: | $ 50.00 |
| Bides: | 1 | First Bid: | 10/12/99 5:32:27 PM |
| Inlcusion/Exclusion Zone: | None | Last Bid: | 10/12/99 5:32:27 PM |
| Free Delivery Zone: | None | | |

1204 — ⚠ Enter Your Bid!

I'd like [6] pallets at $ [50.00] per gallon shipped to

[XS Test, KS Wichita, KS 67201 ▼]

I will accept no less than [2] pallets. Click for a XSpert Freight Analyst.

Payment Option:
[ACH Electronic Checking account 123 123 123 in the name of Beta2 Tester ▼]

[Submit]

1206 — ⚠ Start XSpert Bidder! (More Explanatoin)

To start XSpert Bidder please also tell us your

Maximum Bid/gallon: [50.50]  and the Bid Increment: [.02]

— 1206a — — 1206b —

1208 — Bidding Activity

| Last Bid | First Bid | Min Pallets | Bid Pallets | Bid Quantity | Bid Price | Pallet Won |
|---|---|---|---|---|---|---|
| 10/12/99 5:32:27 PM | 10/12/99 5:32:27 PM | 2 | 5 | 1,100 | $50.00 | 5 |

A Yellow entry is your current bid.

| | |
|---:|:---|
| Brand Name: | Prep Label & MSDS |
| Manufacturer: | Any Manufacturer |
| EPA Registration Number: | 264-418 |
| Packsize(s): | 110 Gallon Drum |
| Shipping Location: | XS Test, North Carolina<br>111 Corning Road<br>Cary, NC 27511 |
| Total Quantity: | 10,000 Gallons |
| Maximum Delivered Price/Unit: | $ 50.00 |
| Payment Option: | ACH Electronic Checking<br>ABA Number: 291880589<br>Bank Name: Big Bank of NC<br>Account: 123456789<br>Name On Account: Jen Morrison |
| Product Cost: | $ 500,000 (estimated on purchase of all product at maximum delivered price) |
| Transaction Finance Fee: | $ 0.00 |
| Total Cost: | $ 500,000.00 |
| Maximum Product Age: | 6 months |
| Listing Start: | Tuesday, November 16, 1999 |
| Listing End: | Monday, November 22, 1999 |

FIG. 18B

Enter the inforamtion below if you wish to supply product for this listing. Required feilds are in red. Numeric fields are to be entered using only numbers and the decimal point.

Once you have completed this information and submitted the form, you will be asked to verify the information prior to the sale being finalized. Or you may request a Freight Analysis.

| | |
|---|---|
| ACH Account: | Beta2 123 123 123 ▼ For deposit of funds received. |
| Brand Name: | Prep (Rhône-Poulenc) ▼ |
| Packsize: | 110 Gallon Drum [110 GL/CASE] ▼ |
| Shipping Location: | XS Test KS Wichita, KS 67201 ▼ |
| Cases per Pallet: | 1    How many cases, drums or sacks on one pallet. |
| Pallets for Sale: | 9    How many pallets you wish to sell. |
| Total Quantity: | 990   Calculated by system. |
| Product Age: | 6 months ▼ |
| Delivered Price/Unit: | $ 50.00 |
| Seller Offering Price: | 50.00   Enter offer price, if different than buyer's listed price. |

1342 — Submit  Reset

SALES OFFERS

| OFFER DATE | BRAND NAME | PACKSIZE | QUANTITY OFFERED | PRODUCT AGE | OFFER PRICE |
|---|---|---|---|---|---|
| No Offers were found for this product. | | | | | |

FIG. 18F

| | |
|---|---|
| ACH Account: | ABA Number: 123456789<br>Beta2<br>Account: 123 123 123<br>Beta2 Tester |
| Brand Name: | Prep Label & MSDS |
| Manufacturer: | Rhône-Poulenc |
| EPA Reg. Number: | 264-418 |
| Packsize: | 110 Gallon Drum |
| Shipping Location: | XS Test, KS<br>111 Beta Road<br>Wichita, KS 67201 |
| Cases per Pallet: | 1 |
| Pallets for Sale: | 9 |
| Total Gallons: | 990 |
| Max. Delivered Price/Unit: | $ 50.00 |
| Product Age: | 6 months |
| Total Value: | $ 49,500.00 |
| Freight: | $ 1,081.30 ($ 1.09/Gallon) |
| XSChem Fee: | $ 968.37 ($ 0.98/Gallon) |
| Net to Seller: | $ 47,450.33 ($ 47.93/Gallon) |

FIG. 18G

SYSTEMS, METHODS AND COMPUTER PROGRAM PRODUCTS FOR CONDUCTING REGULATION-COMPLIANT COMMERCIAL TRANSACTIONS OF REGULATED GOODS VIA A COMPUTER NETWORK

FIELD OF THE INVENTION

The present invention relates generally to commerce and, more particularly, to electronic commerce conducted via a computer network, such as the Internet.

BACKGROUND OF THE INVENTION

Agricultural chemicals, such as insecticides, herbicides, and fungicides, are widely used in agriculture. Agricultural chemicals are typically sold directly to agricultural growers by local independent chemical dealers who act as intermediaries between growers and chemical producers. In order to insure that they are able to meet the demand of growers in their area, local chemical dealers typically carry excess inventory of various chemical products. Unfortunately, because of the seasonal nature of the agricultural chemical market, and because of geographic crop diversity, excess inventory may be carried for extended periods of time. For example, a local chemical dealer in Mississippi may have to carry excess inventory of cotton chemicals until the next cotton season because growers in the area will not need the chemicals until the next cotton season. Unfortunately, excess inventory may lead to increased costs and may tie up money that could be used elsewhere in a business.

As such, it would be desirable for local chemical dealers to be able to find additional buyers outside of their normal markets in order to help reduce excess inventory. Unfortunately, it may be difficult for a local chemical dealer to become aware of distant buyers. In addition, regulatory constraints, transportation costs, and the credit risk of dealing with unfamiliar customers may make transactions with distant buyers expensive and/or difficult.

SUMMARY OF THE INVENTION

In view of the above discussion, the present invention provides systems, methods, and computer program products for facilitating anonymous buying and selling of regulated goods, such as agricultural chemicals, over a computer network, wherein the computer network includes a Web site operated by an intermediary and a plurality of Web clients in communication with the Web site. Buyers and sellers who have "registered" with the intermediary can communicate anonymously with each other via respective Web clients. The intermediary obtains information about each buyer and seller at registration, including location information, identification information, and regulatory licensing information. The intermediary maintains this information and supplements this information with information obtained from various third party sources over time.

According to one embodiment of the present invention, a seller can offer regulated goods for sale at a fixed price by sending a request to the intermediary Web site to list the regulated goods for sale. Alternatively, a seller can offer regulated goods for sale by sending a request to the intermediary Web site to conduct an auction. In either case, the intermediary verifies that the seller is authorized to sell the regulated goods. Typically, this includes verifying that the seller has a valid license issued by a regulatory agency having authority over the regulated goods. This information is typically provided by a seller upon initial registration with the intermediary.

In response to verifying that a seller is authorized to sell the regulated goods, the intermediary lists information about the regulated goods offered for sale over the computer network and awaits an offer from potential buyers to purchase the regulated goods from the seller at the listed sales price. Alternatively, the intermediary conducts an auction and awards the sale of the regulated goods to the highest bidders. Listed information typically includes an identification of the regulated goods (e.g., a brand name), a quantity of the regulated goods, an asking price for the regulated goods, and shipping costs for shipping the regulated goods from the seller's location to a potential buyer's location. In addition, various restrictions may also be listed, such as where and from whom offers to purchase the regulated goods will be rejected by the seller.

In response to receiving an acceptable offer from potential buyers (either as a fixed price sale or via auction), the intermediary verifies that the potential buyers are authorized to purchase the regulated goods. Typically, this includes verifying that the potential buyer has a valid license issued by a regulatory agency having authority over the regulated goods. This information is typically provided by a buyer upon initial registration with the intermediary. In addition, the intermediary may verify that the regulated goods offered for sale are legal for use within the buyer's location using regulatory information maintained by the intermediary and/or accessible to the intermediary via third party product information providers.

In response to verifying that the buyer is authorized to purchase the regulated goods, the intermediary initiates delivery of the regulated goods from the seller to the buyer and initiates a transfer of funds from a financial account of the buyer to a financial account of the intermediary. Preferably, the intermediary notifies a third party freight dispatcher in communication with the computer network to handle delivery of the regulated goods to the buyer. In addition, the intermediary preferably notifies a third party financial institution via the computer network to handle the transfer of funds from the buyer to the intermediary. Upon confirmation by the buyer of acceptance of the delivered goods, funds are then transferred from a financial account of the intermediary to a financial account of the seller.

According to another embodiment of the present invention, the intermediary may conduct a reverse auction over the computer network, wherein potential buyers submit bids for selected regulated goods. As described above, verification that a potential buyer is authorized to purchase the regulated goods is conducted by the intermediary. In addition, the intermediary verifies that the regulated goods are legal for use within the buyer's jurisdiction and that a seller of the regulated goods is authorized to sell the regulated goods.

According to another embodiment of the present invention, the intermediary may conduct a reverse auction over the computer network, wherein various carriers can submit bids for delivering the regulated goods from the seller to the buyer. The intermediary can award the job of shipping the regulated goods to the carrier with the lowest bid.

Information about each transaction between a buyer and a seller is stored by the intermediary and is available to regulatory and other governmental agencies having a need to know information about a transaction.

The present invention may allow agricultural growers the opportunity to shop for the best available price for any type of agricultural input including, but not limited to chemicals, seed, and animal health products, while also ensuring compliance with regulations pertaining to these agricultural inputs. Buyers are not limited to purchasing agricultural inputs from local suppliers.

For sellers of agricultural inputs, the present invention may provide an efficient, secure and cost effective way to reduce inventory and improve profits. With a larger market available, sellers can create pricing, sourcing and liquidation strategies that can make their businesses more competitive.

BRIEF DESCRIPTION OF THE DRAWINGS

FIGS. 10A–10F illustrate exemplary HTML registration forms that can be downloaded from the intermediary's Web site and displayed within a Web browser interface to facilitate buyer/seller registration with the intermediary.

FIGS. 12A–12D and FIGS. 13A–13D illustrate exemplary HTML forms displayed within a Web browser interface that allow sellers to list products for sale via the computer system of FIG. 1. The HTML forms in FIGS. 12A–12D illustrate listing a product for sale at a fixed sales price. The HTML forms in FIGS. 13A–13D illustrate listing a product for sale via an auction.

FIGS. 15A–15D illustrate exemplary HTML forms displayed within a Web browser interface that allow buyers to bid on items offered for sale in an auction format via the computer system of FIG. 1.

FIGS. 16A–16B are the HTML forms of FIG. 15A and 15D, respectively, illustrating use of an automatic bidding agent to incrementally increase a bid to win an auction according to an embodiment of the present invention.

FIGS. 18A–18I illustrate exemplary HTML forms displayed within a Web browser interface that allow sellers to bid on a buyer's offer to purchase regulated goods in a reverse auction format via the computer system of FIG. 1.

DETAILED DESCRIPTION OF THE INVENTION

Figure 1:
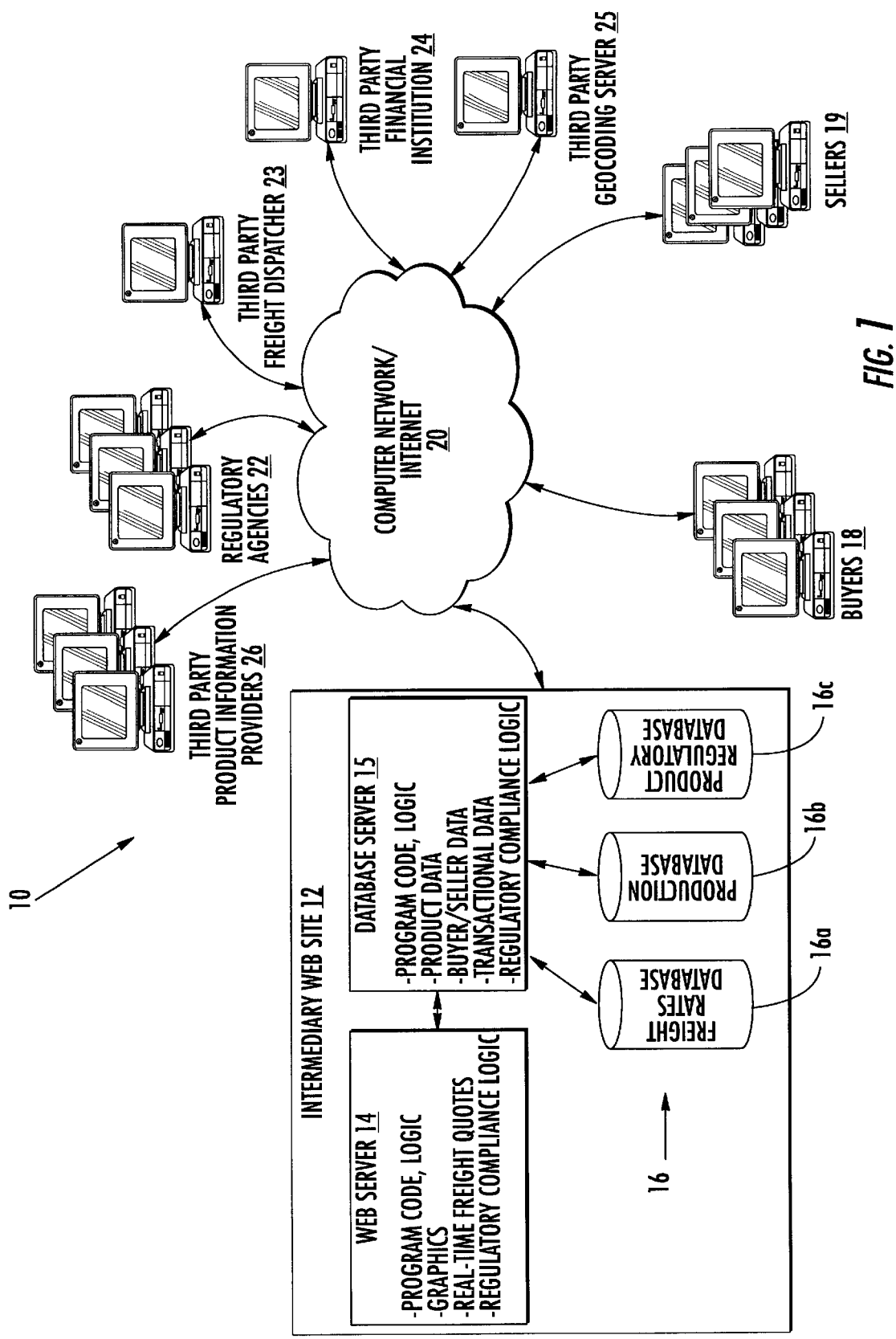
FIG. 1 is a diagrammatic representation of a computer system for facilitating buying and selling of regulated goods in an anonymous, regulation-compliant forum according to an embodiment of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

The Internet

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) consists of thousands of Web pages and files spread out over multiple Web servers in locations world-wide.

A Web server (also referred to as an HTTP server) is a computer program that utilizes HTTP to serve files that form Web pages to requesting Web clients. Exemplary Web servers include International Business Machines Corporation's family of Lotus Domino® servers, the Apache server (available from www.apache.org), and Microsoft's Internet Information Server (IIS), available from Microsoft Corporation, Redmond, Wash. A Web client is a requesting program that also utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with the present invention include, but are not limited to, Netscape Navigator® (America Online, Inc., Dulles, Va.) and Internet Explorers (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device which the browser interprets and renders within a display screen.

Computer System for Buying and Selling Regulated Goods in a Regulation-Compliant, Anonymous Forum As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Perl, or in a functional (or fourth generation) programming language such as Lisp, SML, or Forth. In addition, Microsoft Active Server Pages (ASP) technology and Java Server Pages (JSP) technology may be utilized. The program code may execute entirely on one or more Web servers and/or application servers, or it may execute partly on one or more Web servers and/or application servers and partly on a remote computer (i.e., a user's Web client), or as a proxy server at an intermediate point in the network. In the latter scenario, the remote computer may be connected to the Web server through a LAN or a WAN (e.g., an intranet), or the connection may be made through the Internet (e.g., via an Internet Service Provider).

The present invention is described below with reference to flowchart illustrations of methods, apparatus (systems) and computer program products according to an embodiment of the invention. It is understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring now to FIG. 1, a computer system 10 for facilitating regulation-compliant buying and selling of regulated goods in an anonymous forum, according to an embodiment of the present invention, is schematically illustrated. The illustrated system 10 includes a Web site 12 operated by an intermediary. The intermediary Web site 12 includes a Web server 14, a database server 15, and multiple databases 16. Illustrated databases 16 include a "freight rates" database 16a, a "production" database 16b, and a "product regulatory" database 16c. Although a single Web server 14 and database server 15 are illustrated, it is understood that multiple Web servers and multiple database servers (including other application servers) may be utilized to perform the functions of the illustrated Web server 14 and database server 15.

The Web server 14 is the "front end" component of the intermediary Web site 12 and is configured to handle requests from buyers and sellers accessing the intermediary Web site 12. The Web server 14 includes program code, logic and graphics to conduct one or more on-line auctions, including one or more reverse auctions, in real time. In addition, the Web server 14 includes program code and logic for determining, in real time, freight costs for goods purchased by auction. Exemplary commercial Web servers that may be utilized as a Web server 14 in the illustrated system 10 are Apache, available from the Apache Server Project, http://www.apache.org; Microsoft's Internet Information Server (IIS), available from Microsoft Corporation, Redmond, Wash.; and Netscape's FastTrack® and Enterprise™ servers, available from America Online, Inc., Dulles, Va. Other Web servers that may be utilized include Novell's Web Server for users of its NetWare® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in "tables." A database typically includes a database manager that facilitates accessing, managing, and updating data within the various tables of a database. Exemplary types of databases that can be used to implement the freight rates database, production database, and product regulatory database of the present invention include relational databases, distributed databases (databases that are dispersed or replicated among different points in a network), and object-oriented databases. Relational, distributed, and object-oriented databases are well understood by those of skill in the art and need not be discussed further herein. Exemplary databases that can be used to implement the freight rates database, production database, and product regulatory database include IBM's DB2® database, Microsoft's SQL server database, and database products from Oracle, Sybase, and Computer Associates.

The database server 15 is an application server that operates as a "middleman" server between the Web server 14 and the plurality of databases 16. The database server 15 includes program code and logic for retrieving data from the databases 16 (and from sources external to the Web site 12) in response to requests from the Web server 14. The database server 15 is configured to retrieve various product data (i.e., information about regulated goods being sold via the computer system 10), auction participant data (i.e., information about buyers and sellers), transactional data, and regulatory compliance data (i.e., information about regulated goods sold via the computer system 10). Exemplary commercial database servers that may be utilized as a database server 14 in the illustrated system 10 include Microsoft's SQL server, IBM DB2® Universal Database server, and the WebSphere™ Net.Commerce server, the latter two being available from International Business Machines Corporation, Armonk, N.Y.

The freight rates database 16a includes information that allows the database server 15 and web server 14 to determine the costs of shipping goods, in various amounts, from various originating locations to various destinations. Preferably, buyers and sellers can view shipping costs for specific quantities of regulated goods being sold at any time.

The production database 16b preferably includes one or more of the "tables" listed below in TABLE 1. Each table stores the type of information listed in the "Function" column of TABLE 1.

TABLE 1

| Table Name | Function |
| --- | --- |
| Members | Buyer/Seller registration information (Includes User ID and Password). User agreement acceptance. Assigns each user (buyer/seller) a unique member code which links each user to other tables in Production database. |
| Member Addresses | Shipping information indicating where goods can be picked up if seller and where goods are to be shipped to if buyer); each buyer and seller can have multiple shipping addresses. |
| Member Licenses | Regulatory information including license information for each buyer/seller. License information includes license type (i.e., dealer, applicator, etc.), expiration date, and state. |
| Member Accounts | Payment option information for each buyer/seller (i.e., ACH account information, credit card information, and Farm Plan account information). |
| Forward | Product listing information: when a seller lists a fixed price product or auction, all details about the listing (product, packsize, quantity, price, pick-up location, etc.) are stored here; each listing assigned a unique id (forward code). |
| Reverse Auctions | All product listing information for buyers who place a "want to buy" listing. Details of each listing (product, packsize, quantity wanted, delivered price, delivery shipping location). Links listing details back to buyer in Members table. Assigns each listing a unique id (reverse auction code). |
| Forward Bids | Bids for each auction. Links back to Forward Table by forward code. |
| Sales | Information for forward and reverse sales (links back to Forward and Reverse Auction Tables and Member Table. |
| Products | Product information for each brand name of good sold, including manufacturer information and information provided by other regulatory agencies and third party information providers (e.g., Environmental Protection Agency (EPA) number; NADA number; etc.). |
| State Availability | Indicates whether each product can be sold in each state (e.g., any restrictions imposed by manufacturer, or by federal and/or state agencies) |

The product regulatory database 16c includes information that allows the database server 15 and web server 14 to determine regulations, both federal and state, that apply to any goods sold via the computer system 10. Preferably, buyers and sellers can view regulatory information that applies to regulated goods being sold at any time. Regulatory information, usage information, safety information, and shipping restriction information may also be viewed by buyers and sellers via third party product information providers 26 via the computer network 10.

The intermediary Web site 12 is accessible to members (i.e., buyers 18 and sellers 19 who have registered with the intermediary) via a computer network, such as the Internet 20. Buyers and sellers 18, 19 access the intermediary Web site via a client program, such as a browser, running on a client device, such as a personal computer. However, it is understood that electronic devices, such as personal digital assistants (PDAs), hand-held computers, Internet-ready phones, and WebTVs, may be utilized as client devices for accessing the intermediary Web site 12 in accordance with the present invention.

The Web server 14 is also configured to communicate with various third parties in order to carry out aspects of the present invention. As will be described below, the illustrated Web server 14 is configured to communicate with various regulatory agencies 22, one or more third party freight dispatchers 23, one or more third party financial institutions, and one or more geocoding (i.e., location verification) servers 25. Communications between the Web server 14 and various third parties are preferably established via the Internet 20; however, other communications methods may be utilized, including direct dial access and telephonic communications.

Referring now to FIGS. 2–9, operations for implementing a computer system that facilitates economically efficient and regulation compliant commercial transactions in an anonymous forum, according to an embodiment of the present invention, are illustrated.

Figure 2:
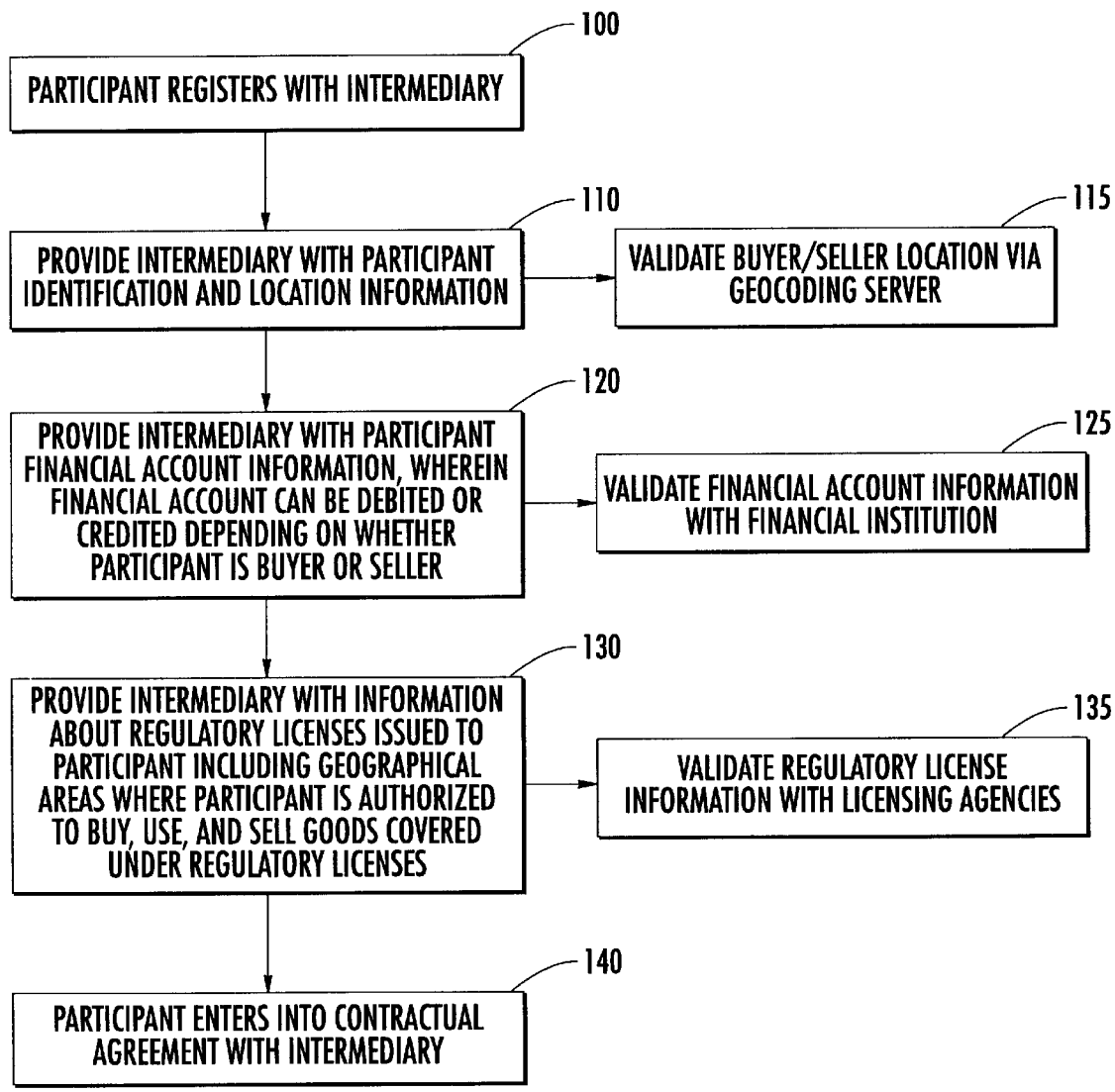
FIG. 2 is a flow chart illustrating operations for registering buyers and sellers with an intermediary, according to the present invention.

Referring now to FIG. 2, before buyers and sellers can buy or sell regulated goods via the computer system 10, each buyer/seller must register with the intermediary and become a "member" (Block 100) of the intermediary Web site 12. A potential buyer/seller wishing to become a member contacts the intermediary and provides various identification and location information (Block 110). Using a third party geocoding server (25, FIG. 1), the intermediary validates location (i.e., address) information provided by each buyer/seller (Block 115). As known to those skilled in the art, geocoding servers utilize longitude and latitude information (as well as other information such as postal codes and census data) to verify the accuracy and existence of street addresses. An exemplary third party geocoding server that is accessible via the Internet is available from Etak, Inc., 1605 Adams Drive, Menlo Park, Calif. (www.etak.com/geoprod.html). However, it is understood that other methods of verifying that an address provided by a buyer/seller exists and/or is accurate may be utilized. The present invention is not limited to the use of a geocoding server.

Information about a financial account that can be debited or credited (depending on whether the party is a buyer or seller) is also provided to the intermediary (Block 120). The intermediary validates the provided financial account information (Block 125) with the appropriate third party financial institution (24, FIG. 1). If the financial information cannot be validated by the appropriate third party financial institution, the buyer/seller is not allowed to buy or sell regulated goods via the computer system (10, FIG. 1).

A potential buyer/seller wishing to become a member also provides the intermediary with information pertaining to licenses issued to the buyer/seller by a regulatory authority (Block 130). For example, each buyer/seller is required to list its dealer/distributor license number, commercial applicator license number, private applicator license number or any other license number that may be required in a particular location or jurisdiction (e.g., federal and state). In addition to license number, each buyer/seller provides the intermediary with other information such as expiration date of each license. The intermediary then validates (Block 135) the provided licensing information with the appropriate Regulatory Agencies (22, FIG. 1).

A potential buyer/seller wishing to become a member is also required to enter into a contractual agreement with the intermediary and to become bound by various terms, conditions and policies set forth by the intermediary (Block 140). Such a user agreement may include terms, conditions and policies relating to liability, product quality, taxes, shipping, payment, shilling, privacy, anonymity of buyers/sellers, and so forth.

Figure 3:
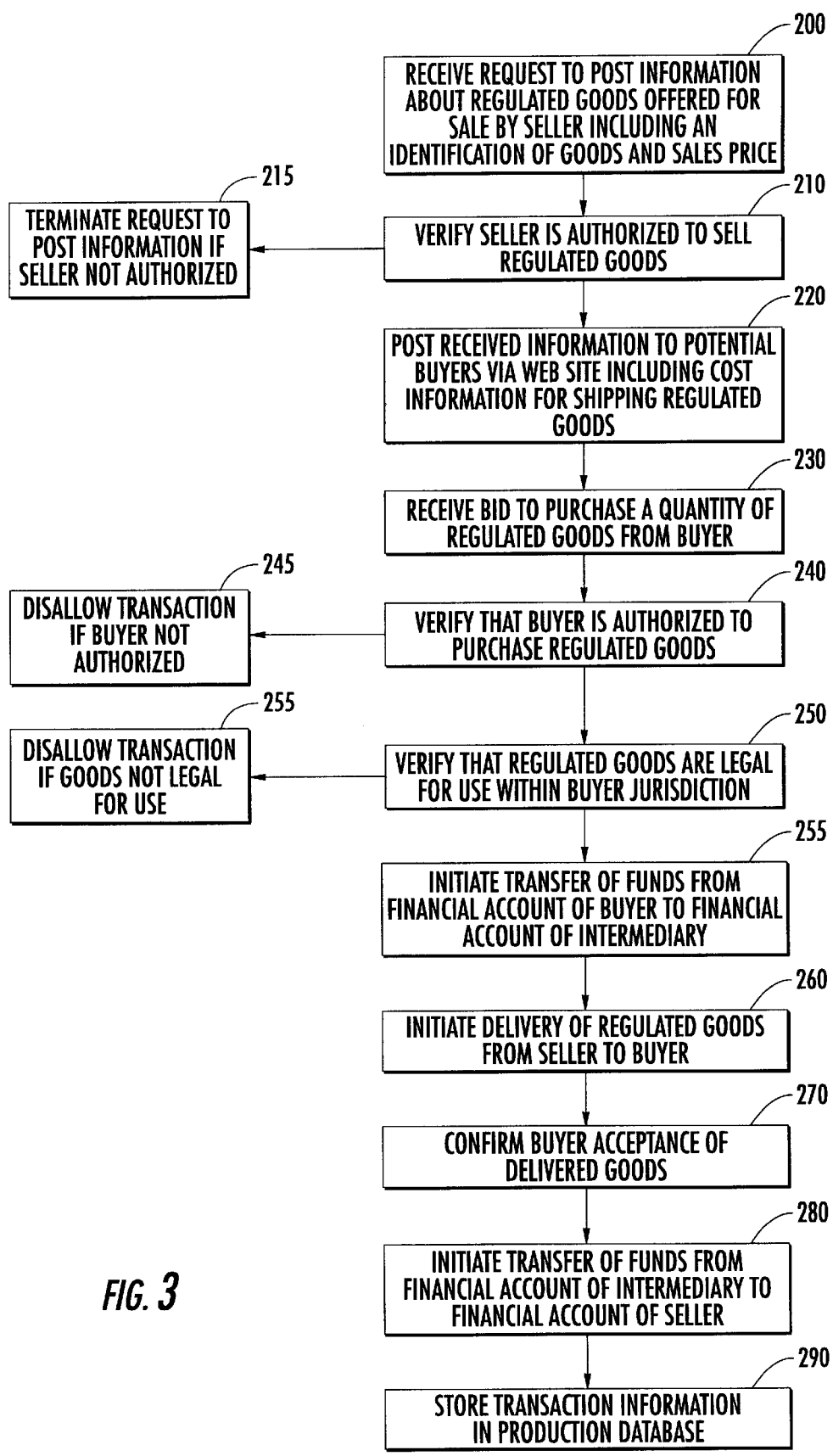
FIG. 3 is a flow chart illustrating operations for buying and selling regulated goods at a fixed price via the computer system illustrated in FIG. 1, according to an embodiment of the present invention.

Referring now to FIG. 3, operations for buying and selling regulated goods at a fixed price via the computer system 10 of FIG. 1 are illustrated. The intermediary receives a request from a seller to post information via the intermediary Web site (12, FIG. 1) about regulated goods the seller is willing to sell at a fixed price (Block 200). Before listing this information, the intermediary verifies that the seller is authorized to sell the regulated goods (Block 210) using information provided by the seller during registration and any additional information available to the intermediary. Preferably, the seller information is maintained within the production database (16b, FIG. 1) and is readily accessible via the database server (15, FIG. 1). The intermediary terminates the request if the seller is not authorized (Block 215). If the seller is authorized, the intermediary posts a listing of the information to potential buyers via the intermediary Web site (Block 220).

A potential buyer desiring to purchase the regulated goods offered for sale sends an offer (bid) to purchase the regulated goods to the intermediary via the intermediary Web site. Upon receiving the bid from the potential buyer (Block 230), the intermediary verifies that the potential buyer is authorized to purchase the regulated goods offered for sale (Block 240). Preferably, the buyer information is maintained within the production database (16b, FIG. 1) and is readily accessible via the database server (15, FIG. 1). The intermediary disallows the transaction if the buyer is not authorized (Block 245). If the buyer is authorized, the intermediary then verifies that the regulated goods are legal for use within the buyer's jurisdiction (Block 250). Preferably, information regarding legality of use of regulated goods within a buyer's jurisdiction is maintained within the product regulatory database (16c, FIG. 1) and is readily accessible via the database server (15, FIG. 1). Alternatively, the intermediary may communicate with one or more regulatory agencies (22, FIG. 1) to obtain this information. The intermediary disallows the transaction if the regulated goods are not legal for use within the buyer's jurisdiction (Block 255).

Preferably, cost information associated with shipping the regulated goods offered for sale is also displayed to potential buyers. If the regulated goods are legal for use within the buyer's jurisdiction, the intermediary initiates a transfer of funds from a financial account of the buyer to a financial account of the intermediary (Block 255) and the intermediary initiates delivery of the regulated goods from the seller to the buyer (Block 260). The intermediary confirms that the buyer "accepts" the delivered goods (e.g., that the goods are in proper condition and that the correct quantity was delivered) (Block 270). The buyer's acceptance can be confirmed by the intermediary via communications with the buyer by way of the computer system 10 of FIG. 1, or by way of other modes of communication. The intermediary then initiates transfer of funds from the financial account of the intermediary to a financial account of the seller (Block 280). Steps involved in initiating delivery of the regulated goods and initiating a transfer of funds are described below with respect to FIGS. 8 and 9.

Preferably, the intermediary stores information about each transaction between a buyer and seller (Block 290) within the production database (16b, FIG. 1). This information may be made available to authorized regulatory agencies and others having a need to know.

Figure 4:
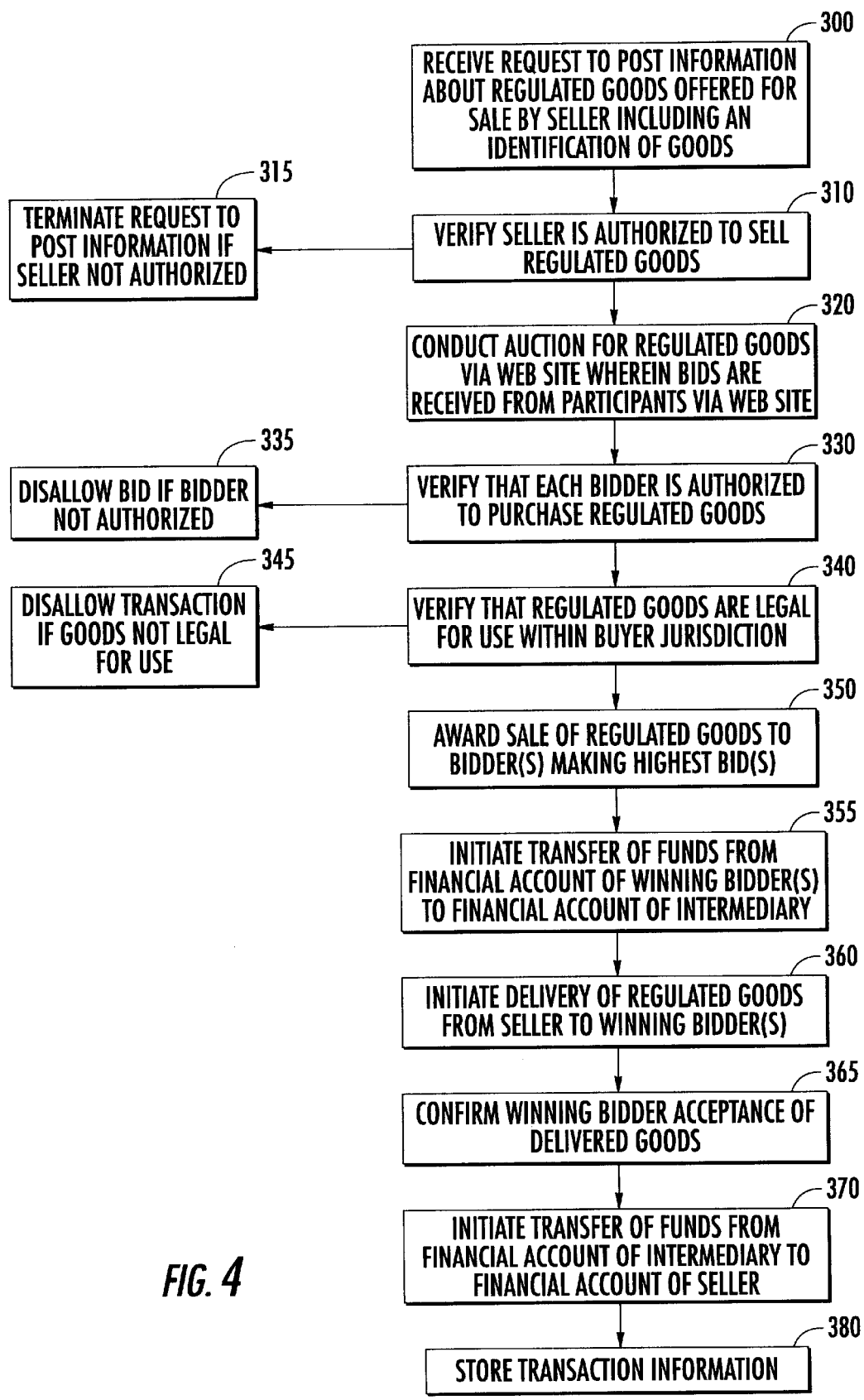
FIG. 4 is a flow chart illustrating operations for buying and selling regulated goods in an auction format via the computer system illustrated in FIG. 1, according to an embodiment of the present invention.

Referring now to FIG. 4, operations for buying and selling regulated goods in an auction format via the computer system 10 illustrated in FIG. 1 are illustrated. The intermediary receives a request from a seller to post a listing of information via the intermediary Web site (12, FIG. 1) about regulated goods the seller is willing to sell at auction (Block 300). Before posting this information, the intermediary verifies that the seller is authorized to sell the regulated goods (Block 310) using information provided by the seller during registration and any additional information available to the intermediary. As discussed above, the seller information is preferably maintained within the production database (16b, FIG. 1) and is readily accessible via the database server (15, FIG. 1). The intermediary terminates the request if the seller is not authorized (Block 315). If the seller is authorized, the intermediary conducts an auction via the Web site (12, FIG. 1) and allows potential buyers to bid on the regulated goods, preferably for a designated period of time (Block 320).

The intermediary verifies that each bidder is authorized to purchase the regulated goods offered for sale (Block 330). As discussed above, buyer information is preferably maintained within the production database (16b, FIG. 1) and is readily accessible via the database server (15, FIG. 1). The intermediary disallows bidding from a bidder not authorized to purchase the regulated goods (Block 335). The intermediary also verifies that the regulated goods are legal for use within the a bidder's jurisdiction and/or are not restricted for use within a bidder's jurisdiction by the manufacturer of the regulated goods (Block 340). As discussed above, information regarding legality of use of regulated goods within a bidder's jurisdiction is preferably maintained within the product regulatory database (16c, FIG. 1) and is readily accessible via the database server (15, FIG. 1). Alternatively, the intermediary may communicate with one or more regulatory agencies (22, FIG. 1) to obtain this information. The intermediary disallows the transaction if the regulated goods are not legal for use within the winning bidder's jurisdiction (Block 355).

If the regulated goods are legal for use within a bidder's jurisdiction, the intermediary awards the sale of the regulated goods to the bidder(s) making the highest bid(s) (Block 350). The intermediary then initiates a transfer of funds from a financial account of the winning bidder(s) to a financial account of the intermediary (Block 355) and initiates delivery of the regulated goods from the seller to the winning bidder(s) (Block 360). The intermediary confirms that the winning bidder(s) "accepts" the delivered goods (Block 365) and then initiates transfer of funds from a financial account of the intermediary to a financial account of the seller (Block 370). A winning bidder's acceptance can be confirmed by the intermediary via communications with a winning bidder by way of the computer system 10 of FIG. 1, or by way of other modes of communication. A winning bidder may reject the regulated goods if not delivered in the contractually agreed-to condition and/or amount. Steps involved in initiating delivery of the regulated goods and initiating transfer of funds are described further with respect to FIGS. 8 and 9.

The intermediary also stores information about each transaction between a winning bidder and seller (Block 380) within the production database (16b, FIG. 1). This information may be made available to authorized regulatory agencies and others having a need to know.

Figures 5, 6:
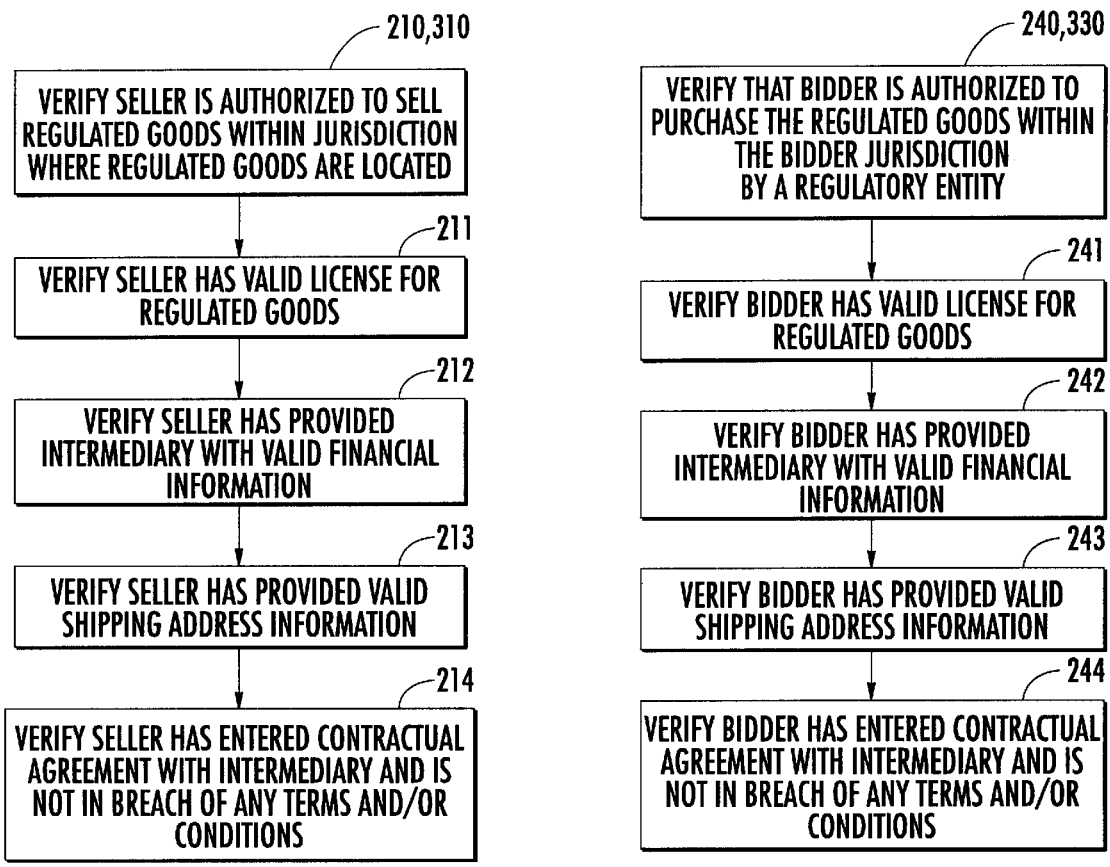
FIG. 5 is a flow chart illustrating operations for verifying that a seller is authorized to sell regulated goods, according to an embodiment of the present invention.
FIG. 6 is a flow chart illustrating operations for verifying that a winning buyer is authorized to purchase regulated goods, according to an embodiment of the present invention.

Referring now to FIG. 5, steps involved in verifying that a seller is authorized to sell regulated goods (Block 210, 310) are illustrated. The intermediary verifies that the seller has a valid license issued by a regulatory agency having authority over the regulated goods (Block 211). License information is preferably maintained within the production database (16b, FIG. 1) and is readily accessible via the database server (15, FIG. 1). In addition, the intermediary may communicate with one or more regulatory agencies (22, FIG. 1) to verify that a seller's license information is still accurate and/or up-to-date.

The intermediary verifies that the seller has provided the intermediary with adequate and valid financial information (Block 212) and with adequate and valid shipping information (Block 213). In addition, the intermediary verifies that the seller has contractually bound itself to the intermediary via a user agreement (Block 214) and that the seller is not in breach of any of the contractual terms and conditions of the user agreement.

Referring now to FIG. 6, steps involved in verifying a bidder (or buyer) is authorized to purchase regulated goods (Block 240, 330) are illustrated. The intermediary verifies that a bidder has a valid license issued by a regulatory agency having authority over the regulated goods (Block 241). License information is preferably maintained within the production database (16b, FIG. 1) and is readily accessible via the database server (15, FIG. 1). In addition, the intermediary may communicate with one or more regulatory agencies (2, FIG. 1) to verify that a bidder's license information is still accurate and/or up-to-date.

The intermediary verifies that a bidder has provided the intermediary with adequate and valid financial information (Block 242) and with adequate and valid shipping information (Block 243). In addition, the intermediary verifies that the bidder contractually bound itself to the intermediary via a user agreement (Block 244) and that the bidder is not in breach of any of the contractual terms and conditions of the user agreement.

Figure 7:
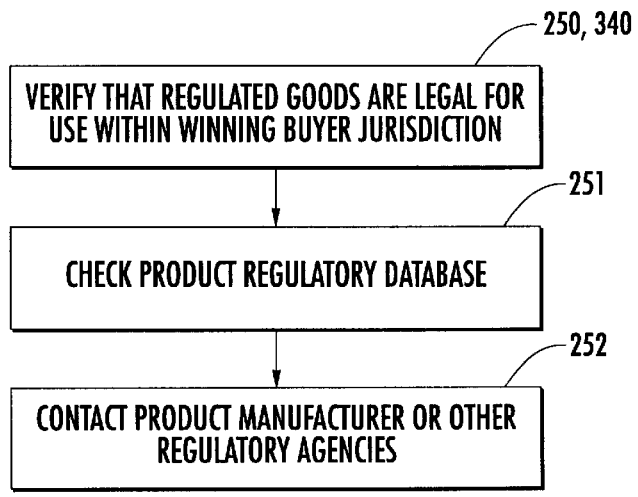
FIG. 7 is a flow chart illustrating operations for verifying that regulated goods offered for sale are legal for use within a buyer's location, according to an embodiment of the present invention.

Referring now to FIG. 7, steps involved in verifying that regulated goods offered for sale are legal for use within a buyer's (or bidder's) location (Block 250, 340) are illustrated. The intermediary preferably accesses the product regulatory database (16c, FIG. 1) via the database server (15, FIG. 1) to verify the legality of the regulated goods within a particular location (Block 251). In addition, however, the intermediary may communicate with one or more regulatory agencies (2, FIG. 1) to further verify the legality of the regulated goods within a particular location (Block 252).

Figures 8, 9:
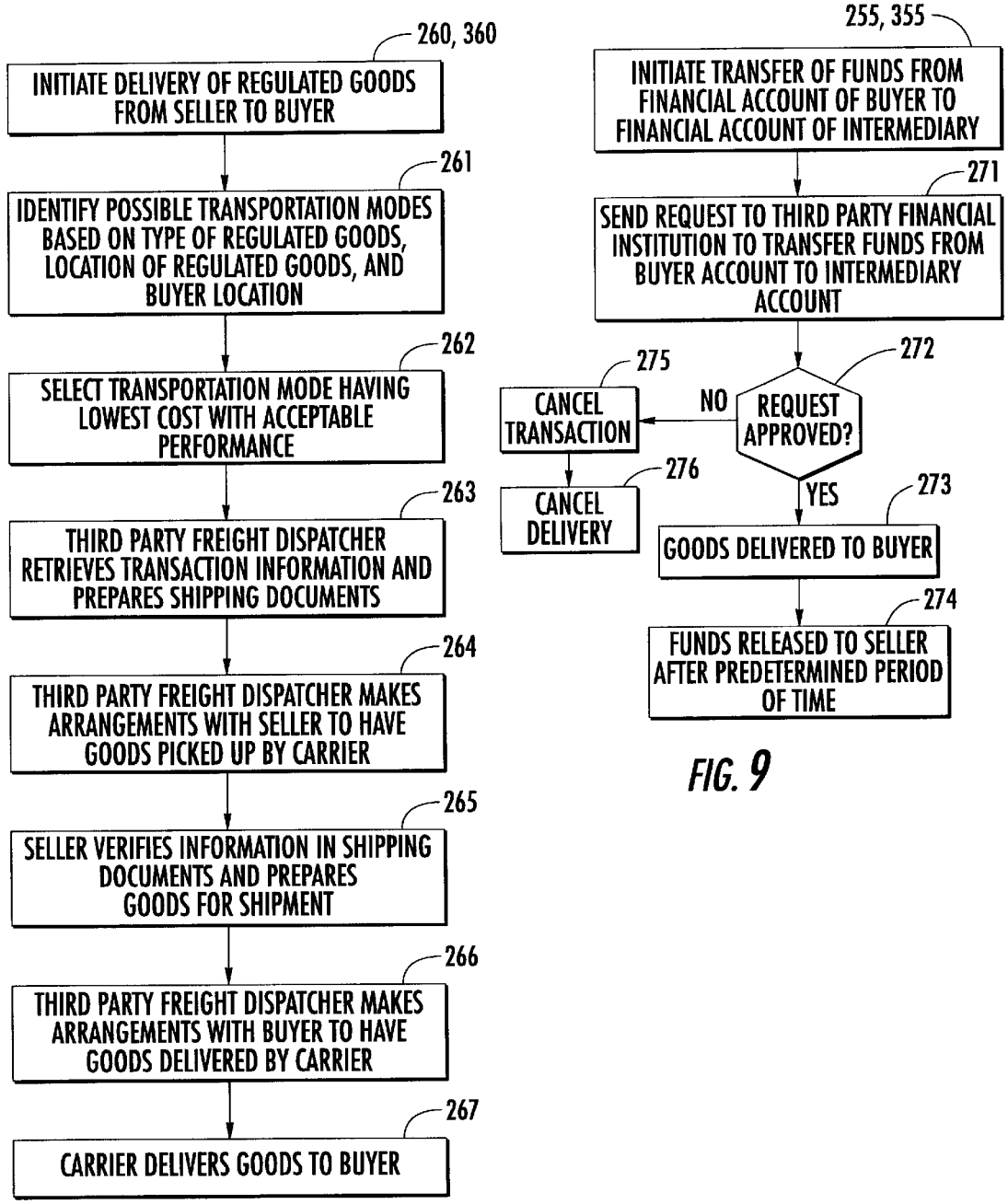
FIG. 8 is a flow chart illustrating operations for initiating and completing delivery of regulated goods from a seller to a buyer utilizing the computer system of FIG. 1, according to an embodiment of the present invention.
FIG. 9 is a flow chart illustrating operations for initiating the transfer of funds from a buyer to a seller via the computer system illustrated in FIG. 1, according to an embodiment of the present invention.

Referring now to FIG. 8, steps involved in initiating delivery of regulated goods from a seller to a buyer or winning bidder (Block 260, 360), according to the present invention, are illustrated. The intermediary identifies possible transportation modes (e.g., rail, air, sea, and land) based on the type of the regulated goods, the location of the regulated goods, and the location of the buyer (Block 261). For example, it may be illegal to ship some regulated goods by air. Thus, only rail, sea and land based shipping modes may be available. In addition, certain jurisdictions may prohibit shipping regulated goods in particular modes along various routes.

Once possible transportation modes are identified, the intermediary then selects the transportation mode having the lowest cost and that meets other performance parameters (Block 262). The term "performance" may include time of delivery, availability of carrier, and so forth. For example, if rail shipment is less expensive than air shipment, but requires an additional week to complete shipment, air shipment may be the preferred transportation mode.

A third party freight dispatcher (23, FIG. 1), upon receiving notification from the intermediary, retrieves the transportation information from the intermediary and prepares shipping documents for a particular carrier (Block 263). The third party freight dispatcher makes arrangements with the seller to have the regulated goods picked up a by a designated carrier (Block 264). The seller verifies the information contained within the shipping documents and prepares the regulated goods for shipment (Block 265). The third part freight dispatcher also makes arrangements with the buyer to have the regulated goods delivered to the buyer (Block 266) and directs the carrier to deliver the regulated goods to the buyer (Block 267) pending authorization from a third party financial institution (24, FIG. 1) that funds can be transferred from the buyer's account to the seller's account.

Referring now to FIG. 9, steps involved in initiating a transfer of funds from a buyer's (or winning bidder's) financial account to the financial account of the seller, according to the present invention, are illustrated. The intermediary sends a request to a third party financial institution (24, FIG. 1) to transfer funds from the financial account of the buyer to the financial account of the intermediary (Block 271). If the request is denied by the third party financial institution, the transaction is cancelled (Block 275) and delivery of the regulated goods is cancelled (Block 276). Such a request may be denied for various reasons including, but not limited to, lack of sufficient funds in the buyer's account.

If the request is approved by the third party financial institution (Block 272), the regulated goods are delivered to the buyer (Block 273). After a predetermined period of time within which the buyer is given to inspect and "accept" the regulated goods, the funds are released to a financial account of the seller from the financial account of the intermediary (Block 274). The third party financial institution also disburses a percentage of the funds to the intermediary.

Preferably, funds are held in a secure electronic lock box of the intermediary or other third party by a third party financial institution. These funds are held as collateral, on behalf of the buyer and the seller, until the successful delivery of the products sold and until the buyer has had a chance to inspect the delivered goods.

An embodiment of the present invention is illustrated below with respect to agricultural chemicals. However, it is understood that the present invention is not limited to the buying and selling of agricultural chemicals. Virtually any type of product or service may be bought and sold via a computer network implementing the present invention.

Buyer/seller Registration

Each buyer/seller participant registers with the intermediary and provides information including, but not limited to, identification information, regulatory licensing information, financial information, and shipping information. Buyer/seller registration information is preferably stored for later access in the production database (16b, FIG. 1).

FIGS. 10A–10F, which are described below, illustrate exemplary HTML registration forms that can be downloaded from the intermediary's Web site and displayed within a Web browser interface 1000 to facilitate registration with the intermediary.

Figure 10A:
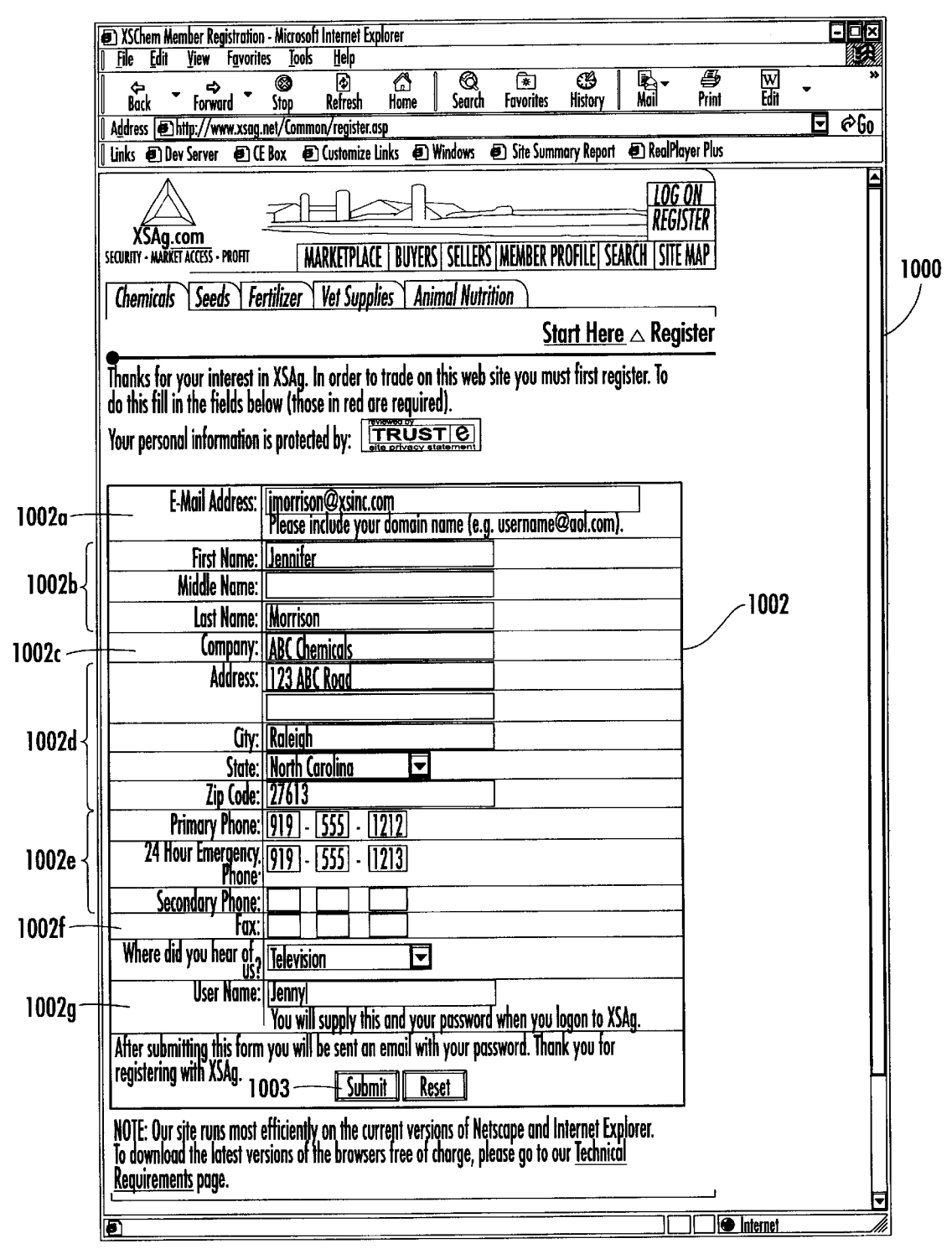

Using the illustrated form 1002 of FIG. 10A, a buyer/seller provides the intermediary with various identification information including, but not limited to, name, address, phone number, and e-mail address. The illustrated form 1032 includes the following fields in which a buyer/seller provides information:

1) "e-mail address" field 1002a in which a buyer/seller identifies his/her e-mail address;
2) "name" fields 1002b in which a buyer/seller identifies his/her first, middle, and last names;
3) "company" field 1002c in which a buyer/seller identifies his/her company;
4) "location" fields 1002d in which a buyer/seller identifies his/her address, city, state, and zipcode;
5) "phone" fields 1002e in which a buyer/seller identifies his/her phone numbers;
6) "fax" field 1002f in which a buyer/seller identifies his/her fax number; and
7) "user name" 1002g field in which a buyer/seller identifies a user name he/she will use when accessing the system of the present invention.

By activating the "Submit" button 1003, the information within the form 1002 is submitted to the intermediary as would be understood by those of skill in the art of HTML forms.

Figure 10B:
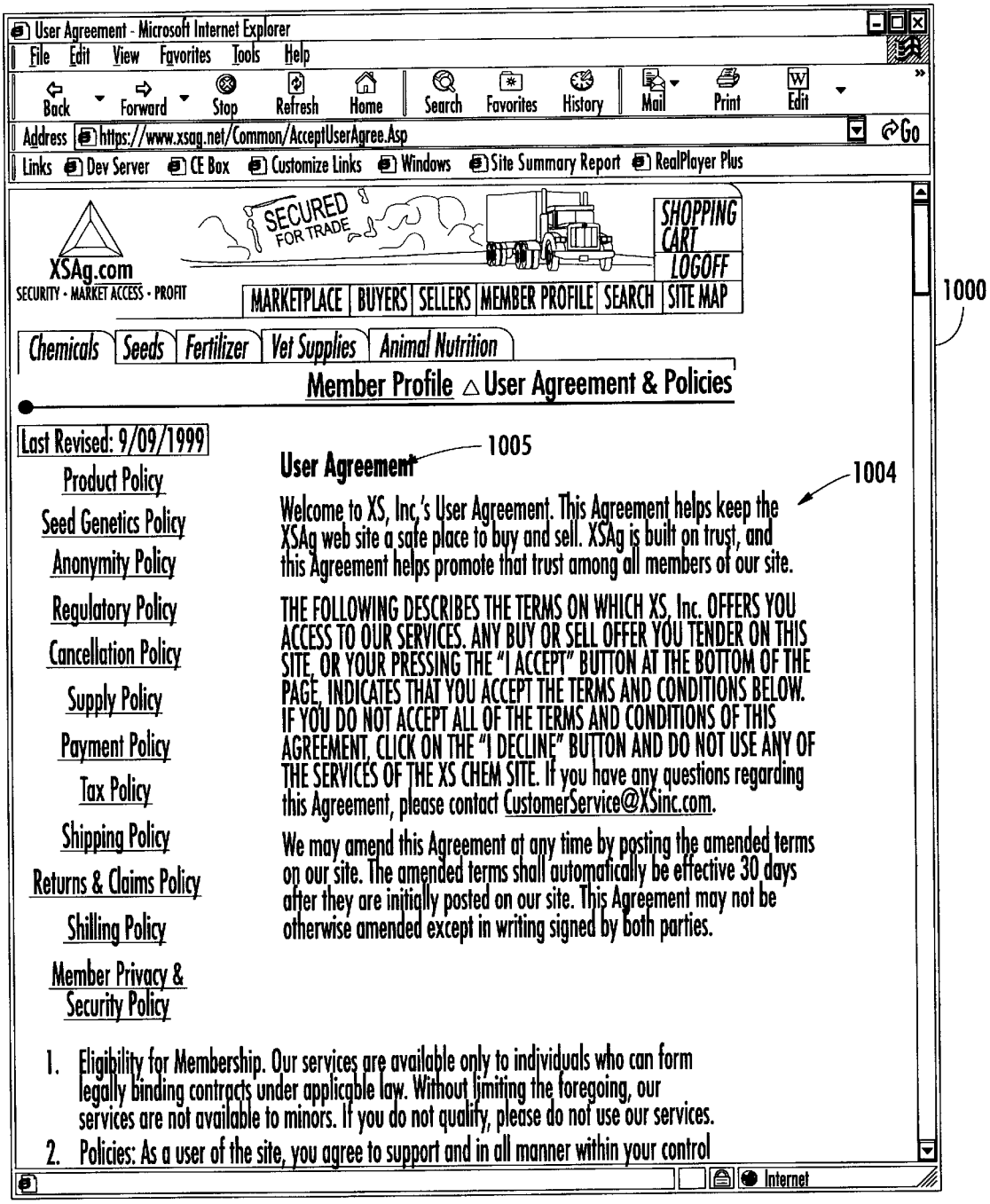

Using the illustrated form 1004 of FIG. 10B, a buyer/seller accepts the terms and conditions of the intermediary's user agreement 1005 displayed therein. The illustrated user agreement 1005 includes terms and conditions related to products that can be sold via the intermediary's Web site including, but not limited to, seed genetics; anonymity of buyer/sellers; regulatory issues; cancellation of transactions; supply of products; payment; taxes; shipping; returns and claims; shilling; and privacy and security. By activating an "I Accept" button (not shown), a buyer's/seller's acceptance of the intermediary's user agreement is submitted to the intermediary.

Figure 10C:
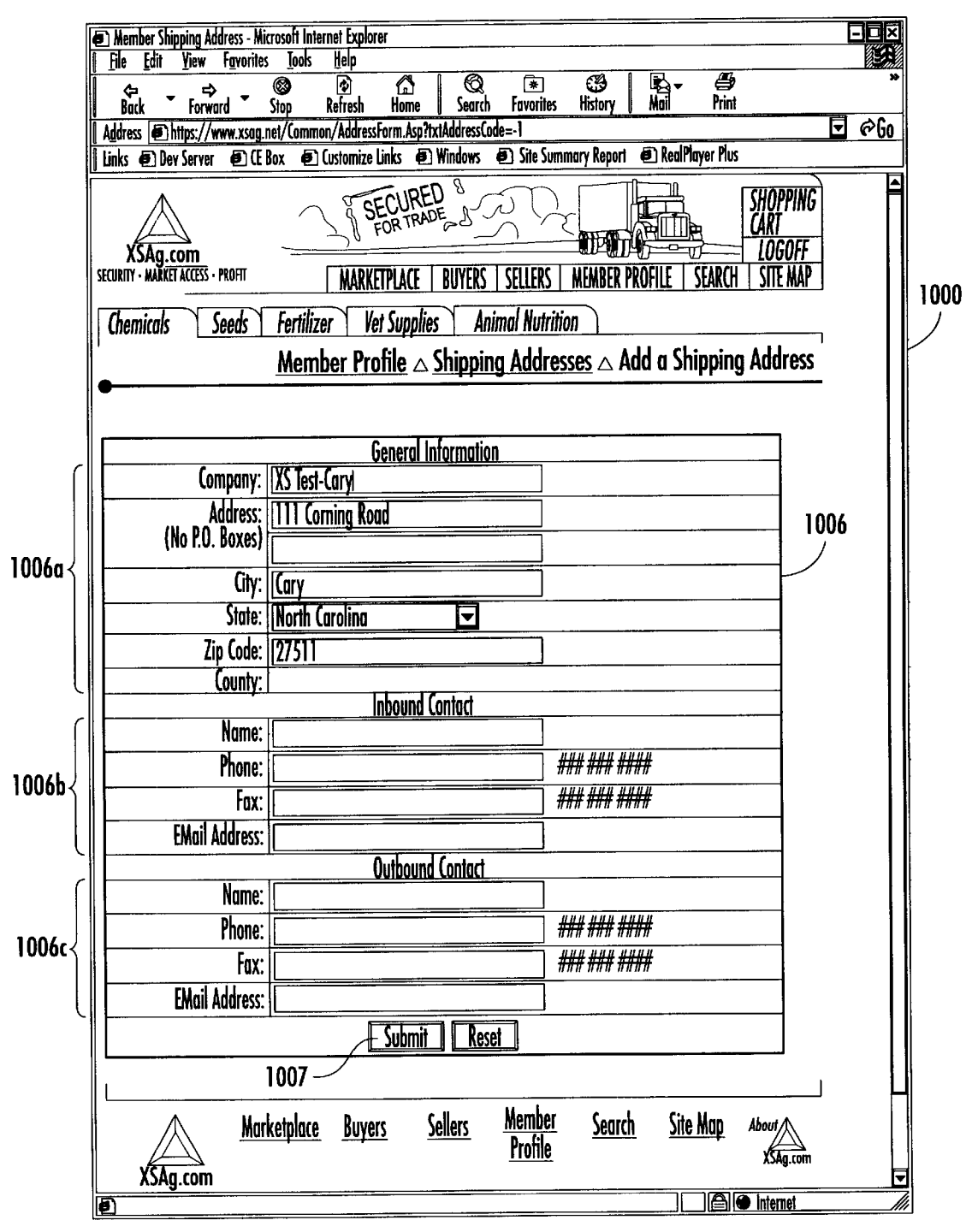

Using the illustrated form 1006 of FIG. 10C, a buyer/seller provides the intermediary with various shipping information including, but not limited to, buyer/seller name and address 1006a, and shipping contacts for inbound and outbound products 1006b, 1006c. By activating the "Submit" button 1007, the information within the form 1006 is submitted to the intermediary.

Figure 10D:
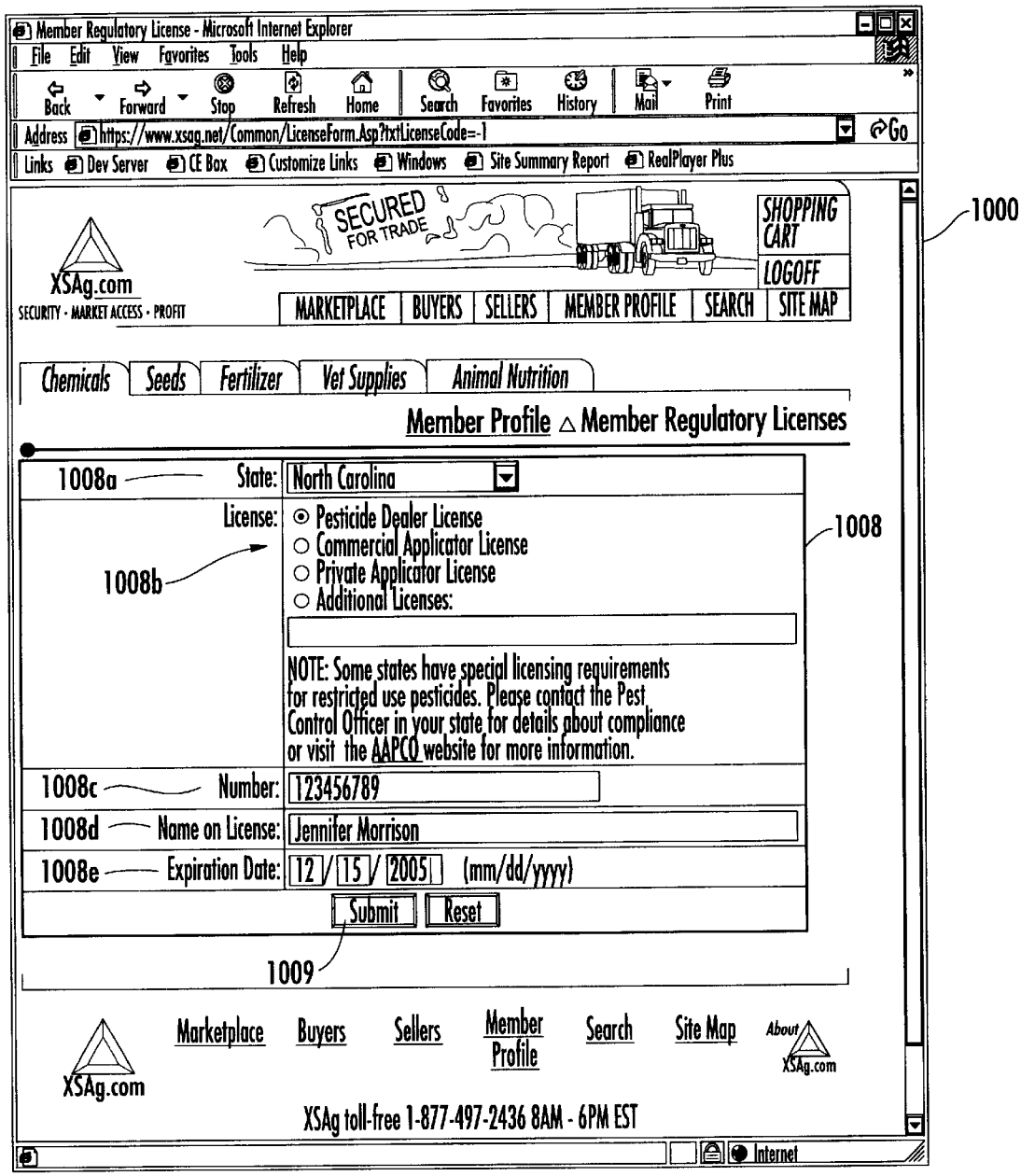

Using the illustrated form 1008 of FIG. 10D, a buyer/seller provides the intermediary with information regarding licenses issued to the buyer/seller by regulatory authorities. For each regulatory license issued to the buyer/seller, the buyer/seller identifies the license type (via "license" radio buttons 1008b), the license number (via "number" field 1008c), and the state or other jurisdiction (via "state" field 1008a) within which the license was issued. The illustrated form 1008 also requests that a buyer/seller identify the name (via "name" field 1008d) to whom the license was issued, and an expiration date of the license (via "date" field 1008e). By activating the "Submit" button 1009, the information within the form 1008 is submitted to the intermediary and stored within the production database (16b, FIG. 1).

Figure 10E:
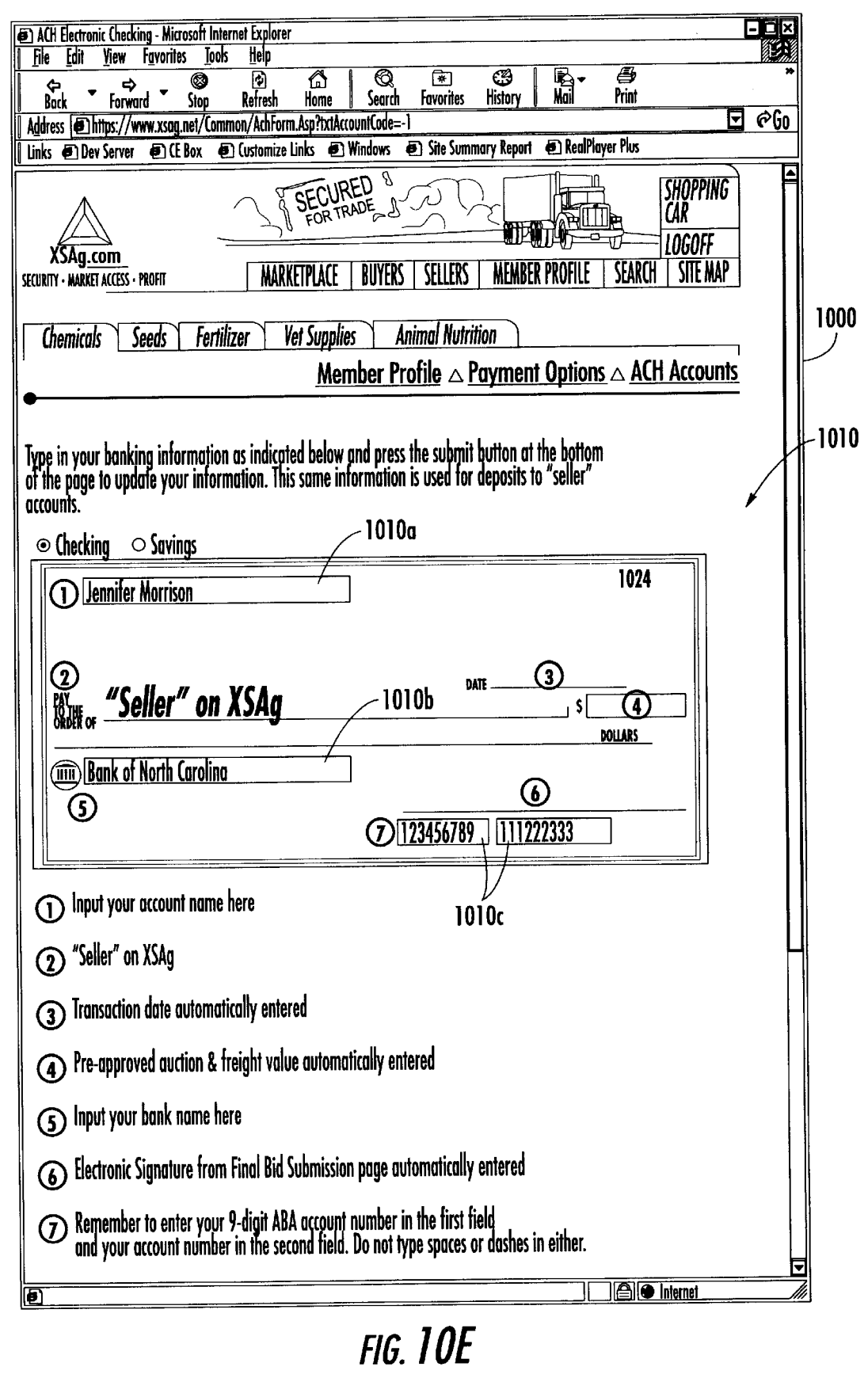

Using the illustrated form 1010 of FIG. 10E, a buyer/seller provides the intermediary with information about a financial account with a bank (or other financial institution) into and/or out of which funds can be transferred (depending on whether one is a buyer or seller). The illustrated form 1010 includes a "name" field 1010a in which the buyer/seller provides his/her name. The illustrated form also includes a "bank name" field 1010b and "account number" fields 1010c. By activating a "Submit" button (not shown), the information within the form 1010 is submitted to the intermediary. Various types of financial accounts may be utilized in accordance with the present invention. In addition, credit cards, debit cards, and other financial instruments may be utilized.

Figure 10F:
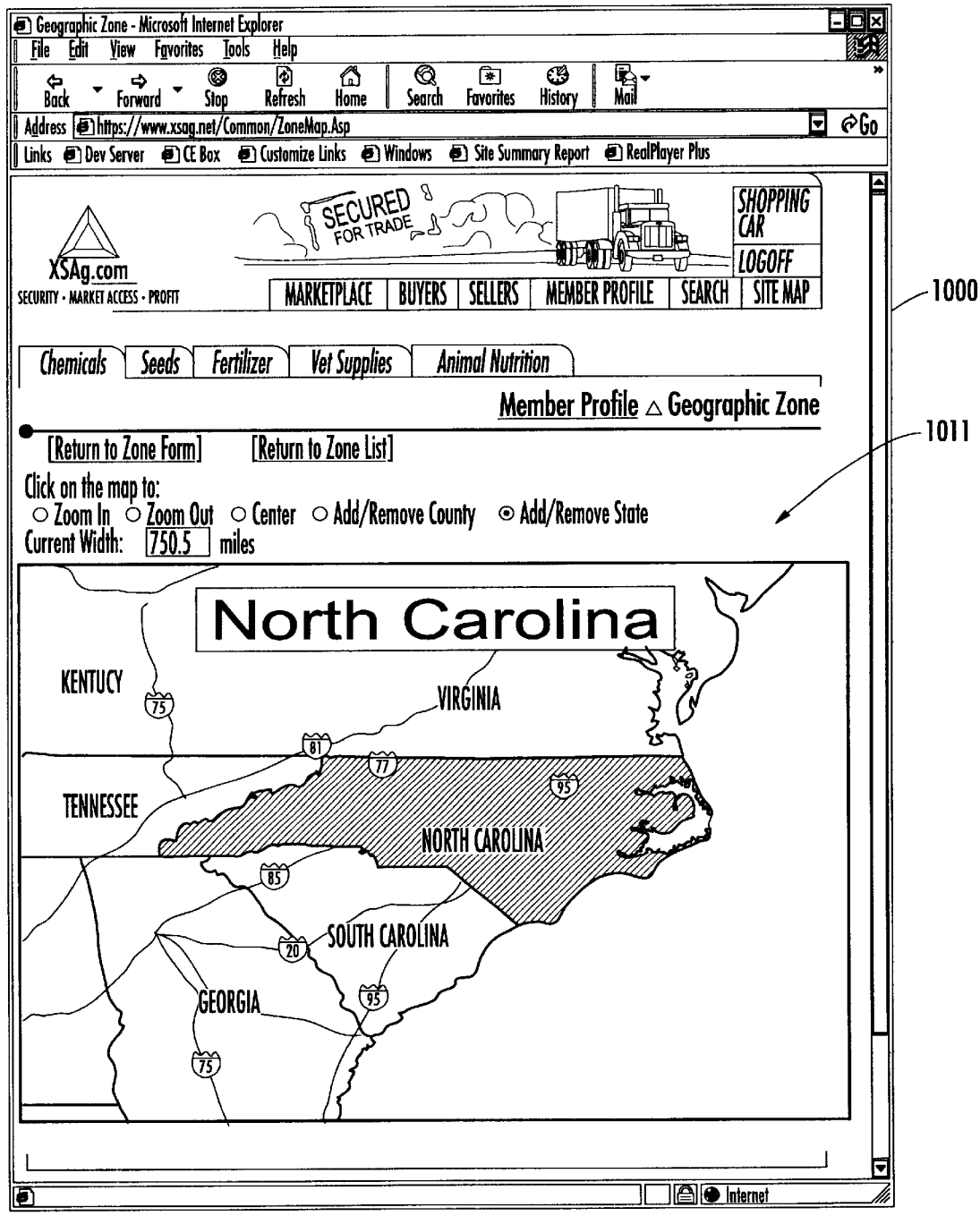

Using the illustrated form 1011 of FIG. 10F, a seller provides the intermediary with various geographic-oriented information. For example, a seller can designate counties (or other geographic/jurisdictional entities) in which the seller will deliver regulated goods for free. As another example, a seller can designate counties (or other geographic/jurisdictional entities) in which the seller will not sell specific regulated goods. The illustrated form 1011 of FIG. 10F illustrates selected counties within the state of North Carolina.

Figure 11:
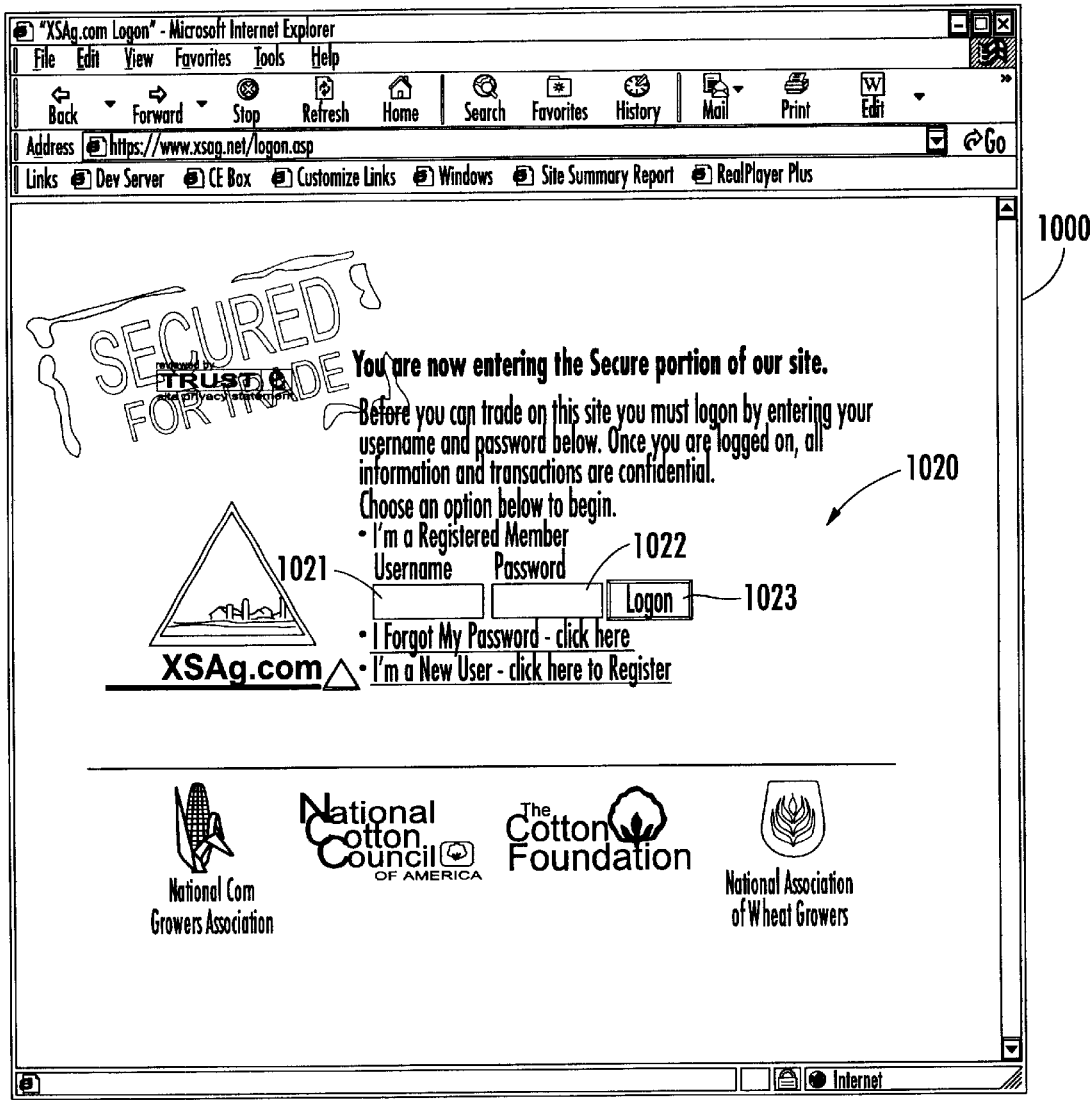
FIG. 11 illustrates an exemplary HTML login page for accessing the computer system of FIG. 1, wherein the login page is displayed within a Web browser interface and has a username field and password fields.

Once registered with the intermediary, a buyer/seller is permitted to enter into a secure area of the Web site (12, FIG. 1) to participate in auctions and perform other transactions by "logging in" with a username and password. FIG. 11 illustrates an exemplary logon page 1020 displayed within a Web browser interface 1000 and having a username field 1021 and password field 1022. By activating the "Logon" button 1023, a username and password provided by a buyer/seller is submitted to the Web site and validated using information contained within the production database (16b, FIG. 1).

Listing Items for Sale

FIGS. 12A–12D and FIGS. 13A–13D illustrate exemplary HTML forms displayed within a Web browser interface 1000 that allow sellers to post listings of products for sale via the intermediary's Web site. The forms in FIGS. 12A–12D illustrate listing a product for sale at a fixed sales price, according to an embodiment of the present invention. The forms in FIGS. 13A–13D illustrate listing a product for sale via an auction, according to another embodiment of the present invention.

Figure 12A:
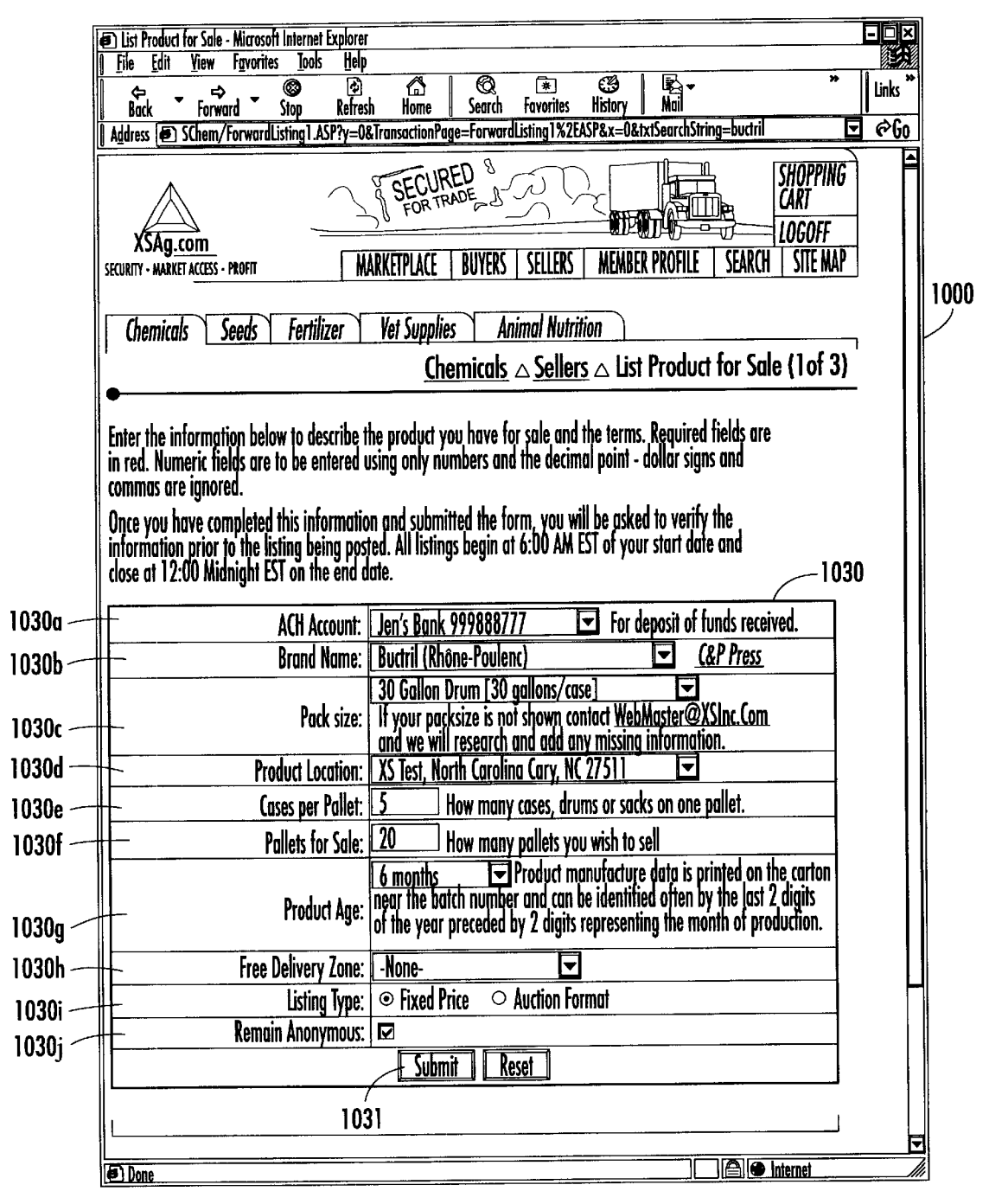

Using the illustrated form 1030 of FIG. 12A, a seller provides the intermediary with information about regulated goods that the seller wishes to offer for sale at a fixed price. The illustrated form 1030 includes the following fields in which a buyer/seller provides information:

1) an "ACH account" field 1030a in which a seller identifies an account into which funds can be transferred from a buyer;
2) a "brand name" field 1030b in which a seller identifies the brand name of a product being listed for sale;
3) a "packsize" field 1030c in which a seller identifies a unit quantity of the product being listed for sale;
4) a "product location" field 1030d that identifies where the product offered for sale is located;
5) a "cases per pallet" field 1030e that identifies how many cases, drums or sacks of the product can fit on a single, standard-size pallet;
6) a "pallets for sale" field 1030f that identifies how many pallets of the product the seller wishes to sell;
7) a "product age" field 1030g that identifies the date of manufacture of the product;
8) a "free delivery zone" field 1030h that identifies locations where delivery is free to a buyer;
9) "listing type" radio buttons 1030i that allow a seller to specify whether the product is to be sold at a fixed price or via auction; and
10) a "remain anonymous" checkbox 1030j that allows a seller to indicate that he/she wishes to remain anonymous to others.

By activating the "Submit" button 1031, the information within the form 1030 is submitted to the intermediary.

Figure 12B:

Referring now to the illustrated form 1032 of FIG. 12B, the information provided within the form 1030 of FIG. 12A is indicated in the upper portion 1034 of the form 1032. In the lower portion 1036 of the form 1032, a seller provides the intermediary with additional information regarding price, location and quantity of the regulated goods offered for sale. A seller can set price and geographic restrictions with respect to sales to various market segments and channels. For example, as indicated in FIG. 12B, a seller can set price and geographic restrictions with respect to sales to agricultural growers and agricultural chemical dealers. With respect to agricultural growers, a seller can indicate in the "price" field 1036a the price at which the seller wishes to sell a product. In addition, a seller can indicate in the "zone" and "zone exclude/allow" fields 1036b, 1036c any geographical limitations on sales to agricultural growers. For example, a seller could indicate that sales are to be excluded from agricultural growers located in certain counties of New Mexico.

Similarly, with respect to agricultural chemical dealers, a seller can indicate in the "price" field 1036d the price at which the seller is willing to sell the regulated goods to chemical dealers. In addition, a seller can indicate in the "zone" and "zone exclude/allow" fields 1036e, 1036f geographical limitations that are to be imposed on sales to agricultural chemical dealers. A seller can also indicate in the "minimum purchase" field 1036g the minimum number of pallets of a product that the seller is willing to sell in one order. By activating the "Submit" button 1037, the information within the lower portion 1036 of the form 1032 is submitted to the intermediary.

A complete listing of the information provided by a seller within the lower portion 1036 of form 1032 of FIG. 12B and within form 1030 of FIG. 12A is provided via form 1038 of FIG. 12C.

Referring now to FIG. 12D, a certification form 1040 that the intermediary requires a seller to "sign" prior to posting a listing of regulated goods for sale is illustrated. By "signing" the illustrated certification form 1040, a seller is certifying that certain requirements and conditions have been met. For example, an upper portion 1042 of the illustrated certification form 1040 requires a seller to certify that the regulated goods being sold are packaged in unopened, original manufacturer's cartons and containers, that the regulated goods exactly match the specifications on the regulated goods listing that is to be made available to buyers via the intermediary's Web site (12, FIG. 1), that the regulated goods are not more than six months old, and that the regulated goods are correctly labeled. In addition, the illustrated certification form 1040 warns a seller that if regulated goods are misrepresented in any material way, the seller may be barred from using the intermediary's Web site to sell and buy regulated goods in the future.

An intermediate portion 1044 of the illustrated certification form 1040 requires a seller to certify that the intermediary, or a third party financial institution, is authorized to transfer funds into an account identified by the seller. A lower portion 1046 of the illustrated certification form 1040 requires a seller to certify that regulatory license information provided by the seller is valid and accurate. By activating the "Submit" button 1047, the seller "signs" or certifies that the requirements and conditions set forth in each portion of the certification form 1040 have been met.

Figure 12E:
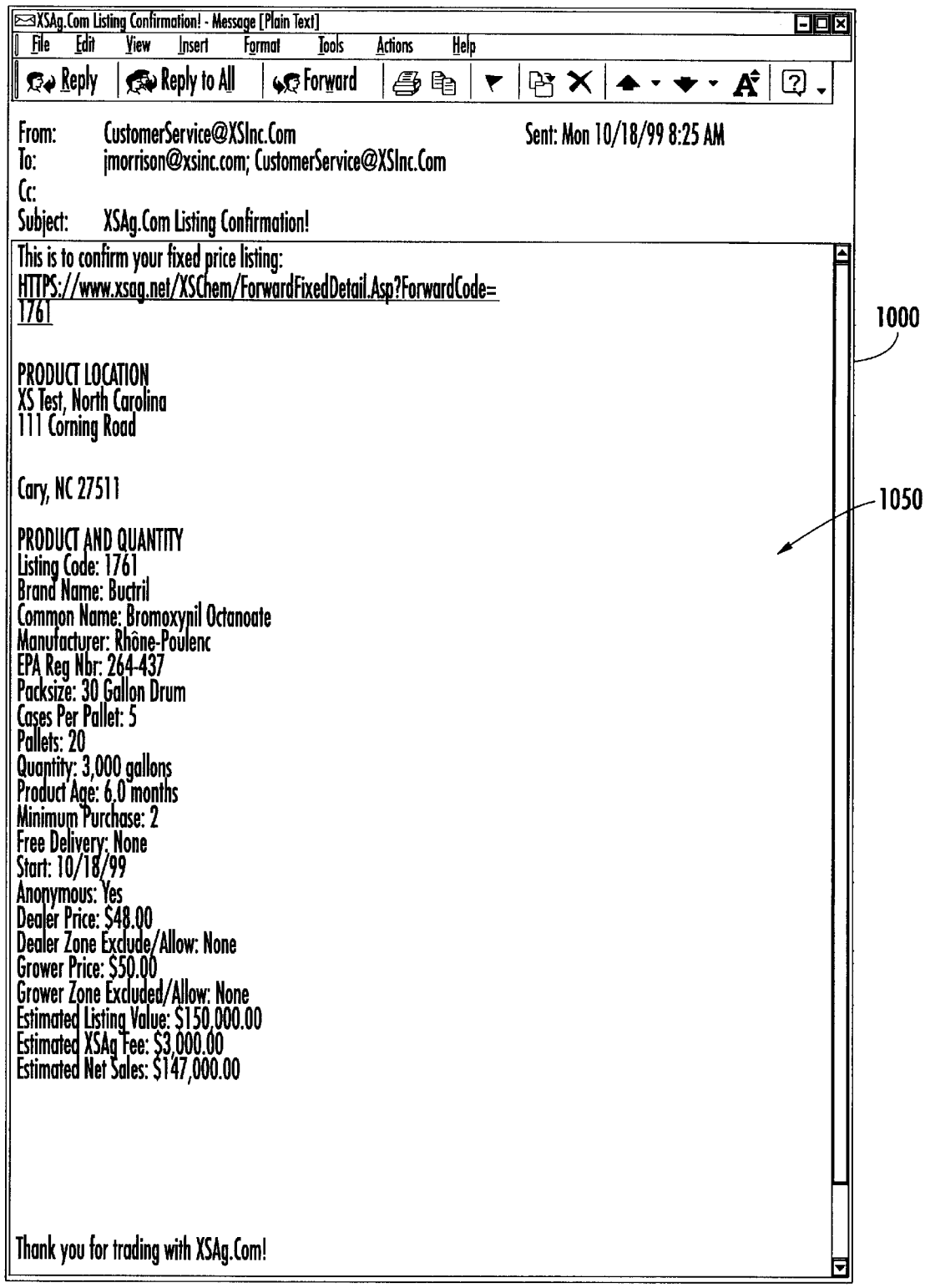
FIG. 12E is an e-mail notification to a seller confirming a fixed price listing of regulated goods for sale according to the present invention.

Upon receiving a listing from a seller for regulated goods for sale and upon receiving certification that all conditions and requirements are met, the intermediary may submit a confirmation notice 1050 to the seller via e-mail as illustrated in FIG. 12E. The illustrated confirmation notice 1050 provides a record of all information provided by the seller to the intermediary that can be stored in the production database (16b, FIG. 1) for later access.

Figure 13A:
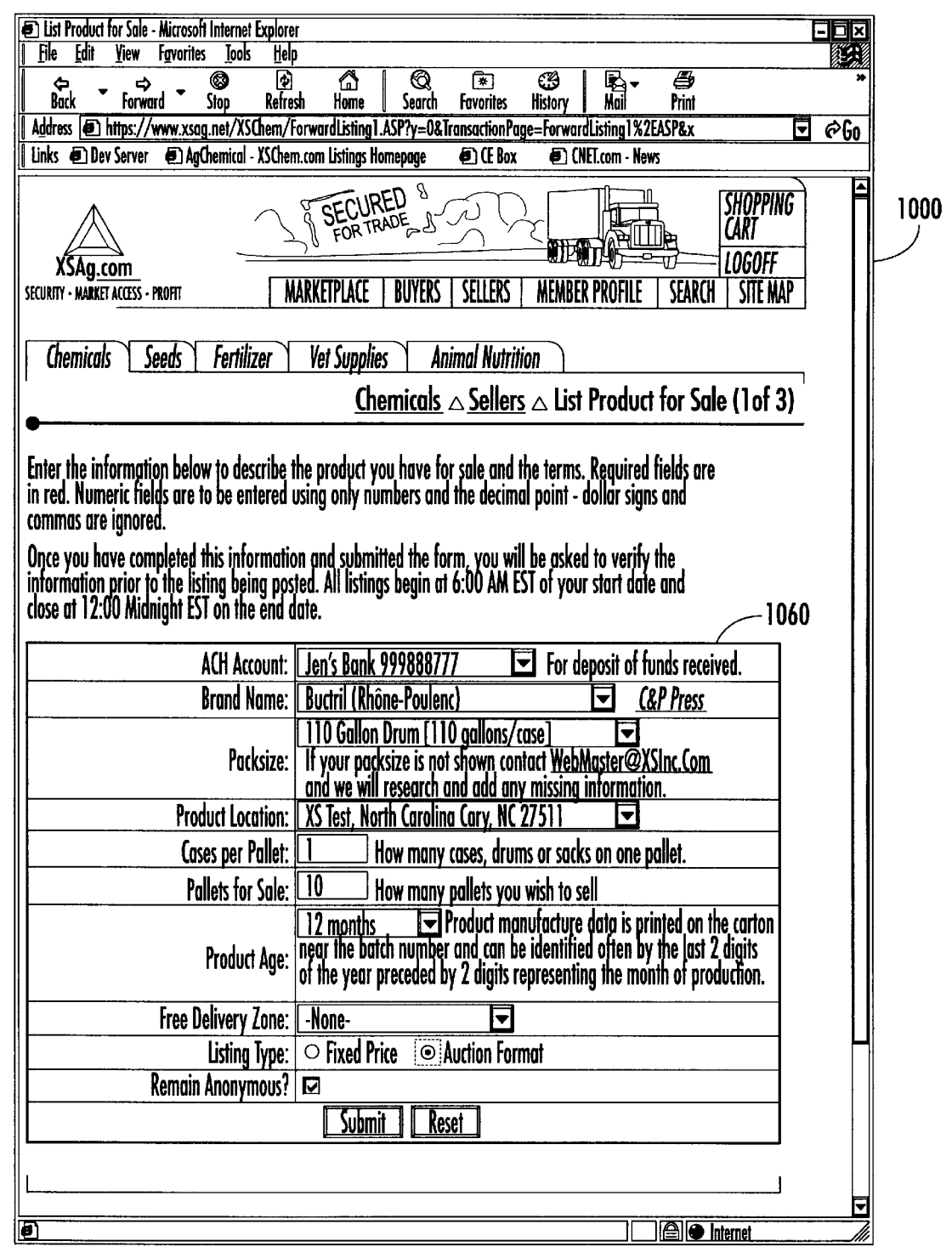
Figure 13D:
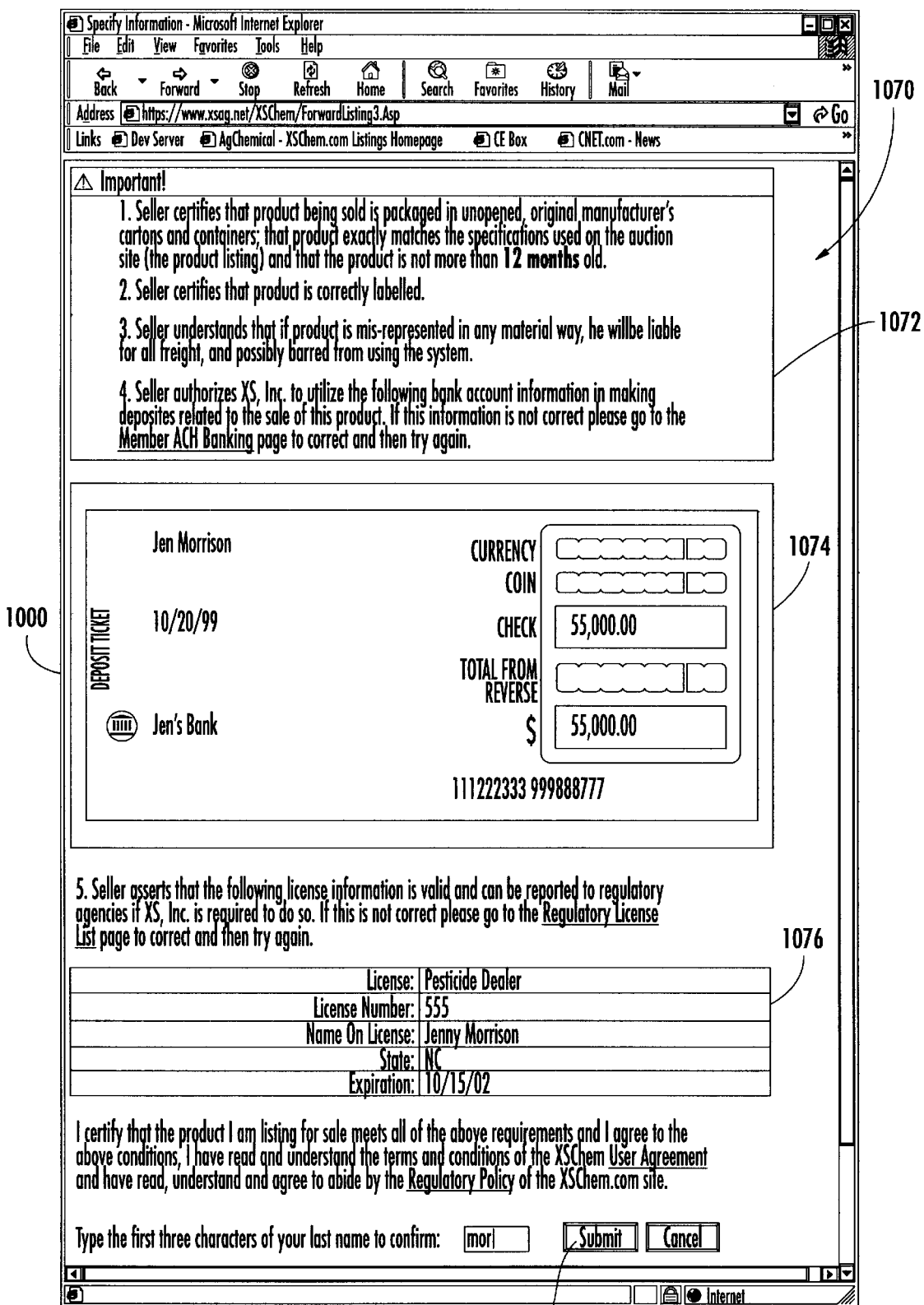

The forms in FIGS. 13A–13D illustrate an exemplary process for posting a listing of regulated goods for sale via an auction, according to another embodiment of the present invention. The illustrated form 1060 in FIG. 13A is similar to form 1030 in FIG. 12A in that a seller provides the intermediary with information about regulated goods the seller wishes to offer for sale. However, a seller indicates via radio buttons 1030i (FIG. 12A) that the sale is to be conducted via auction format.

The illustrated form 1062 of FIG. 13B is similar to the illustrated form 1032 of FIG. 12B in that the information provided within the form 1060 of FIG. 13A is indicated in the upper portion 1064 of the form 1062. In the lower portion 1066 of the form 1062, a seller provides the intermediary with additional information regarding price, location, and quantity (fields 1066a–1066e) as described above with respect to FIG. 12B. In addition, a seller can provide the intermediary with auction start and stop times via the "auction start" and "auction end" fields 1066f, 1066g.

In FIG. 13C, the information provided by a seller within the lower portion 1066 of form 1062 of FIG. 13B is listed along with the information provided by a seller in the form 1060 of FIG. 13A via form 1068. In FIG. 13D, a certification form 1070 that the intermediary requires a seller to "sign" is illustrated. As described above with respect to FIG. 12D, by "signing" the illustrated certification form 1070 (i.e., by activating the "Submit" button 1077), a seller is certifying that certain requirements and conditions have been met.

Figure 13E:
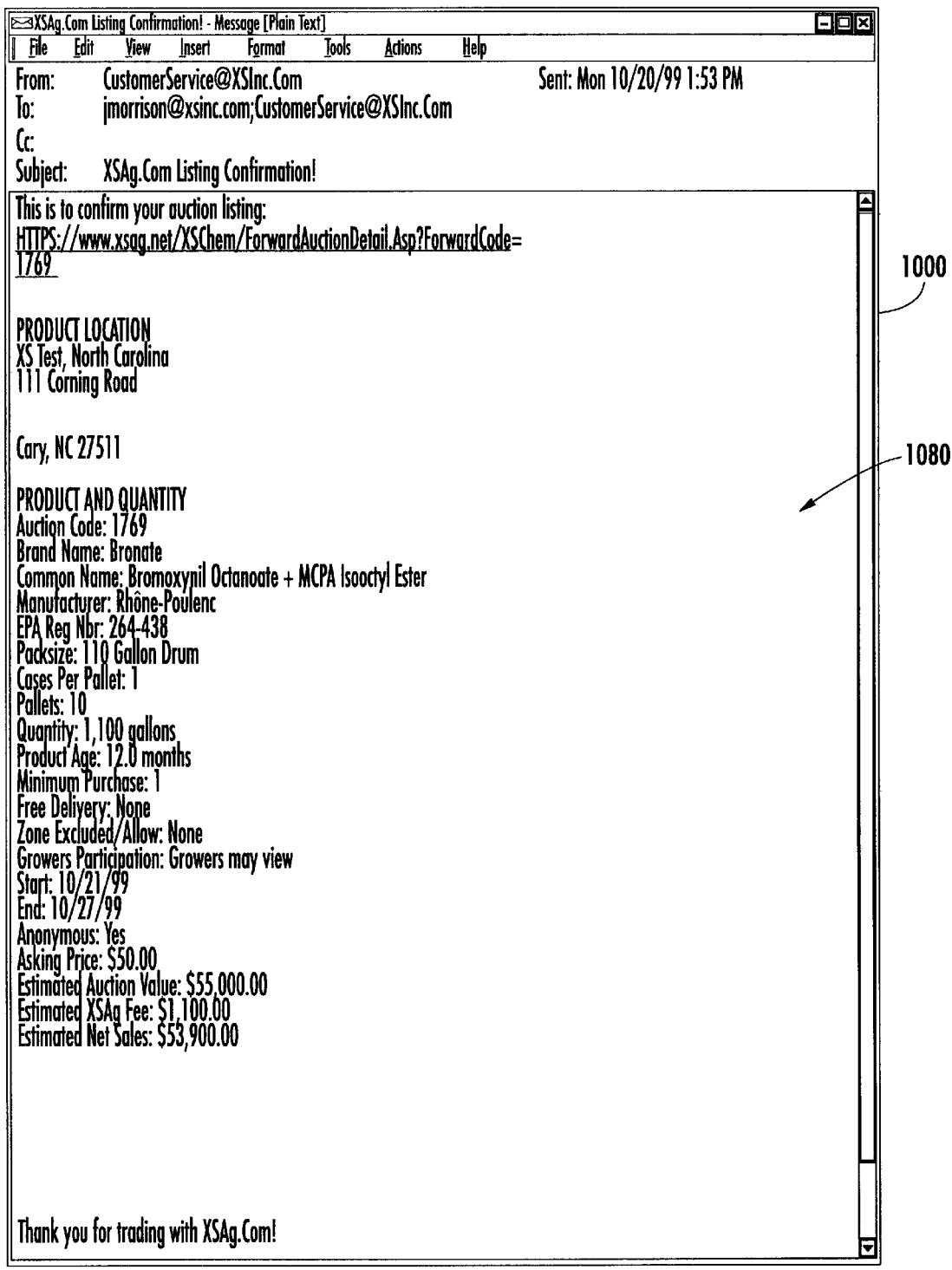
FIG. 13E is an e-mail notification to a seller confirming a listing of regulated goods for sale via auction according to the present invention.

Upon listing regulated goods for sale and certifying that all conditions and requirements are met, the intermediary may submit a confirmation notice 1080 to the seller via e-mail as illustrated in FIG. 13E. The illustrated confirmation page 1080 provides a record of information provided by the seller.

Purchasing Items for Sale (Fixed Price)

FIGS. 14A–14D illustrate exemplary HTML forms displayed within a Web browser interface 1000 that allow buyers to purchase, at a fixed price, regulated goods offered for sale via the intermediary's Web site. Using the upper portion 1102 of the illustrated form 1100 of FIG. 14A, a buyer can review information about regulated goods offered for sale. The illustrated fields include "Listing Code" 1102a; "Brand Name" 1102b; "Seller" 1102c; "Common Name" 1102d; "EPA Reg. Number" 1102e; "Product Age" 1102f; "Minimum Purchase" 1102g; "Inclusion/Exclusion Zone" 1102h; "Free Delivery Zone" 1102i; "Manufacturer" 1102j; "Packsize" 1102k; "Cases Per Pallet" 1102l; and "Price/Gallon" 1102m. As illustrated in the "seller" field 1102c, the seller's identity is not disclosed to potential buyers.

Using the lower portion 1104 of the illustrated form 1100 a buyer can enter the quantity of the regulated goods in the quantity field 1104a. A buyer also enters a location where the selected regulated goods are to be shipped via the "location" field 1104b. A buyer also selects a payment option via the "payment option" field 1104c. Because each buyer "logs-in" with the intermediary, the intermediary can display financial account information maintained on record by the intermediary.

Figure 14A:
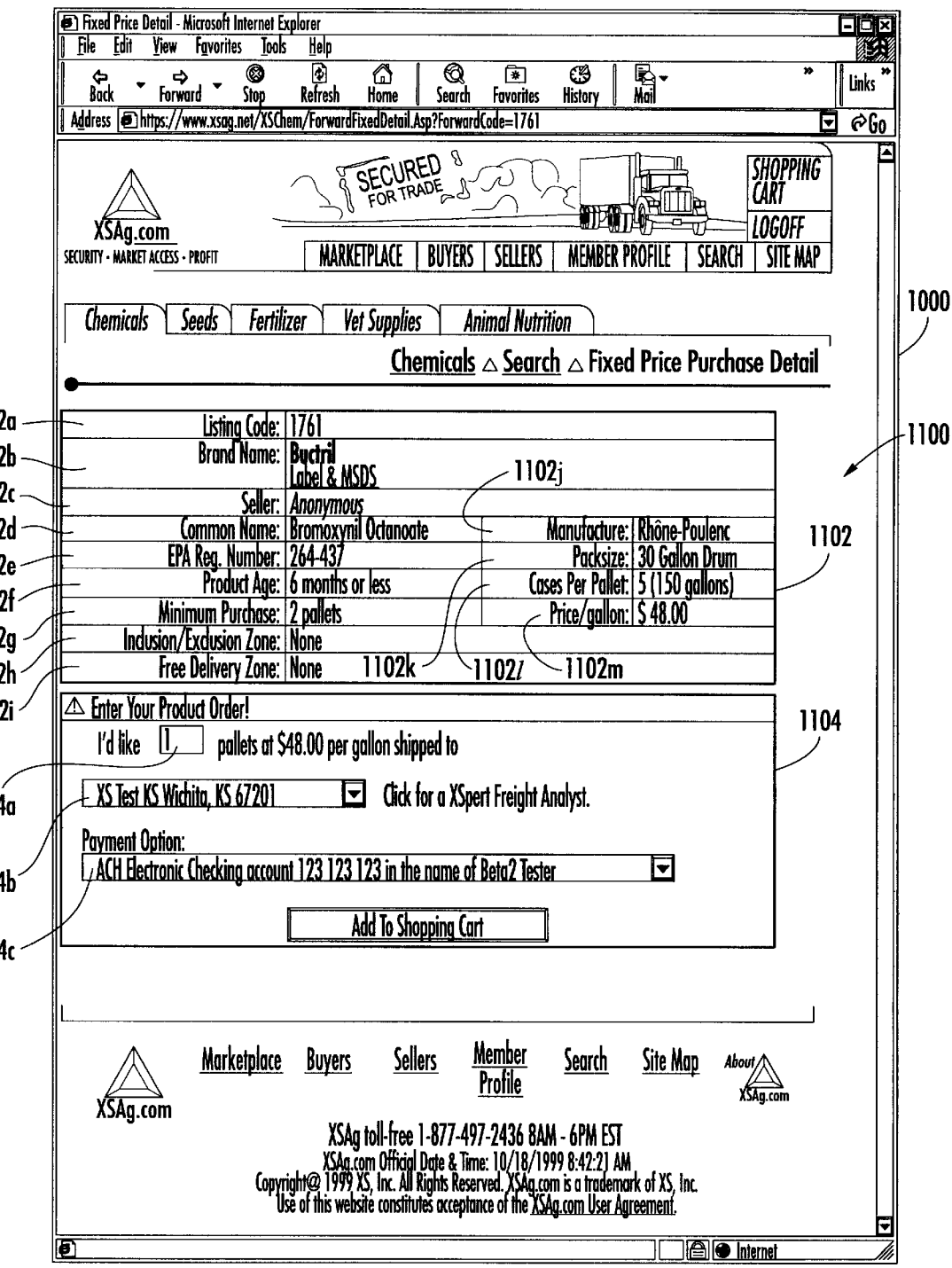
FIGS. 14A–14D illustrate exemplary HTML forms displayed within a Web browser interface that allow buyers to purchase, at a fixed price, items offered for sale via the computer system of FIG. 1.
Figure 14B:
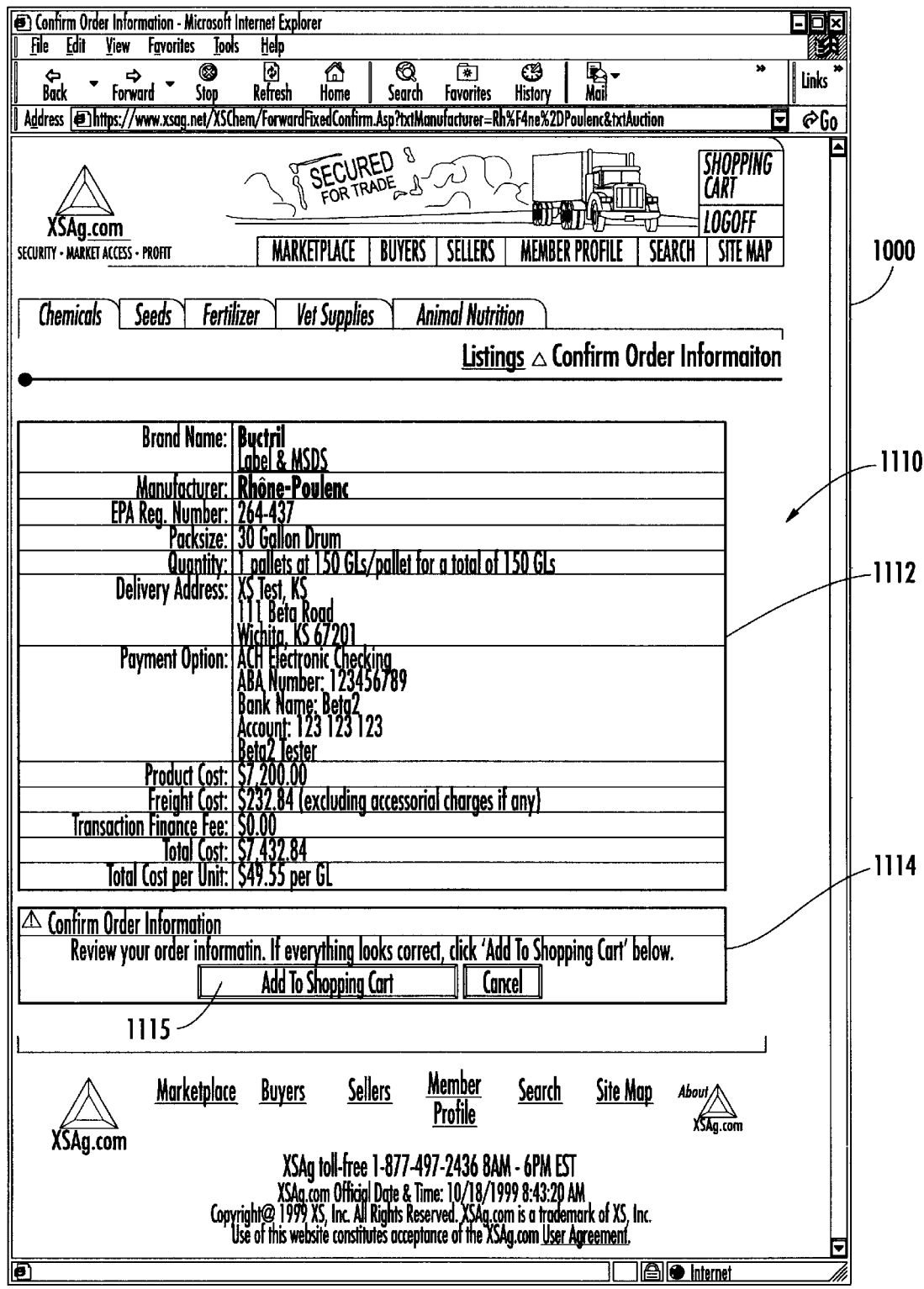

FIG. 14B illustrates a confirmation form 1110 that can be reviewed by a buyer before the buyer's purchase offer is submitted to the seller. By activating the "Add To Shopping Cart" button 1115 in the lower portion 1114 of the form 1110, a buyer confirms that the information in the upper portion 1112 of the form 1110 is correct.

Figure 14C:
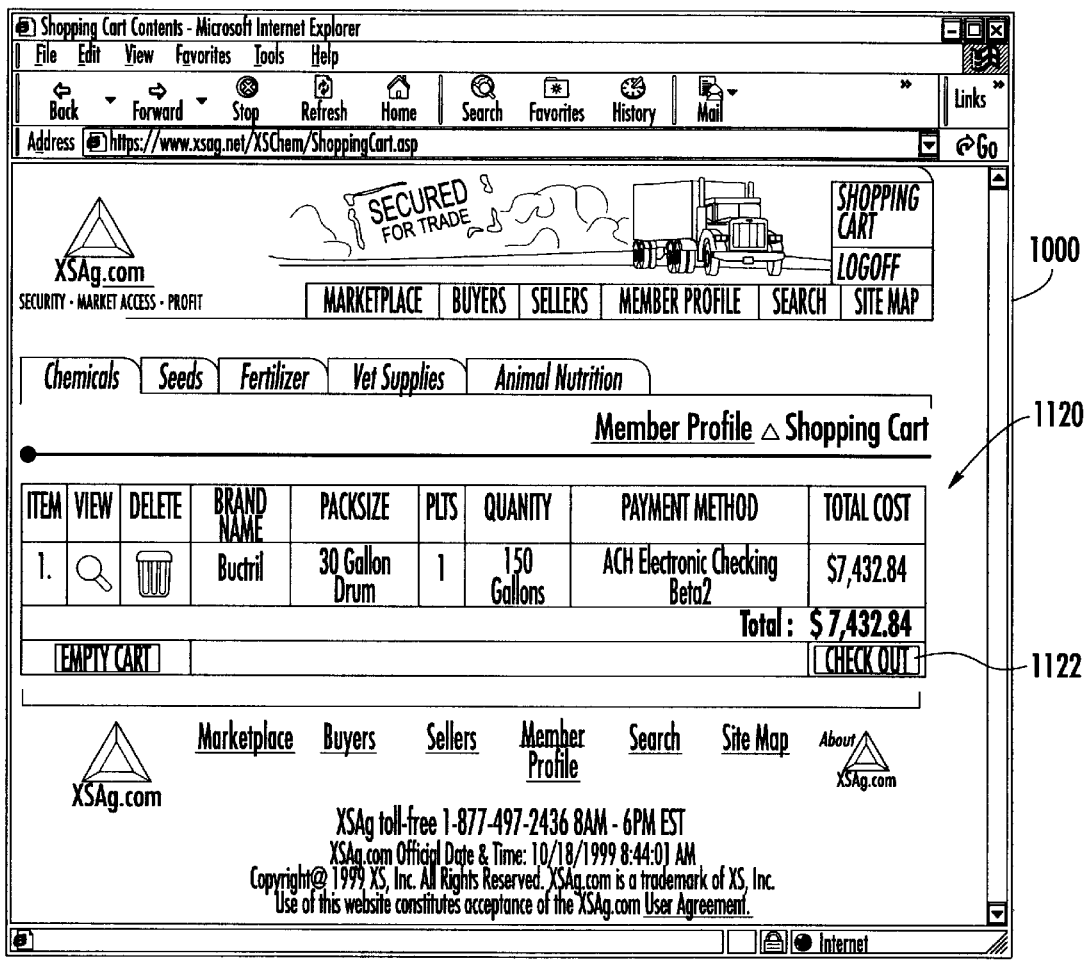
Figure 14D:
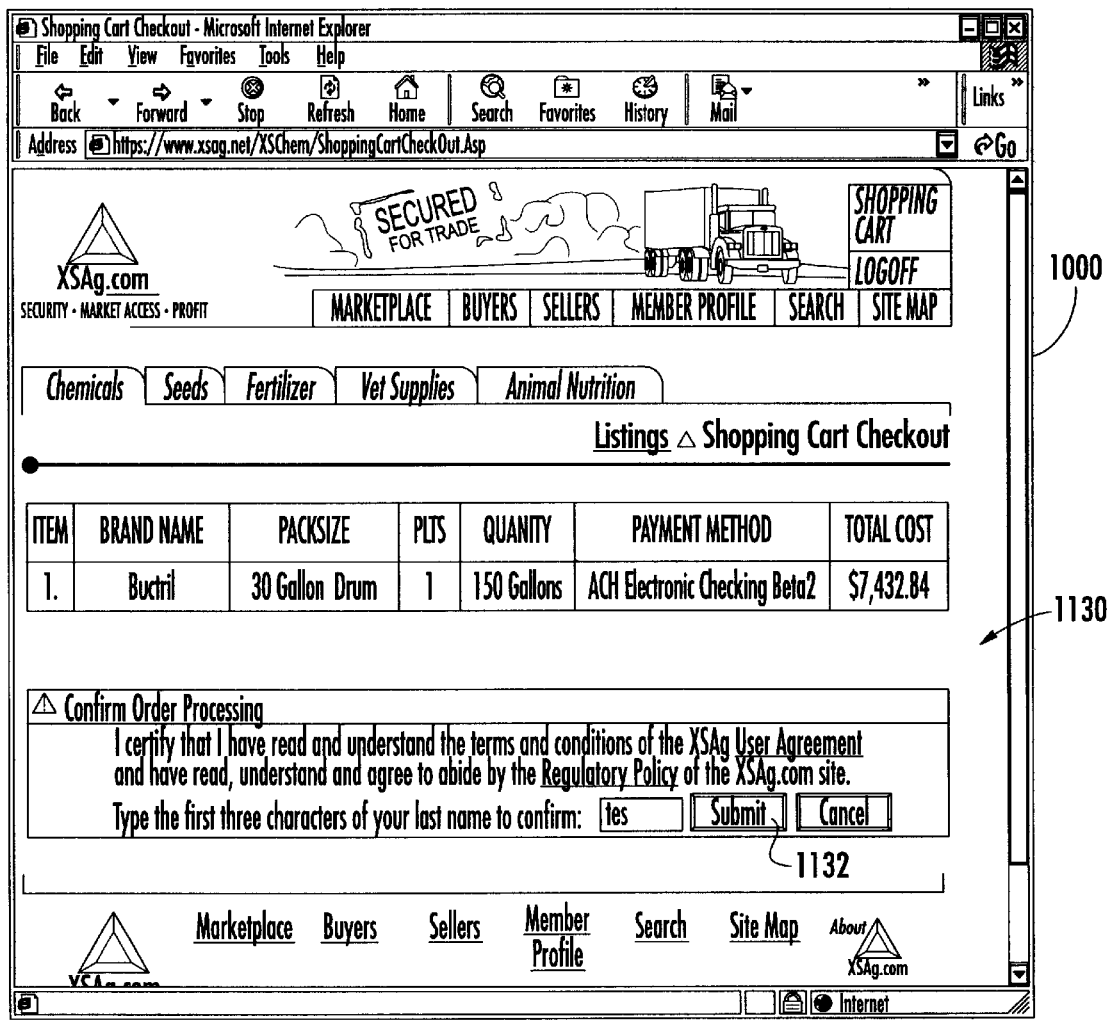

FIG. 14C illustrates a "shopping cart" form 1120 for a particular buyer indicating regulated goods that the buyer has selected for purchasing at the fixed price. As is understood by those of skill in the art of electronic commerce ("e-commerce"), a shopping cart is a tracking device that is used to calculate prices and store product information for later purchase. The illustrated shopping cart form 1120 allows a buyer to add, remove, or modify the quantity of an item "placed" in the "cart." In addition, the illustrated shopping cart form 1120 calculates the price of items and includes taxes and shipping costs. By activating the "Check Out" button 1122, a buyer can proceed to the check-out form 1130 illustrated in FIG. 14D. If the terms of the purchase appear to be in order, a buyer can activate the "Submit" button 1132 in the check-out form 1130 of FIG. 14D. By activating the "Submit" button 1132, the buyer "signs" or certifies that he/she is willing to be contractually bound to purchase the regulated goods.

Figure 14E:
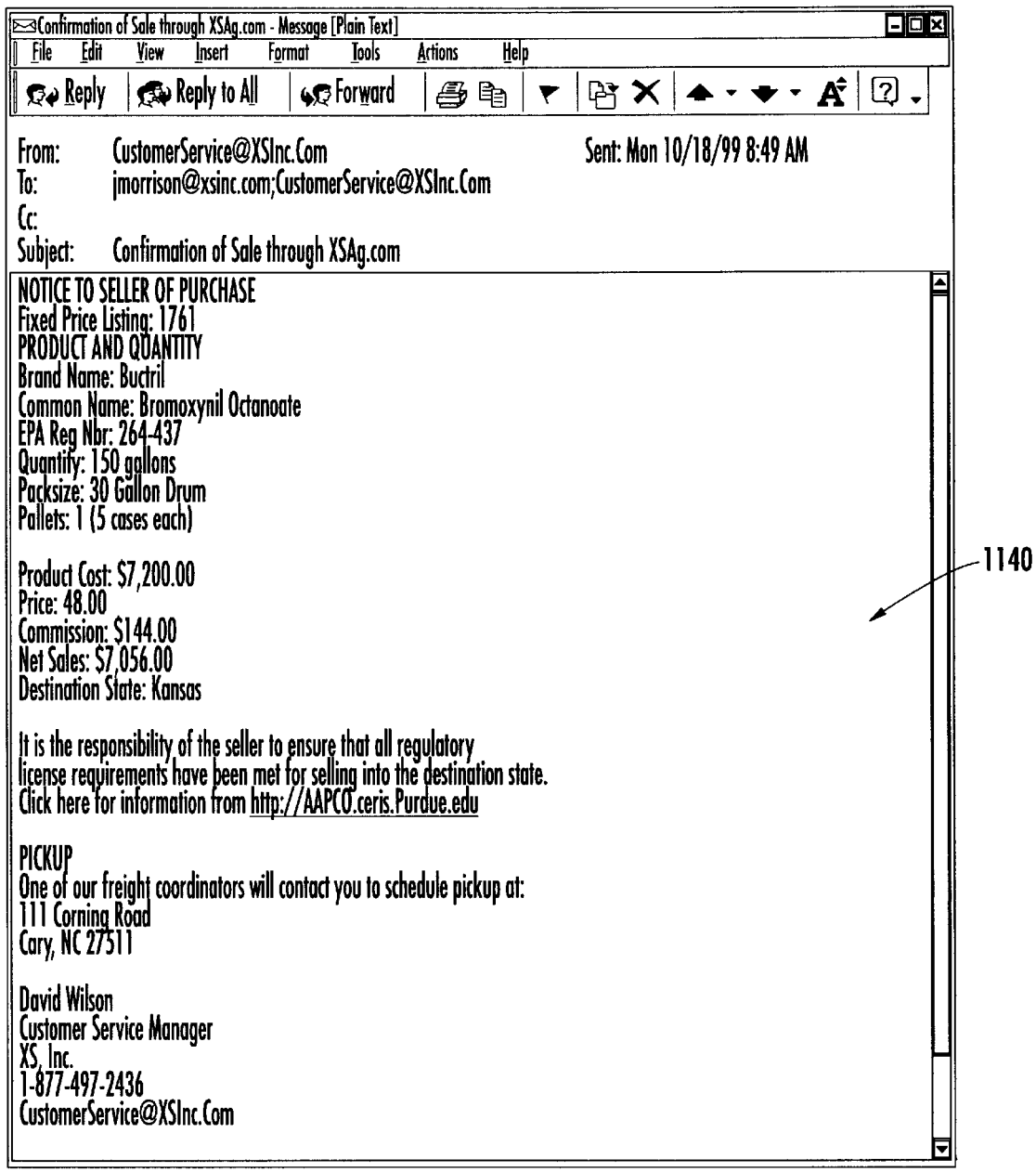
FIGS. 14E–14F illustrate e-mail notifications to a seller and buyer, respectively, confirming a sale of regulated goods, according to the present invention.
Figure 14F:
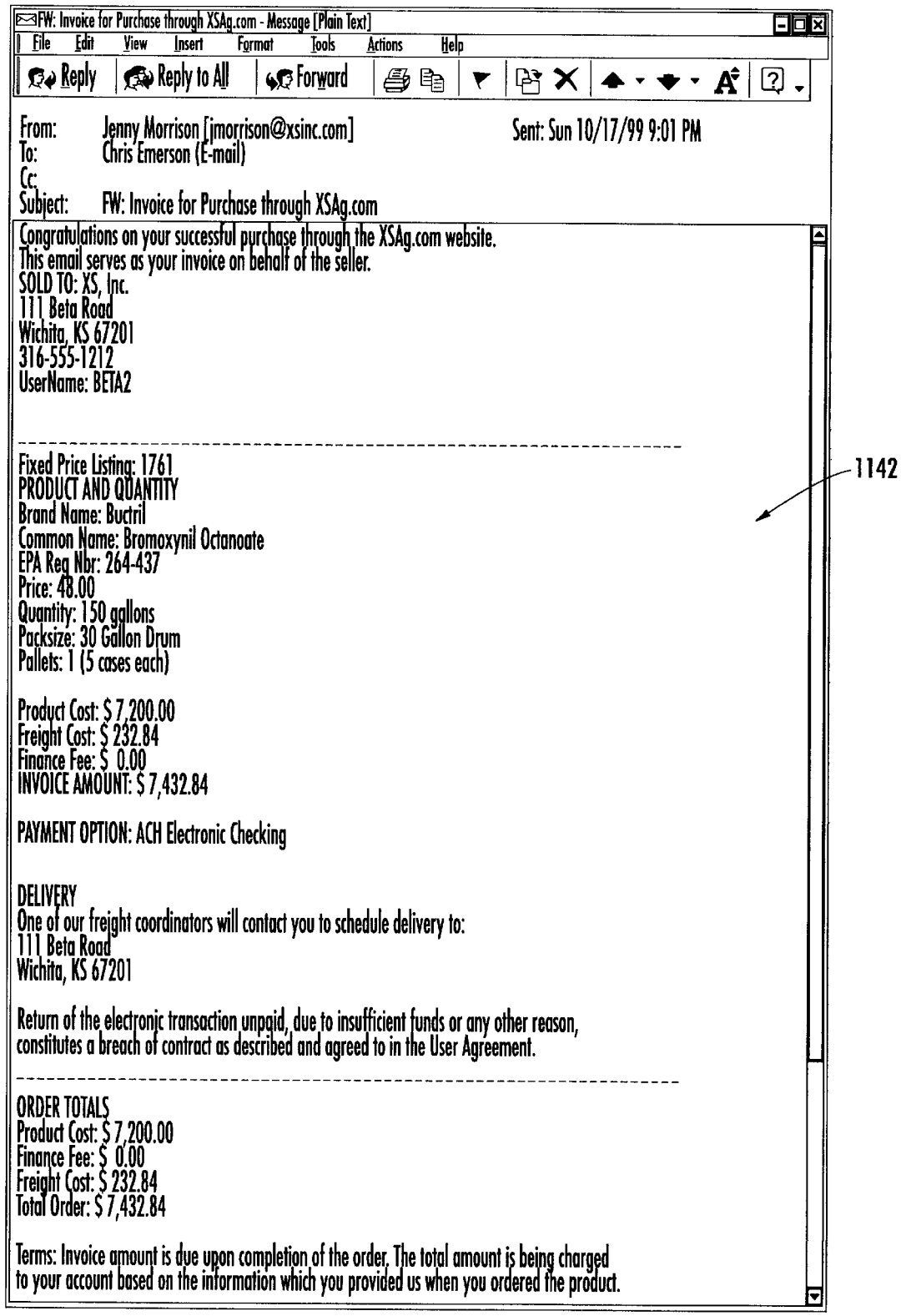

At this point, the intermediary initiates a transfer of funds from an account of the buyer to an account of the intermediary and initiates delivery of the regulated goods from the seller to the buyer. Once the buyer accepts the delivered goods, the intermediary initiates the transfer of funds from the intermediary to the seller as described above with respect to FIGS. 8 and 9. In addition, the Intermediary can notify the seller and the buyer via e-mail or via other communication methods that the sale is confirmed. FIGS. 14E and 14F illustrate e-mail notifications 1140, 1142 to a seller and buyer, respectively, confirming a sale.

Purchasing Items for Sale (Auction Format)

FIGS. 15A–15D illustrate exemplary HTML forms displayed within a Web browser interface 1000 that allow potential buyers to bid on regulated goods offered for sale in an auction format via an intermediary's Web site. Using the upper portion 1202 of the illustrated form 1200 of FIG. 15A, a potential buyer can review information about particular regulated goods offered for sale. As illustrated in form 1200, the seller's identity is not disclosed to potential buyers.

Using an intermediate portion 1204 of the illustrated form 1200, a potential buyer can enter the quantity of the regulated goods in the quantity field 1204a, and a bid price the potential buyer is willing to pay in the bid price field 1204b. A potential buyer also enters a location where the selected item is to be shipped via "location" field 1204c.

As illustrated, a potential buyer can also indicate the minimum amount of the regulated goods offered sale that he/she will accept in the "minimum amount" field 1204d. A potential buyer can also select a payment option via the "payment option" field 1204e. Because each potential buyer "logs-in" with the intermediary, the intermediary can display financial account information maintained on record by the intermediary. As such, the potential buyer need only select a desired financial account from which funds are to be transferred should the potential buyer become the winning bidder for the regulated goods.

Figure 17:
FIG. 17 illustrates an exemplary HTML form containing a freight cost calculator according to an embodiment of the present invention.

A "freight cost calculator" can be accessed by activating the link entitled "XSpert Freight Analyst 1204f. FIG. 17 illustrates an exemplary form 1210 containing a freight cost calculator according to an embodiment of the present invention. A buyer or seller selects a destination location within the "shipped to" field 1210a and a freight cost calculator determines a shipping cost for the regulated goods of interest.

Figure 15A:
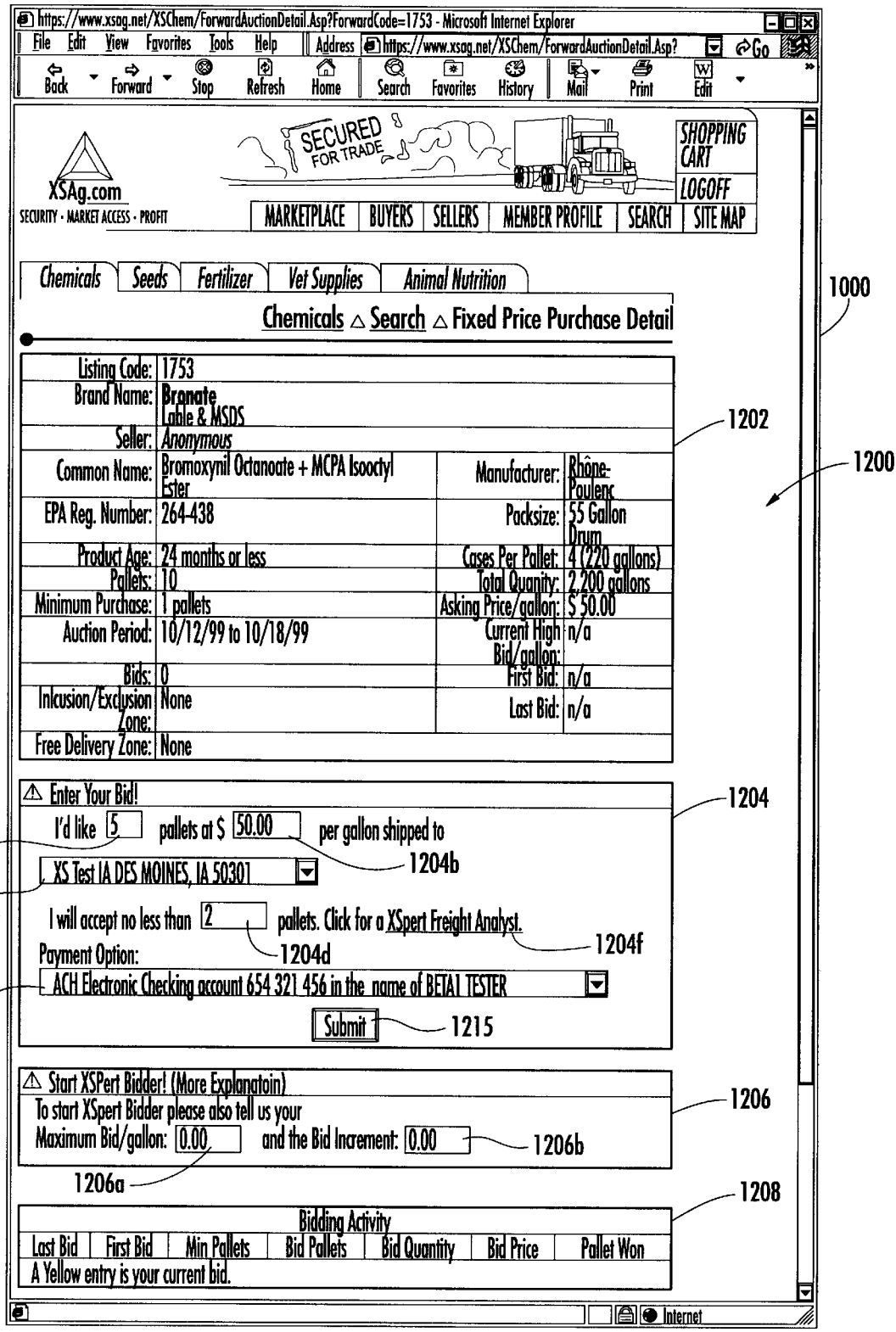

Upon activating the "Submit" button 1215 in the form 1200 of FIG. 15A, a potential buyer is presented with a confirmation form 1220 as illustrated in FIG. 15B. The illustrated confirmation form 1220 presents a potential buyer with a compilation of the information available from and provided in form 1200 of FIG. 15A. Upon activating the "Submit" button 1225 in the form 1220 of FIG. 15B, a potential buyer is presented with a second confirmation form 1230 as illustrated in FIG. 15C.

The second confirmation form 1230 requests the potential buyer to certify and confirm that the financial account and regulatory licensing information previously provided to the intermediary is correct. In the illustrated second confirmation form 1230, an image of a check 1232 drawn on a financial account for the amount of the potential buyer's bid is illustrated. In addition, a description, license number, and expiration date of the potential buyer's regulatory license for buying and using the regulated goods offered for sale is illustrated in a regulatory license portion 1234, of the illustrated second confirmation form 1230. Upon activating the "Submit" button 1235 in the second confirmation form 1230 of FIG. 15C, the potential buyer's bid is formally entered into an on-going auction. By activating the "Submit" button, the potential buyer "signs" or certifies that he/she is willing to be contractually bound to purchase the regulated goods should his/her bid become a winning bid.

Figure 15D:

Referring back to FIG. 15A, a lower portion 1208 of form 1200 provides an indication of bidding activities for the regulated goods. Referring now to FIG. 15D, bidding activity in the lower portion 1208 of form 1200 is displayed indicating that the potential buyer's submitted bid has been successfully added and that the potential buyer has won five pallets of the regulated goods at a bid price of fifty dollars ($50).

Purchasing Items for Sale (Reverse Auction Format)

FIGS. 18A–18I illustrate exemplary HTML forms displayed within a Web browser interface 1000 that allow buyers and sellers to participate in a reverse auction for regulated goods according to another embodiment of the present invention. Using the illustrated form 1300 of FIG. 18A, a buyer enters information about regulated goods that the buyer wishes to purchase including a price that the buyer is willing to pay. Illustrated information fields in which a buyer selects or enters information include a "Brand Name" field 1300a, a "Generic Substitute" radio button 1300b, a "Packsize" field 1300c, a "Ship to Address" field 1300d, a "Quantity Desired" field 1300e, a "Maximum Delivered Price/Unit" field 1300f, a "Payment Option" field 1300g, a "Maximum Product Age" field 1300h, and "Listing Start" and "Listing End" date fields 1300i, 1300j.

Figure 18A:
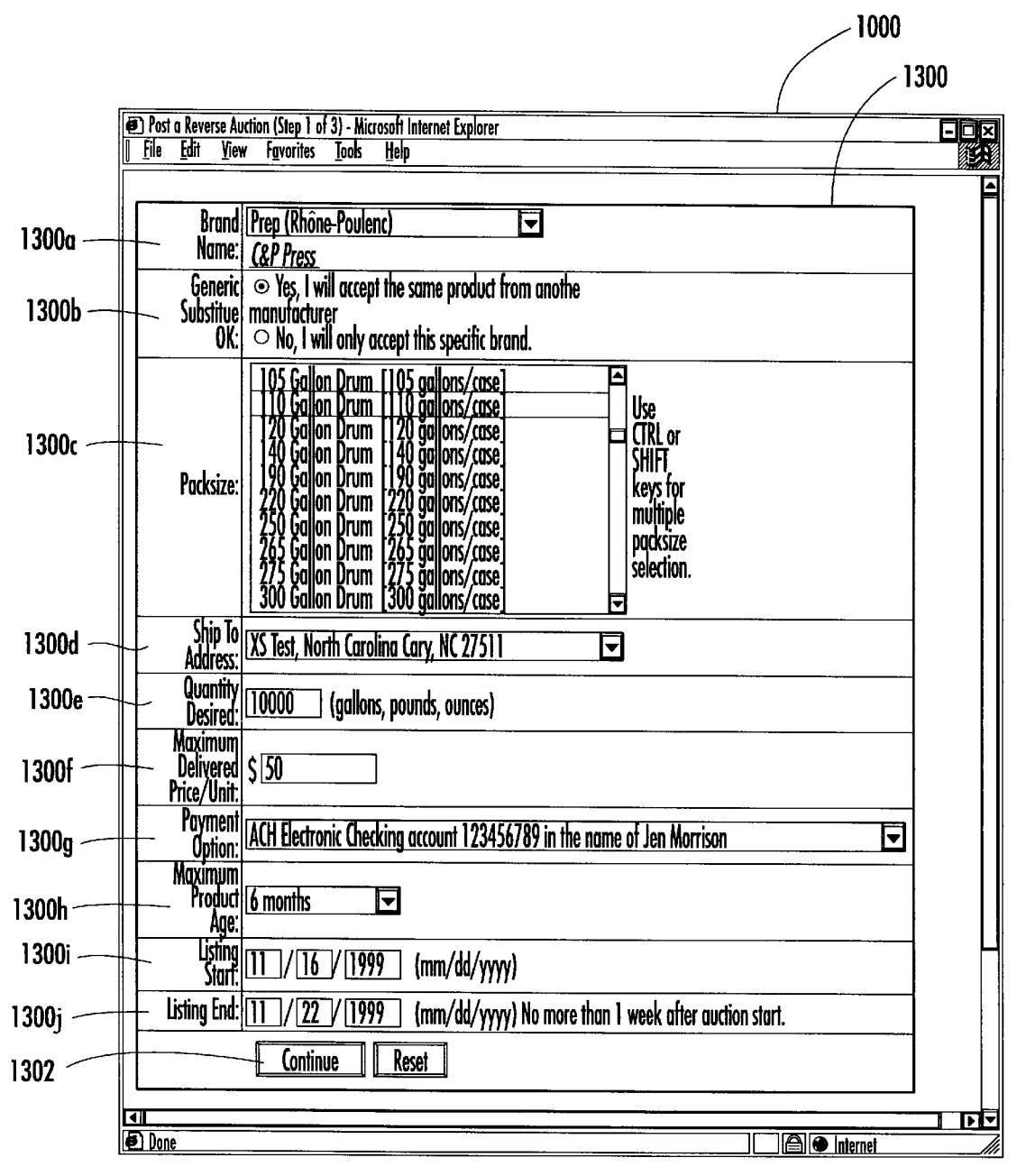
Figure 18C:
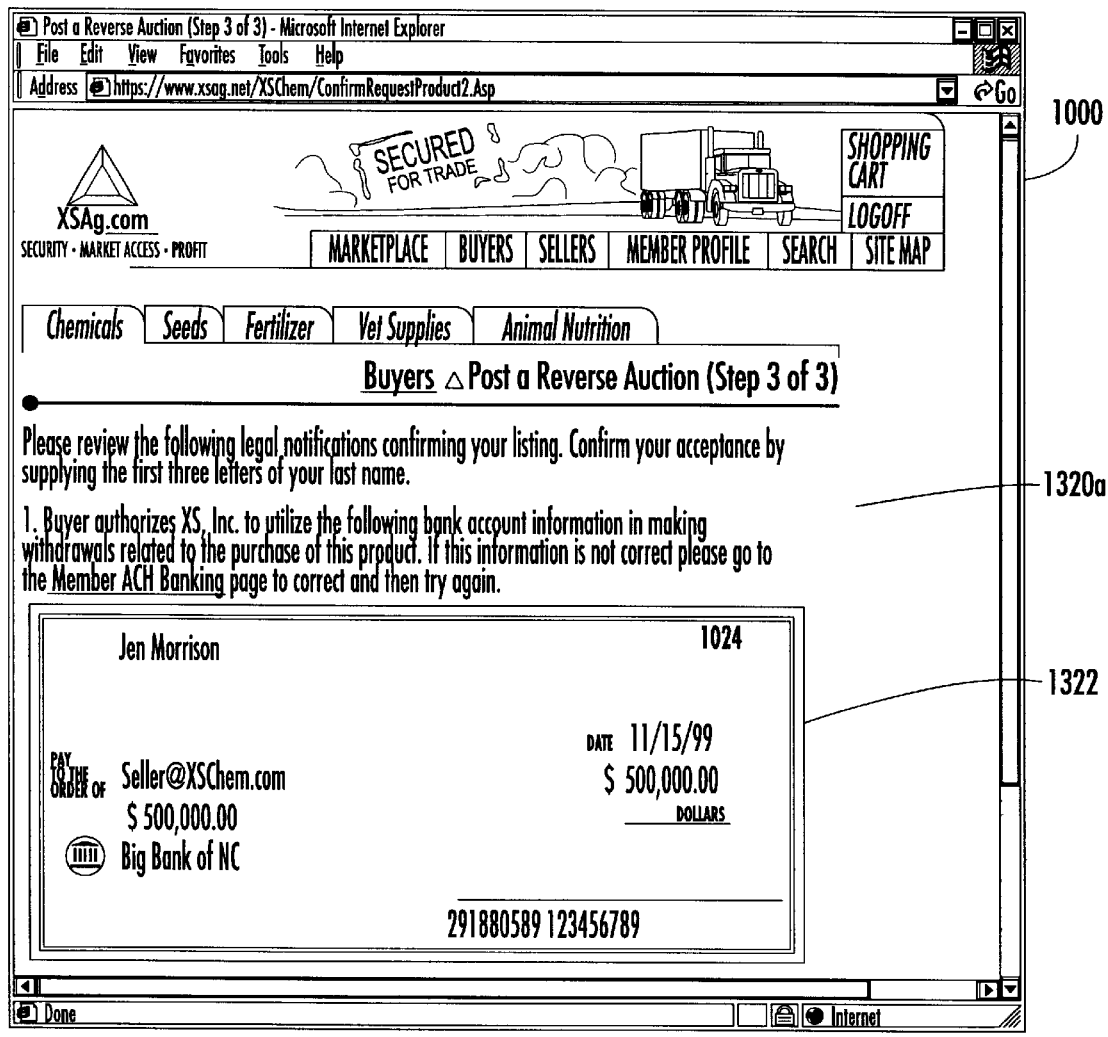
Figure 18D:
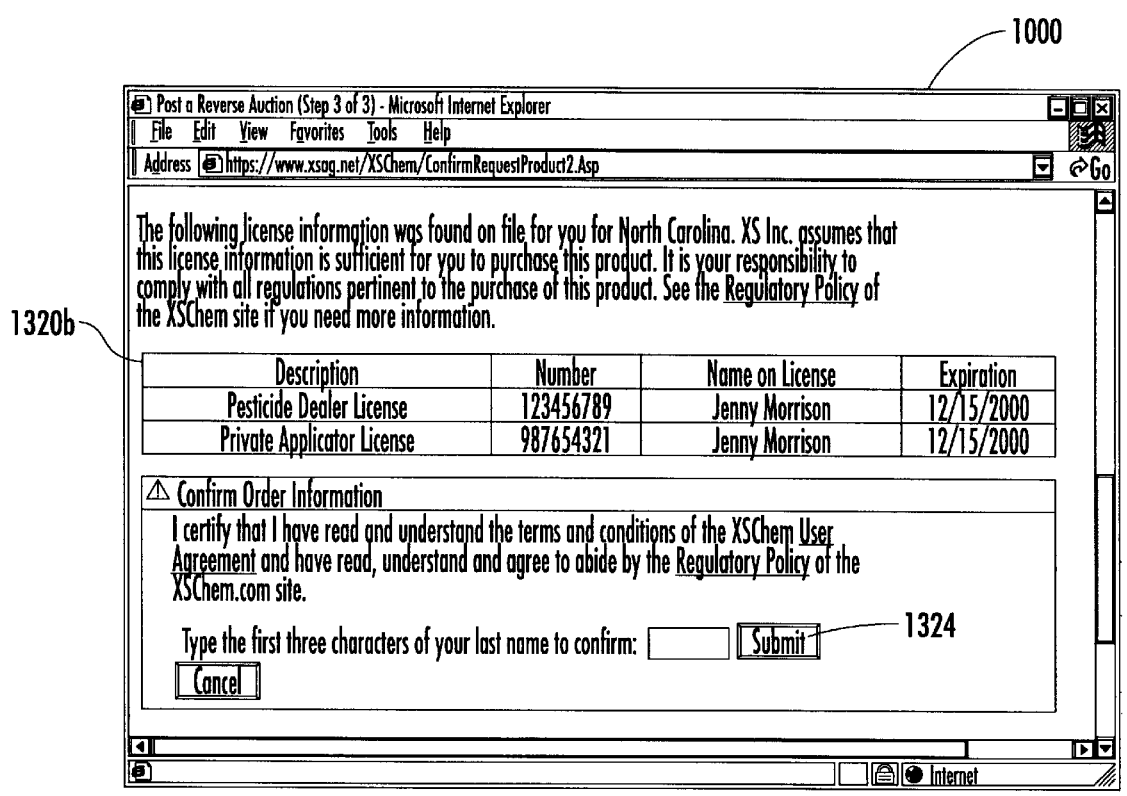

Upon activating the "Continue" button 1302 in the form 1300 of FIG. 18A, a buyer is presented with a confirmation form 1310 as illustrated in FIG. 18B. The illustrated confirmation form 1310 presents a buyer with a compilation of the information available from and provided in form 1300 of FIG. 18A. Upon activating the "Continue" button 1312 in the form 1310 of FIG. 18B, a buyer is presented with a second confirmation form illustrated in two parts 1320a, 1320b in FIGS. 18C and 18D, respectively.

The first and second parts 1320a, 1320b of the second confirmation form requests the buyer to certify and confirm that the financial account and regulatory licensing information previously provided to the intermediary is correct. In the illustrated first part 1320a of the second confirmation form, an image of a check 1322 drawn on a financial account for the amount the buyer is willing to pay for the regulated goods is illustrated. In addition, a description, license number, name, and expiration date of the buyer's regulatory license for buying and using the regulated goods is illustrated in the second part 1320b of the illustrated second confirmation form. Upon activating the "Submit" button 1324 in the second confirmation form of FIGS. 18C and 18D, the buyer's offer is listed and a reverse auction is conducted via the computer system 10 of FIG. 1. By activating the "Submit" button 1324, the potential buyer "signs" or certifies that he/she is willing to be contractually bound to purchase the regulated goods should his/her offer become accepted by a seller.

Figure 18E:
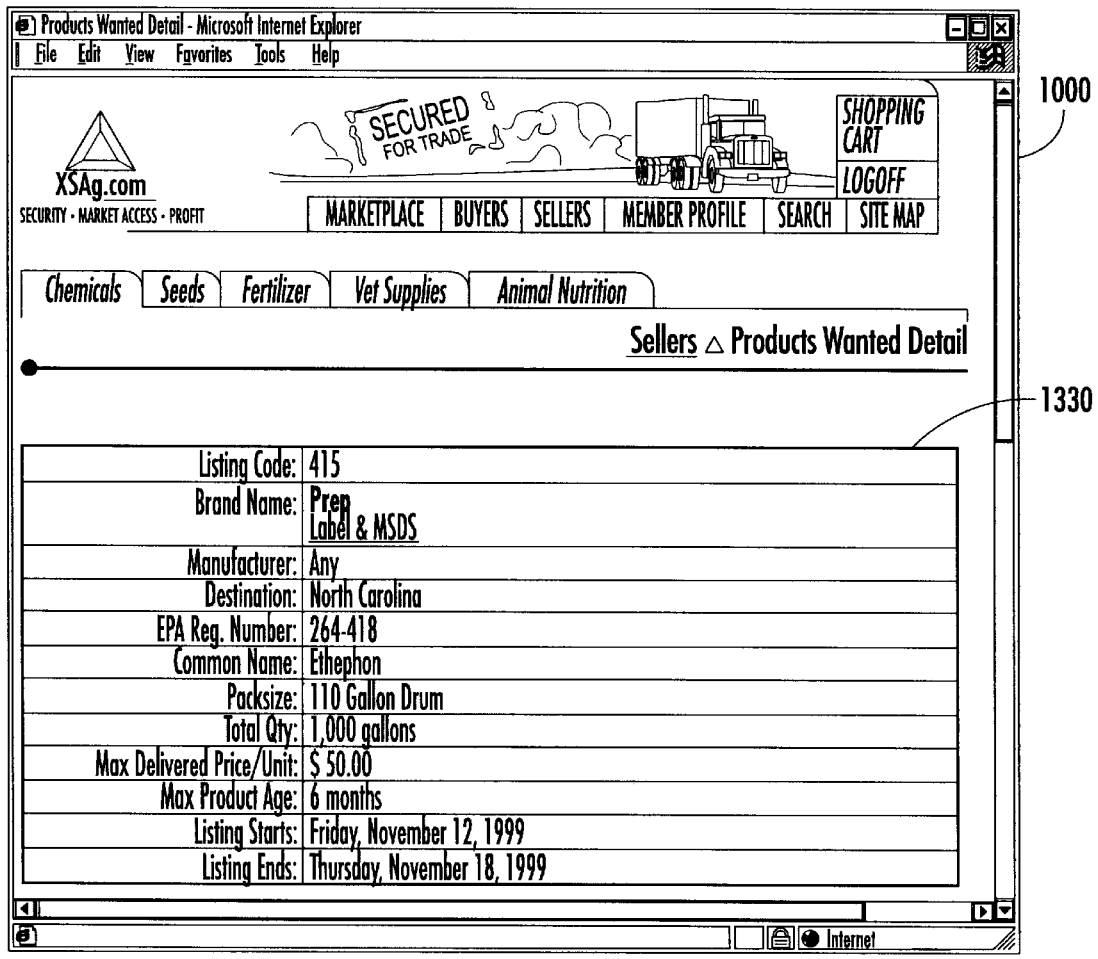

Referring now to FIG. 18E, an exemplary buyer's offer to purchase regulated goods is illustrated in form 1330. A seller wishing to accept the buyer's offer at the buyer's price provides various information via form 1340 illustrated in FIG. 18F. Illustrated information fields include an "ACH Account" field 1340a, a "Brand Name" field 1340b, a "Packsize" field 1340c, a "Shipping Location" field 1340d, a "Cases per Pallet" field 1340e, a "Pallets for Sale" field 1340f, a "Total Quantity" field 1340g, a "Product Age" field 1340h, a "Delivered Price/Unit" field 1340i, and a "Seller Offering Price" field 1340j. Upon activating the "Submit" button 1342, in the form 1340 of FIG. 18F, a seller is presented with a confirmation form 1350 as illustrated in FIG. 18G. The illustrated confirmation form 1350 presents a seller with a compilation of the information available from and provided in form 1340 of FIG. 18F.

Figure 18H:
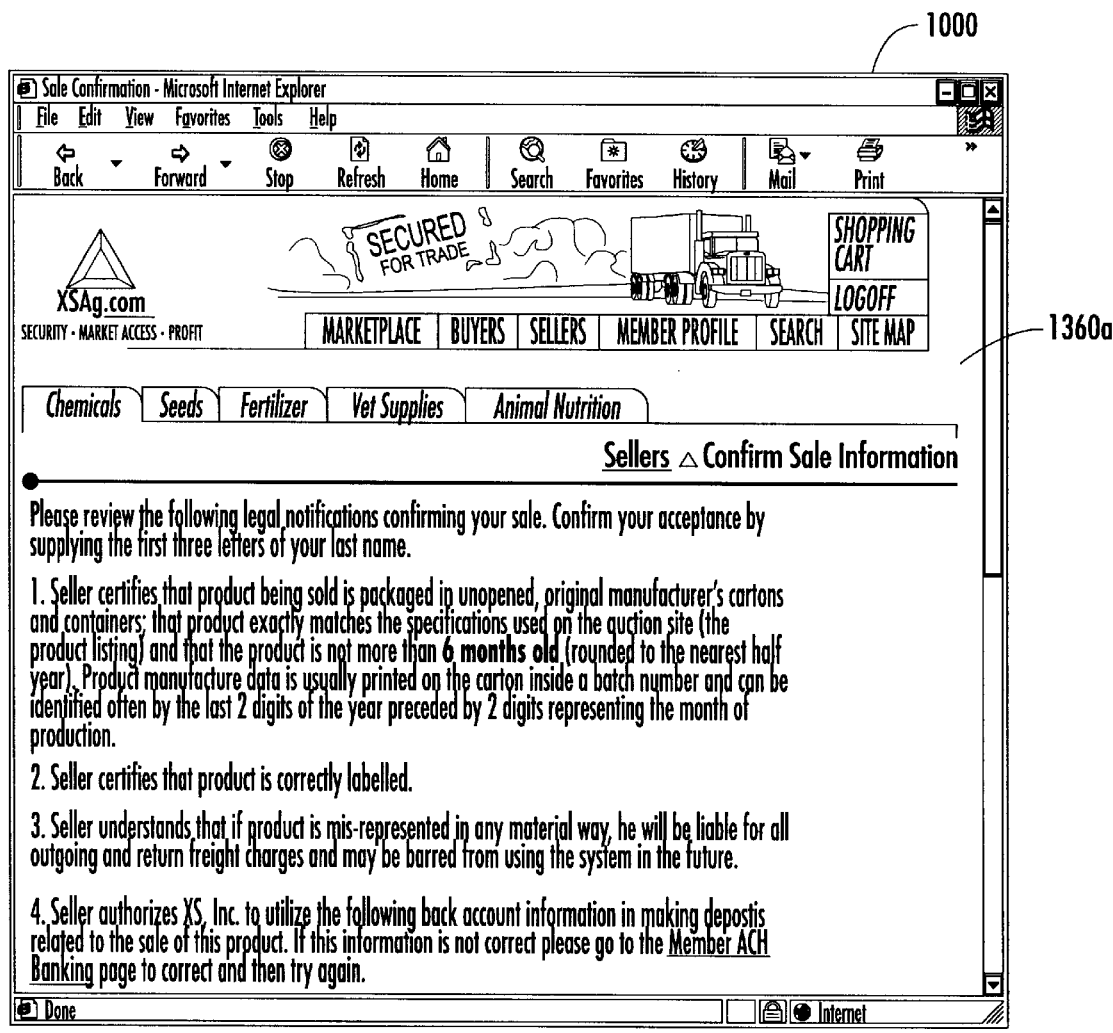
Figure 18I:
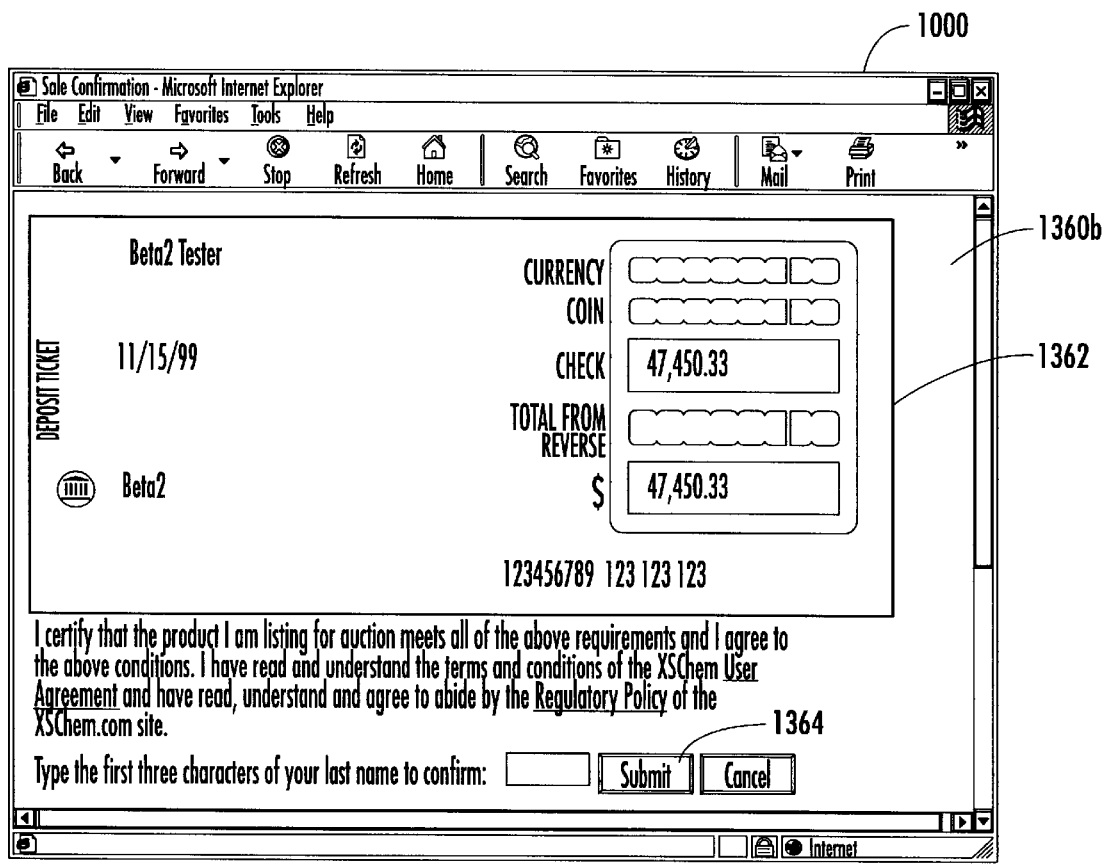

Upon activating the "Submit" button 1352 in the form 1350 of FIG. 18G, a seller is presented with a second confirmation form illustrated in two parts 1360a, 1360b in FIGS. 18H and 18I. The first and second parts 1360a, 1360b of the second confirmation form requests the seller to certify and confirm that the regulated goods being sold by the seller comply with various regulations and that financial account information previously provided to the intermediary is correct. In the illustrated second part 1360b of the second confirmation form, an image of a deposit ticket 1362 for a financial account in the amount the buyer is willing to pay for the regulated goods is illustrated. By activating the "Submit" button 1364, the seller "signs" or certifies that he/she is willing to be contractually bound to sell the regulated goods to the buyer.

Figure 19:
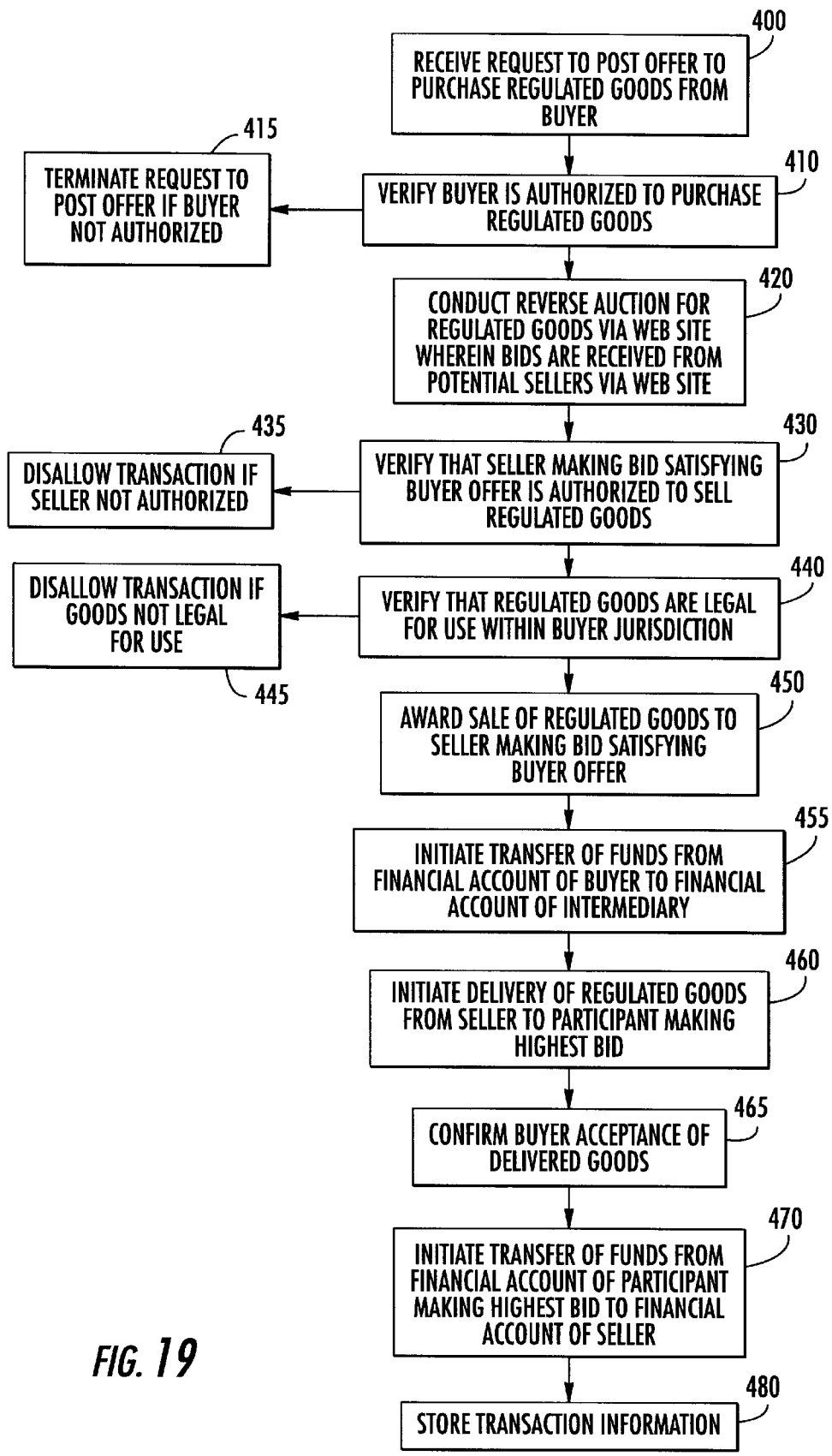
FIG. 19 is a flow chart illustrating operations for buying and selling regulated goods in a reverse auction format via the computer system illustrated in FIG. 1, according to an embodiment of the present invention.

Referring now to FIG. 19, operations for buying and selling regulated goods in a reverse auction format via the computer system 10 of FIG. 1 are illustrated. The intermediary receives a request from a buyer to post an offer via the intermediary Web site (12, FIG. 1) about regulated goods the buyer is willing to purchase (Block 400). Before posting this information, the intermediary verifies that the buyer is authorized to purchase the regulated goods (Block 410) using information provided by the buyer during registration and any additional information available to the intermediary. As discussed above, the buyer information is preferably maintained within the production database (16b, FIG. 1) and is readily accessible via the database server (15, FIG. 1). The intermediary terminates the request if the buyer is not authorized (Block 415). If the buyer is authorized, the intermediary conducts a reverse auction via the Web site (12, FIG. 1) and allows potential sellers to bid on the buyer's offer, preferably for a designated period of time (Block 420).

The intermediary verifies that a seller making a bid that satisfies the offer of the buyer is authorized to sell the regulated goods (Block 430). As discussed above, seller information is preferably maintained within the production database (16b, FIG. 1) and is readily accessible via the database server (15, FIG. 1). The intermediary disallows the transaction if the seller is not authorized to sell the regulated goods (Block 435). If the seller is authorized, the intermediary then verifies that the regulated goods are legal for use within the buyer's jurisdiction and/or are not restricted for use within the buyer's jurisdiction by the manufacturer of the regulated goods (Block 440). As discussed above, information regarding legality of use of regulated goods within a buyer's jurisdiction is preferably maintained within the product regulatory database (16c, FIG. 1) and is readily accessible via the database server (15, FIG. 1). Alternatively, the intermediary may communicate with one or more regulatory agencies (22, FIG. 1) to obtain this information. The intermediary disallows the transaction if the regulated goods are not legal for use within the buyer's jurisdiction (Block 445).

If the regulated goods are legal for use within the buyer's jurisdiction, the intermediary awards the sale of the regulated goods to the seller making the bid that satisfies the buyer's offer (Block 450). The intermediary then initiates a transfer of funds from a financial account of the buyer to a financial account of the intermediary (Block 455) and initiates delivery of the regulated goods from the seller to the buyer (Block 460). The intermediary confirms that the buyer "accepts" the delivered goods (Block 465) and then initiates transfer of funds from a financial account of the intermediary to a financial account of the seller (Block 470). The buyer's acceptance can be confirmed by the intermediary via communications with the buyer by way of the computer system 10 of FIG. 1, or by way of other modes of communication. The buyer may reject the regulated goods if not delivered in the contractually agreed-to condition and/or amount. The intermediary also stores information about each transaction between a buyer and seller (Block 480) within the production database (16b, FIG. 1). This information may be made available to authorized regulatory agencies and others having a need to know.

Automatic Bidding Agent

According to another embodiment of the present invention, an automatic bidding agent may be provided to allow potential buyers to automatically increase his/her bids by an incremental amount (up to a maximum amount) in response to higher bids of other potential buyers in order to place a winning bid. An incremental amount may be any positive value, but preferably any positive value equal to or greater than one cent. As such, a potential buyer utilizing an automatic bidding agent according to the present invention does not need to monitor an auction. According to the present invention, potential buyers do not know what the maximum bid of other potential buyers is. If the auction price does not reach the predetermined maximum price, the potential buyer will only have to pay the minimum winning price.

An agent is a software program that acts on behalf of a user as it performs tasks within an application program. An automatic bidding agent according to the present invention may run on a buyer's/seller's Web client and/or on the Web server (14, FIG. 1). Agents are well understood by those of skill in the art and need not be described further herein.

Referring now to FIG. 16A, the form 1200 of FIG. 15a is illustrated with a portion 1206 that allows a potential buyer to implement an automatic bidding agent according to the present invention. In the "maximum bid" field 1206a, a potential buyer indicates the maximum amount he/she is willing to pay for a particular product offered for sale. In the "bid increment" field 1206b, a potential buyer indicates the amount he/she wishes to increase his/her bid in order to overcome higher bids of other potential buyers. An automatic bidding agent will then incrementally increase the potential buyer's bid to overcome bids made by other potential buyers until either this potential buyer wins the bid or the maximum bid as indicated in the "maximum bid" field 1206a is reached. At any time, a buyer can modify parameters of the automatic bidding agent regarding the maximum bid, bidding increment, quantity of product, and minimum acceptable quantity.

Figure 16B:
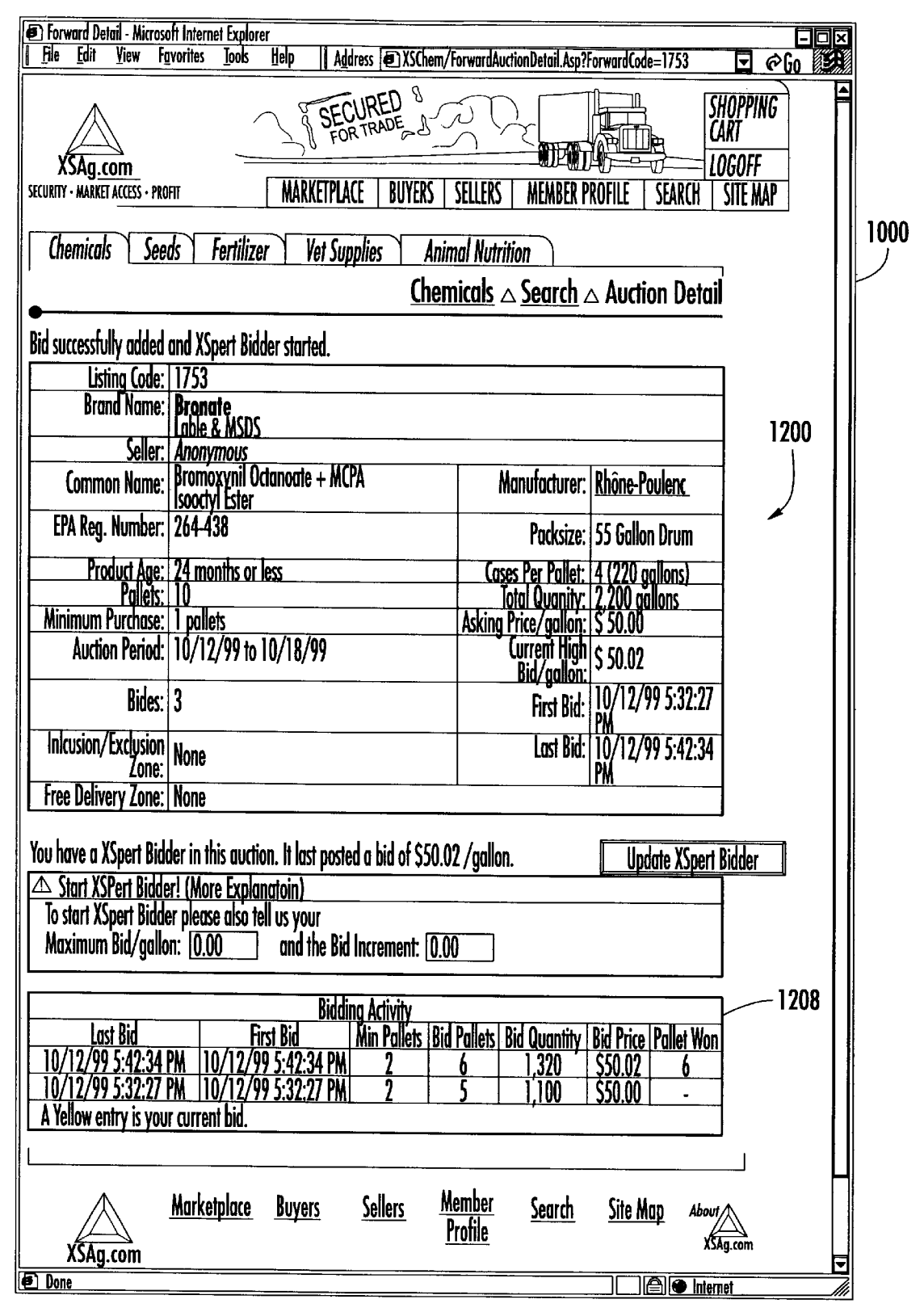

Referring now to FIG. 16B, bidding activity in the lower portion 1208 of form 1200 is displayed indicating that the potential buyer's submitted bid has been successfully added and that the potential buyer has won six pallets of the regulated goods at a bid price of fifty dollars and two cents ($50.02). The bidding agent raised the potential buyer's bid by two cents in order to make the potential buyer the winning bidder.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of buying and selling regulated goods over a computer network, wherein the computer network comprises a Web site of an intermediary and a plurality of Web clients in communication with the Web site, and wherein buyers and sellers communicate with each other through the Web site via respective Web clients, the method comprising the following steps:

receiving a request at the Web site from a seller, via a respective Web client, to list information about regulated goods offered for sale by the seller over the computer network, wherein the information comprises an identification of the regulated goods and a sales price for the regulated goods;

verifying that the seller is authorized to sell the regulated goods using information about the seller maintained by the intermediary by verifying that the seller has a valid license issued by a regulatory agency for the regulated goods;

responsive to verifying that the seller is authorized to sell the regulated goods, listing the information about the regulated goods offered for sale by the seller over the computer network;

receiving an offer at the Web site from a buyer, via a respective Web client, to purchase the regulated goods from the seller at the listed sales price;

verifying that the buyer is authorized to purchase the regulated goods using information about the buyer maintained by the intermediary by verifying that the buyer has a valid license issued by a regulatory agency for the regulated goods; and verifying that the regulated goods offered for sale are legal for use within a buyer location responsive to verifying that the buyer is authorized to purchase the regulated goods, initiating delivery of the regulated goods from the seller to the buyer.

2. A method according to claim 1 further comprising the step of, responsive to verifying that the buyer is authorized to purchase the regulated goods, initiating a transfer of funds from a financial account of the buyer to a financial account of the seller.

3. A method according to claim 2 wherein the step of initiating a transfer of funds comprises notifying a third party financial institution via the computer network to transfer funds from a financial account of the buyer to a financial account of the intermediary.

4. A method according to claim 1 wherein the information listed about the regulated goods, offered for sale by the seller comprises a designation of a time period within which offers to purchase the regulated goods at the sales price will be accepted.

5. A method according to claim 1 wherein the step of listing information about the regulated goods offered for sale comprises listing cost information for shipping the regulated goods from a seller location to a buyer location.

6. A method according to claim 1 wherein the regulated goods are selected from the group consisting of agricultural chemicals, seeds, and animal health products.

7. A method according to claim 1 further comprising the step of storing information about a sale of regulated goods between a seller and a buyer.

8. A method according to claim 1 further comprising the step of imposing restrictions as to where and from whom offers to purchase the regulated goods by buyers will be accepted.

9. A method according to claim 1 wherein the step of initiating delivery of the regulated goods comprises the steps of:
conducting a reverse auction over the computer network, wherein carriers, via respective Web clients, can submit bids for delivering the regulated goods from the seller to the buyer; and
declaring a winning carrier, wherein the winning carrier submitted a lowest bid for delivering the regulated goods from the seller to the buyer.

10. A method according to claim 1 wherein the step of initiating delivery of the regulated goods comprises initiating delivery of the regulated goods via a third party freight dispatcher in communication with the Web site via a respective Web client.

11. A method of auctioning regulated goods over a computer network, wherein the computer network comprises a Web site of an intermediary and a plurality of Web clients in communication with the Web site, wherein buyers and sellers communicate with each other through the Web site via respective Web clients, the method comprising the following steps:
receiving a request at the Web site from a seller, via a respective Web client, to auction a specified quantity of regulated goods via the computer network;
verifying that the seller is authorized to sell the regulated goods using information about the seller maintained by the intermediary by verifying that the seller has a valid license issued by a regulatory agency for the regulated goods;
responsive to verifying that the seller is authorized to sell the regulated goods, conducting an auction over the computer network to solicit bids to purchase the regulated goods;
declaring a buyer that submits a highest bid for the regulated goods a winner;
verifying that the winning buyer is authorized to purchase the regulated goods using information about the winning buyer maintained by the intermediary by verifying that the buyer has a valid license issued by a regulatory agency for the regulated goods and verifying that the regulated goods offered for sale are legal for use within a buyer location; and
initiating delivery of the regulated goods from the seller to the winning buyer.

12. A method according to claim 11 further comprising the step of initiating a transfer of funds from a financial account of the winning buyer to a financial account of the seller.

13. A method according to claim 12 wherein the step of initiating a transfer of funds comprises notifying a third party financial institution via the computer network to transfer funds from a financial account of the winning buyer to a financial account of the intermediary.

14. A method according to claim 11 wherein the step of conducting an auction over the computer network comprises conducting an auction within a time period designated by the seller.

15. A method according to claim 11 wherein the step of conducting an auction over the computer network comprises listing cost information for shipping the regulated goods from a seller location to a buyer location.

16. A method according to claim 11 wherein the regulated goods are selected from the group consisting of agricultural chemicals, seeds, and animal health products.

17. A method according to claim 11 further comprising the step of storing information about a sale of regulated goods between a seller and a buyer.

18. A method according to claim 11 further comprising the step of imposing restrictions as to where and from whom offers to purchase the regulated goods by buyers will be accepted.

19. A method according to claim 11 wherein the step of initiating delivery of the regulated goods comprises the steps of:
conducting a reverse auction over the computer network, wherein carriers, via respective Web clients, can submit bids for delivering the regulated goods from the seller to the buyer; and
declaring a winning carrier, wherein the winning carrier submitted a lowest bid for delivering the regulated goods from the seller to the buyer.

20. A method according to claim 11 wherein the step of initiating delivery of the regulated goods comprises initiating delivery of the regulated goods via a third party freight dispatcher in communication with the Web site via a respective Web client.

21. A method according to claim 11 wherein the step of conducting an auction comprises the step of allowing a buyer to automatically increase a bid in response to bids from other buyers in order to win the auction.

22. A method of buying and selling regulated goods over a computer network, wherein the computer network comprises a Web site of an intermediary and a plurality of Web clients in communication with the Web site, and wherein buyers and sellers communicate with each other through the Web site via respective Web clients, the method comprising the following steps:
receiving a request at the Web site from a seller, via a respective Web client, to sell regulated goods over the computer network;
verifying that the seller is authorized to sell the regulated goods using information about the seller maintained by the intermediary by verifying that the seller has a valid license issued by a regulatory agency for the regulated goods;

responsive to verifying that the seller is authorized to sell the regulated goods, listing the regulated goods for sale over the computer network;

receiving an offer at the Web site from a buyer, via a respective Web client, to purchase the regulated goods from the seller;

verifying that the buyer is authorized to purchase the regulated goods using information about the buyer maintained by the intermediary by verifying that the buyer has a valid license issued by a regulatory agency for the regulated goods and verifying that the regulated goods offered for sale are legal for use within a buyer location; and responsive to verifying that the buyer is authorized to purchase the regulated goods, initiating a sales transaction for the regulated goods between the seller and buyer.

23. A method according to claim 22 wherein information listed about the regulated goods offered for sale by the seller comprises a designation of a time period within which offers to purchase the regulated goods at the sales price will be accepted.

24. A system for buying and selling regulated goods over a computer network, wherein the computer network comprises a Web site of an intermediary and a plurality of Web clients in communication with the Web site, and wherein buyers and sellers communicate with each other through the Web site via respective Web clients, comprising:

means for receiving a request at the Web site from a seller, via a respective Web client, to list information about regulated goods offered for sale by the seller over the computer network, wherein the information comprises an identification of the regulated goods and a sales price for the regulated goods;

means for verifying that the seller is authorized to sell the regulated goods using information about the seller maintained by the intermediary by verifying that the seller has a valid license issued by a regulatory agency for the regulated goods;

means for listing the information about the regulated goods offered for sale by the seller over the computer network responsive to the means for verifying that the seller is authorized to sell the regulated goods;

means for receiving an offer at the Web site from a buyer, via a respective Web client, to purchase the regulated goods from the seller at the listed sales price;

means for verifying that the buyer is authorized to purchase the regulated goods using information about the buyer maintained by the intermediary by verifying that the buyer has a valid license issued by a regulatory agency for the regulated goods and verifying that the regulated goods offered for sale are legal for use within a buyer location; and means for initiating delivery of the regulated goods from the seller to the buyer responsive to the means for verifying that the buyer is authorized to purchase the regulated goods.

25. A system according to claim 24 further comprising means for initiating a transfer of funds from a financial account of the buyer to a financial account of the seller, wherein the means for initiating a transfer of funds is responsive to the means for verifying that the buyer is authorized to purchase the regulated goods.

26. A system according to claim 25 wherein the means for initiating a transfer of funds comprises means for notifying a third party financial institution via the computer network to transfer funds from a financial account of the buyer to a financial account of the seller.

27. A system according to claim 24 wherein the information listed about the regulated goods offered for sale by the seller comprises a designation of a time period within which offers to purchase the regulated goods at the sales price will be accepted.

28. A system according to claim 24 wherein the means for listing information about the regulated goods offered for sale comprises means for listing cost information for shipping the regulated goods from a seller location to a buyer location.

29. A system according to claim 24 wherein the regulated goods are selected from the group consisting of agricultural chemicals, seeds, and animal health products.

30. A system according to claim 24 further comprising means for storing information about a sale of regulated goods between a seller and a buyer.

31. A system according to claim 24 further comprising means for imposing restrictions as to where and from whom offers to purchase the regulated goods by buyers will be accepted.

32. A system according to claim 24 wherein the means for initiating delivery of the regulated goods comprises:

means for conducting a reverse auction over the computer network, wherein carriers, via respective Web clients, can submit bids for delivering the regulated goods from the seller to the buyer; and means for declaring a winning carrier, wherein the winning carrier submitted a lowest bid for delivering the regulated goods from the seller to the buyer.

33. A system according to claim 24 wherein the means for initiating delivery of the regulated goods comprises means for initiating delivery of the regulated goods via a third party freight dispatcher in communication with the Web site via a respective Web client.

34. A system for auctioning regulated goods over a computer network, wherein the computer network comprises a Web site of an intermediary and a plurality of Web clients in communication with the Web site, wherein buyers and sellers communicate with each other through the Web site via respective Web clients, comprising:

means for receiving a request at the Web site from a seller, via a respective Web client, to auction a specified quantity of regulated goods via the computer network;

means for verifying that the seller is authorized to sell the regulated goods using information about the seller maintained by the intermediary by verifying that the seller has a valid license issued by a regulatory agency for the regulated goods;

means for conducting an auction over the computer network to solicit bids to purchase the regulated goods responsive to the means for verifying that the seller is authorized to sell the regulated goods;

means for declaring a buyer that submits a highest bid for the regulated goods a winner;

means for verifying that the winning buyer is authorized to purchase the regulated goods using information about the winning buyer maintained by the intermediary; by verifying that the buyer has a valid license issued by a regulatory agency for the regulated goods and verifying that the regulated goods offered for sale are legal for use within a buyer location; and means for initiating delivery of the regulated goods from the seller to the winning buyer.

35. A system according to claim 34 further comprising means for initiating a transfer of funds from a financial account of the winning buyer to a financial account of the seller.

36. A system according to claim 35 wherein the means for initiating a transfer of funds comprises means for notifying a third party financial institution via the computer network to transfer funds from a financial account of the winning buyer to a financial account of the seller.

37. A system according to claim 34 wherein the means for conducting an auction over the computer network comprises means for conducting an auction within a time period designated by the seller.

38. A system according to claim 34 wherein the means for conducting an auction over the computer network comprises means for listing cost information for shipping the regulated goods from a seller location to a buyer location.

39. A system according to claim 34 wherein the regulated goods are selected from the group consisting of agricultural chemicals, seeds, and animal health products.

40. A system according to claim 34 further comprising means for storing information about a sale of regulated goods between a seller and a buyer.

41. A system according to claim 34 further comprising means for imposing restrictions as to where and from whom offers to purchase the regulated goods by buyers will be accepted.

42. A system according to claim 34 wherein the means for initiating delivery of the regulated goods comprises:

means for conducting a reverse auction over the computer network, wherein carriers, via respective Web clients, can submit bids for delivering the regulated goods from the seller to the buyer; and means for declaring a winning carrier, wherein the winning carrier submitted a lowest bid for delivering the regulated goods from the seller to the buyer.

43. A system according to claim 34 wherein the means for initiating delivery of the regulated goods comprises means for initiating delivery of the regulated goods via a third party freight dispatcher in communication with the Web site via a respective Web client.

44. A system according to claim 34 wherein the means for conducting an auction comprises means for allowing a buyer to automatically increase a bid in response to bids from other buyers in order to win the auction.

45. A system of buying and selling regulated goods over a computer network, wherein the computer network comprises a Web site of an intermediary and a plurality of Web clients in communication with the Web site, and wherein buyers and sellers communicate with each other through the Web site via respective Web clients, comprising:

means for receiving a request at the Web site from a seller, via a respective Web client, to sell regulated goods over the computer network;

means for verifying that the seller is authorized to sell the regulated goods using information about the seller maintained by the intermediary by verifying that the seller has a valid license issued by a regulatory agency for the regulated goods;

means for listing the regulated goods for sale over the computer network responsive to the means for verifying that the seller is authorized to sell the regulated goods;

means for receiving an offer at the Web site from a buyer, via a respective Web client, to purchase the regulated goods from the seller;

means for verifying that the buyer is authorized to purchase the regulated goods using information about the buyer maintained by the intermediary by verifying that the buyer has a valid license issued by a regulatory agency for the regulated goods and verifying that the regulated goods offered for sale are legal for use within a buyer location; and means for initiating a sales transaction for the regulated goods between the seller and buyer responsive to the means for verifying that the buyer is authorized to purchase the regulated goods.

46. A system according to claim 45 wherein information listed about the regulated goods offered for sale by the seller comprises a designation of a time period within which offers to purchase the regulated goods at the sales price will be accepted.

47. A computer program product for buying and selling regulated goods over a computer network, wherein the computer network comprises a Web site of an intermediary and a plurality of Web clients in communication with the Web site, and wherein buyers and sellers communicate with each other through the Web site via respective Web clients, the computer program product comprising a computer usable storage medium having computer readable program code means embodied in the medium, the computer readable program code means comprising:

computer readable program code means for receiving a request at the Web site from a seller, via a respective Web client, to list information about regulated goods offered for sale by the seller over the computer network, wherein the information comprises an identification of the regulated goods and a sales price for the regulated goods;

computer readable program code means for verifying that the seller is authorized to sell the regulated goods using information about the seller maintained by the intermediary;

computer readable program code means for listing the information about the regulated goods offered for sale by the seller over the computer network responsive to the computer readable program code means for verifying that the seller is authorized to sell the regulated goods;

computer readable program code means for receiving an offer at the Web site from a buyer, via a respective Web client, to purchase the regulated goods from the seller at the listed sales price;

computer readable program code means for verifying that the buyer is authorized to purchase the regulated goods using information about the buyer maintained by the intermediary; and computer readable program code means for initiating delivery of the regulated goods from the seller to the buyer.

48. A computer program product according to claim 47 wherein the computer readable program code means for verifying that the seller is authorized to sell the regulated goods comprises computer readable program code means for verifying that the seller has a valid license issued by a regulatory agency for the regulated goods, and wherein the computer readable program code means for verifying that the buyer is authorized to purchase the regulated goods comprises computer readable program code means for verifying that the buyer has valid license issued by a regulatory agency for the regulated goods.

49. A computer program product according to claim 47 further comprising computer readable program code means for verifying that the regulated goods offered for sale are legal for use within a buyer location prior to initiating delivery of the regulated goods from the seller to the buyer.

50. A computer program product according to claim 47 further comprising computer readable program code means for initiating a transfer of funds from a financial account of the buyer to a financial account of the seller.

51. A computer program product according to claim 50 wherein the computer readable program code means for initiating a transfer of funds comprises computer readable program code means for notifying a third party financial institution via the computer network to transfer funds from a financial account of the buyer to a financial account of the intermediary.

52. A computer program product according to claim 47 wherein the information listed about the regulated goods offered for sale by the seller comprises a designation of a time period within which offers to purchase the regulated goods at the sales price will be accepted.

53. A computer program product according to claim 47 wherein the computer readable program code means for listing information about the regulated goods offered for sale comprises computer readable program code means for listing cost information for shipping the regulated goods from a seller location to a buyer location.

54. A computer program product according to claim 47 wherein the regulated goods are selected from the group consisting of agricultural chemicals, seeds, and animal health products.

55. A computer program product according to claim 47 further comprising computer readable program code means for storing information about a sale of regulated goods between a seller and a buyer.

56. A computer program product according to claim 47 further comprising computer readable program code means for imposing restrictions as to where and from whom offers to purchase the regulated goods by buyers will be accepted.

57. A computer program product according to claim 47 wherein the computer readable program code means for initiating delivery of the regulated goods comprises:
   computer readable program code means for conducting a reverse auction over the computer network, wherein carriers, via respective Web clients, can submit bids for delivering the regulated goods from the seller to the buyer; and
   computer readable program code means for declaring a winning carrier, wherein the winning carrier submitted a lowest bid for delivering the regulated goods from the seller to the buyer.

58. A computer program product according to claim 47 wherein the computer readable program code means for initiating delivery of the regulated goods comprises computer readable program code means for initiating delivery of the regulated goods via a third party freight dispatcher in communication with the Web site via a respective Web client.

59. A computer program product for auctioning regulated goods over a computer network, wherein the computer network comprises a Web site of an intermediary and a plurality of Web clients in communication with the Web site, wherein buyers and sellers communicate with each other through the Web site via respective Web clients, the computer program product comprising a computer usable storage medium having computer readable program code means embodied in the medium, the computer readable program code means comprising:
   computer readable program code means for receiving a request at the Web site from a seller, via a respective Web client, to auction a specified quantity of regulated goods via the computer network;
   computer readable program code means for verifying that the seller is authorized to sell the regulated goods using information about the seller maintained by the intermediary by verifying that the seller has a valid license issued by a regulatory agency for the regulated goods;
   computer readable program code means for conducting an auction over the computer network to solicit bids to purchase the regulated goods responsive to the computer readable program code means for verifying that the seller is authorized to sell the regulated goods;
   computer readable program code means for declaring a buyer that submits a highest bid for the regulated goods a winner;
   computer readable program code means for verifying that the winning buyer is authorized to purchase the regulated goods using information about the winning buyer maintained by the intermediary by verifying that the buyer has a valid license issued by a regulatory agency for the regulated goods and verifying that the regulated goods offered for sale are legal for use within a buyer location; and
   computer readable program code means for initiating delivery of the regulated goods from the seller to the winning buyer.

60. A computer program product according to claim 59 further comprising computer readable program code means for initiating a transfer of funds from a financial account of the winning buyer to a financial account of the seller.

61. A computer program product according to claim 60 wherein the computer readable program code means for initiating a transfer of funds comprises computer readable program code means for notifying a third party financial institution via the computer network to transfer funds from a financial account of the winning buyer to a financial account of the intermediary.

62. A computer program product according to claim 59 wherein the computer readable program code means for conducting an auction over the computer network comprises computer readable program code means for conducting an auction within a time period designated by the seller.

63. A computer program product according to claim 59 wherein the computer readable program code means for conducting an auction over the computer network comprises computer readable program code means for listing cost information for shipping the regulated goods from a seller location to a buyer location.

64. A computer program product according to claim 59 wherein the regulated goods are selected from the group consisting of agricultural chemicals, seeds, and animal health products.

65. A computer program product according to claim 59 further comprising computer readable program code means for storing information about a sale of regulated goods between a seller and a buyer.

66. A computer program product according to claim 59 further comprising computer readable program code means for imposing restrictions as to where and from whom offers to purchase the regulated goods by buyers will be accepted.

67. A computer program product according to claim 59 wherein the computer readable program code means for initiating delivery of the regulated goods comprises:
   computer readable program code means for conducting a reverse auction over the computer network, wherein carriers, via respective Web clients, can submit bids for delivering the regulated goods from the seller to the buyer; and computer readable program code means for declaring a winning carrier, wherein the winning carrier submitted a lowest bid for delivering the regulated goods from the seller to the buyer.

68. A computer program product according to claim 59 wherein the computer readable program code means for initiating delivery of the regulated goods comprises computer readable program code means for initiating delivery of the regulated goods via a third party freight dispatcher in communication with the Web site via a respective Web client.

69. A computer program product according to claim 59 wherein the computer readable program code means for conducting an auction comprises computer readable program code means for allowing a buyer to automatically increase a bid in response to bids from other buyers in order to win the auction.

70. A computer program product for buying and selling regulated goods over a computer network, wherein the computer network comprises a Web site of an intermediary and a plurality of Web clients in communication with the Web site, and wherein buyers and sellers communicate with each other through the Web site via respective Web clients, the computer program product comprising a computer usable storage medium having computer readable program code means embodied in the medium, the computer readable program code means comprising:

computer readable program code means for receiving a request at the Web site from a seller, via a respective Web client, to sell regulated goods over the computer network;

computer readable program code means for verifying that the seller is authorized to sell the regulated goods using information about the seller maintained by the intermediary by verifying that the seller has a valid license issued by a regulatory agency for the regulated goods;

computer readable program code means for listing the regulated goods for sale over the computer network responsive to the computer readable program code means for verifying that the seller is authorized to sell the regulated goods;

computer readable program code means for receiving an offer at the Web site from a buyer, via a respective Web client, to purchase the regulated goods from the seller;

computer readable program code means for verifying that the buyer is authorized to purchase the regulated goods using information about the buyer maintained by the intermediary by verifying that the buyer has a valid license issued by a regulatory agency for the regulated goods and verifying that the regulated goods offered for sale are legal for use within a buyer location; and computer readable program code means for initiating a sales transaction for the regulated goods between the seller and buyer responsive to the computer readable program code means for verifying that the buyer is authorized to purchase the regulated goods.

71. A computer program product according to claim 70 wherein information listed about the regulated goods offered for sale by the seller comprises a designation of a time period within which offers to purchase the regulated goods at the sales price will be accepted.

72. A method of auctioning regulated goods over a computer network, wherein the computer network comprises a Web site of an intermediary and a plurality of Web clients in communication with the Web site, wherein buyers and sellers communicate with each other through the Web site via respective Web clients, the method comprising the following steps:

receiving a request at the Web site from a buyer, via a respective Web client, to post an offer to purchase a specified quantity of regulated goods at a specified price via the computer network;

verifying that the buyer is authorized to purchase the regulated goods using information about the buyer maintained by the intermediary by verifying that the buyer has a valid license issued by a regulatory agency for the regulated goods;

responsive to verifying that the buyer is authorized to purchase the regulated goods, conducting a reverse auction over the computer network to solicit bids from sellers of the regulated goods;

declaring a seller that submits a bid satisfying the buyer offer a winner;

verifying that the winning seller is authorized to sell the regulated goods using information about the winning seller maintained by the intermediary by verifying that the seller has a valid license issued by a regulatory agency for the regulated goods and verifying that the regulated goods offered for sale are legal for use within a buyer location; and initiating delivery of the regulated goods from the winning seller to the buyer.

73. A method according to claim 72 further comprising the step of initiating a transfer of funds from a financial account of the buyer to a financial account of the winning seller.

74. A method according to claim 73 wherein the step of initiating a transfer of funds comprises notifying a third party financial institution via the computer network to transfer funds from a financial account of the buyer to a financial account of the intermediary.

75. A method according to claim 72 wherein the step of conducting a reverse auction over the computer network comprises conducting a reverse auction within a time period designated by the buyer.

76. A method according to claim 72 wherein the step of conducting a reverse auction over the computer network comprises listing cost information for shipping the regulated goods from a seller location to a buyer location.

77. A method according to claim 72 wherein the regulated goods are selected from the group consisting of agricultural chemicals, seeds, and animal health products.

78. A method according to claim 72 further comprising the step of storing information about a sale of regulated goods between the winning seller and the buyer.

79. A method according to claim 72 wherein the step of initiating delivery of the regulated goods comprises the steps of:

conducting a reverse auction over the computer network, wherein carriers, via respective Web clients, can submit bids for delivering the regulated goods from the winning seller to the buyer; and declaring a winning carrier, wherein the winning carrier submitted a lowest bid for delivering the regulated goods from the winning seller to the buyer.

80. A method according to claim 72 wherein the step of initiating delivery of the regulated goods comprises initiating delivery of the regulated goods via a third party freight dispatcher in communication with the Web site via a respective Web client.

81. A system for auctioning regulated goods over a computer network, wherein the computer network comprises a Web site of an intermediary and a plurality of Web clients in communication with the Web site, wherein buyers and sellers communicate with each other through the Web site via respective Web clients, comprising:

means for receiving a request at the Web site from a buyer, via a respective Web client, to post an offer to purchase a specified quantity of regulated goods at a specified price via the computer network;

means for verifying that the buyer is authorized to purchase the regulated goods using information about the buyer maintained by the intermediary by verifying that the buyer has a valid license issued by a regulatory agency for the regulated goods;

means for conducting a reverse auction over the computer network to solicit bids from sellers of the regulated goods, responsive to verifying that the buyer is authorized to purchase the regulated goods;

means for declaring a seller that submits a bid satisfying the buyer offer a winner;

means for verifying that the winning seller is authorized to sell the regulated goods using information about the winning seller maintained by the intermediary by verifying that the seller has a valid license issued by a regulatory agency for the regulated goods and verifying that the regulated goods offered for sale are legal for use within a buyer location; and means for initiating delivery of the regulated goods from the winning seller to the buyer.

82. A system according to claim 81 further comprising means for initiating a transfer of funds from a financial account of the buyer to a financial account of the winning seller.

83. A system according to claim 82 wherein the means for initiating a transfer of funds comprises means for notifying a third party financial institution via the computer network to transfer funds from a financial account of the buyer to a financial account of the intermediary.

84. A system according to claim 81 wherein the means for conducting a reverse auction over the computer network comprises means for conducting a reverse auction within a time period designated by the buyer.

85. A system according to claim 81 wherein the means for conducting a reverse auction over the computer network comprises means for listing cost information for shipping the regulated goods from a seller location to a buyer location.

86. A system according to claim 81 wherein the regulated goods are selected from the group consisting of agricultural chemicals, seeds, and animal health products.

87. A system according to claim 81 further comprising means for storing information about a sale of regulated goods between the winning seller and the buyer.

88. A system according to claim 81 wherein the means for initiating delivery of the regulated goods comprises:

means for conducting a reverse auction over the computer network, wherein carriers, via respective Web clients, can submit bids for delivering the regulated goods from the winning seller to the buyer; and means for declaring a winning carrier, wherein the winning carrier submitted a lowest bid for delivering the regulated goods from the winning seller to the buyer.

89. A system according to claim 81 wherein the means for initiating delivery of the regulated goods comprises means for initiating delivery of the regulated goods via a third party freight dispatcher in communication with the Web site via a respective Web client.

90. A computer program product for auctioning regulated goods over a computer network, wherein the computer network comprises a Web site of an intermediary and a plurality of Web clients in communication with the Web site, wherein buyers and sellers communicate with each other through the Web site via respective Web clients, the computer program product comprising a computer usable storage medium having computer readable program code means embodied in the medium, the computer readable program code means comprising:

computer readable program code means for receiving a request at the Web site from a buyer, via a respective Web client, to post an offer to purchase a specified quantity of regulated goods at a specified price via the computer network;

computer readable program code means for verifying that the buyer is authorized to purchase the regulated goods using information about the buyer maintained by the intermediary by verifying that the buyer has a valid license issued by a regulatory agency for the regulated goods;

computer readable program code means for conducting a reverse auction over the computer network to solicit bids from sellers of the regulated goods, responsive to verifying that the buyer is authorized to purchase the regulated goods;

computer readable program code means for declaring a seller that submits a bid satisfying the buyer offer a winner;

computer readable program code means for verifying that the winning seller is authorized to sell the regulated goods using information about the winning seller maintained by the intermediary by verifying that the seller has a valid license issued by a regulatory agency for the regulated goods and verifying that the regulated goods offered for sale are legal for use within a buyer location; and computer readable program code means for initiating delivery of the regulated goods from the winning seller to the buyer.

91. A computer program product according to claim 90 further comprising computer readable program code means for initiating a transfer of funds from a financial account of the buyer to a financial account of the winning seller.

92. A computer program product according to claim 91 wherein the computer readable program code means for initiating a transfer of funds comprises computer readable program code means for notifying a third party financial institution via the computer network to transfer funds from a financial account of the buyer to a financial account of the intermediary.

93. A computer program product according to claim 90 wherein the computer readable program code means for conducting a reverse auction over the computer network comprises computer readable program code means for conducting a reverse auction within a time period designated by the buyer.

94. A computer program product according to claim 90 wherein the computer readable program code means for conducting a reverse auction over the computer network comprises computer readable program code means for listing cost information for shipping the regulated goods from a seller location to a buyer location.

95. A computer program product according to claim 90 wherein the regulated goods are selected from the group consisting of agricultural chemicals, seeds, and animal health products.

96. A computer program product according to claim 90 further comprising computer readable program code means for storing information about a sale of regulated goods between the winning seller and the buyer.

97. A computer program product according to claim 90 wherein the computer readable program code means for initiating delivery of the regulated goods comprises:

computer readable program code means for conducting a reverse auction over the computer network, wherein carriers, via respective Web clients, can submit bids for delivering the regulated goods from the winning seller to the buyer; and computer readable program code means for declaring a winning carrier, wherein the winning carrier submitted a lowest bid for delivering the regulated goods from the winning seller to the buyer.

98. A computer program product according to claim 90 wherein the computer readable program code means for initiating delivery of the regulated goods comprises computer readable program code means for initiating delivery of the regulated goods via a third party freight dispatcher in communication with the Web site via a respective Web client.

* * * * *